(12) United States Patent
Kobayashi et al.

(10) Patent No.: US 7,645,648 B2
(45) Date of Patent: Jan. 12, 2010

(54) LIQUID CRYSTAL DISPLAY

(75) Inventors: Kazuhiro Kobayashi, Kikuchi-gun (JP);
Ken Nakashima, Kikuchi-gun (JP);
Nobuhiro Nakamura, Kikuchi-gun (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/127,546

(22) Filed: May 27, 2008

(65) Prior Publication Data

US 2008/0241980 A1  Oct. 2, 2008

Related U.S. Application Data

(62) Division of application No. 10/973,619, filed on Oct. 27, 2004, now Pat. No. 7,394,097, which is a division of application No. 09/805,039, filed on Mar. 14, 2001, now Pat. No. 6,838,696.

(30) Foreign Application Priority Data

Mar. 15, 2000 (JP) ............... 2000-072766
Mar. 23, 2000 (JP) ............... 2000-082141
Mar. 23, 2000 (JP) ............... 2000-082142

(51) Int. Cl.
*H01L 21/00* (2006.01)

(52) U.S. Cl. ............ 438/149; 257/72; 257/E21.094; 257/E21.104; 257/E21.121; 257/E21.372; 257/E21.411

(58) Field of Classification Search ............ 438/30, 438/149; 257/72, 291, 292, 443, E21.094, 257/E21.104, E21.121, E21.372, E21.411
See application file for complete search history.

(56) References Cited

U.S. PATENT DOCUMENTS

| | | | |
|---|---|---|---|
| 5,751,381 A | 5/1998 | Ono et al. | |
| 5,784,133 A | 7/1998 | Kim et al. | |
| 6,121,632 A | 9/2000 | Taguchi et al. | |
| 6,429,057 B1 | 8/2002 | Hong et al. | |
| 6,682,961 B1 * | 1/2004 | Kim | 438/149 |

FOREIGN PATENT DOCUMENTS

| | | |
|---|---|---|
| JP | 8-50308 | 2/1996 |
| JP | 3545717 | 4/2004 |

* cited by examiner

*Primary Examiner*—Quoc D Hoang
(74) *Attorney, Agent, or Firm*—Oblon, Spivak, McClelland, Maier & Neustadt, L.L.P.

(57) ABSTRACT

A thin film transistor array substrate including an insulating substrate, a first metallic pattern formed on the insulating substrate, and an insulating film provided on the first metallic pattern. A semiconductor pattern is provided on the insulating film, and a second metallic pattern is provided on the semiconductor pattern. The second metallic pattern is surrounded by the semiconductor pattern.

5 Claims, 68 Drawing Sheets

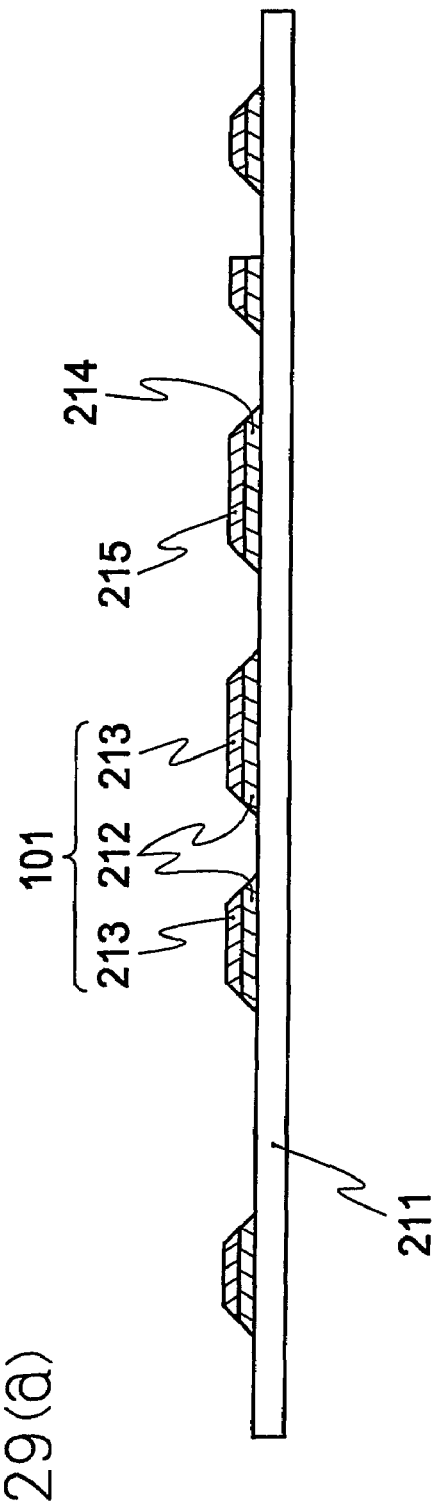
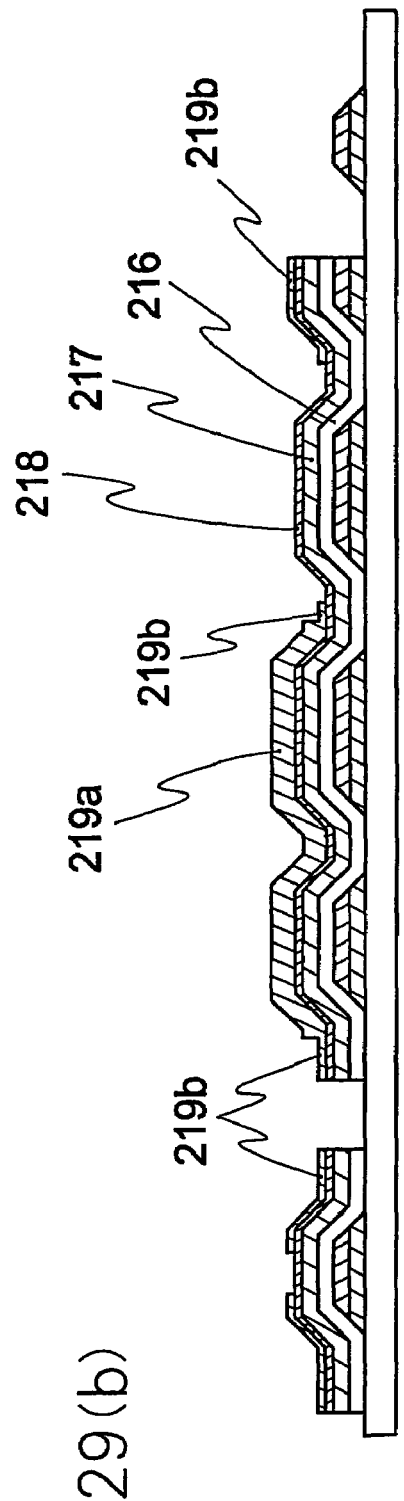
FIG. 29(a)
FIG. 29(b)

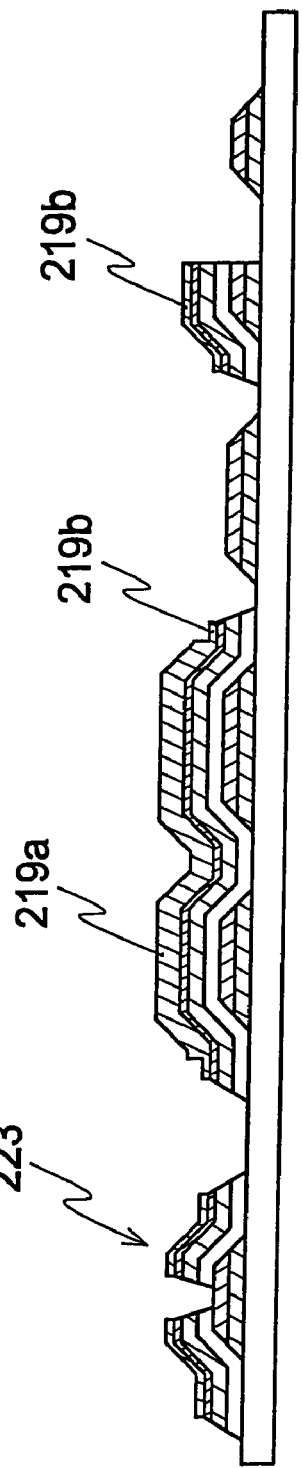
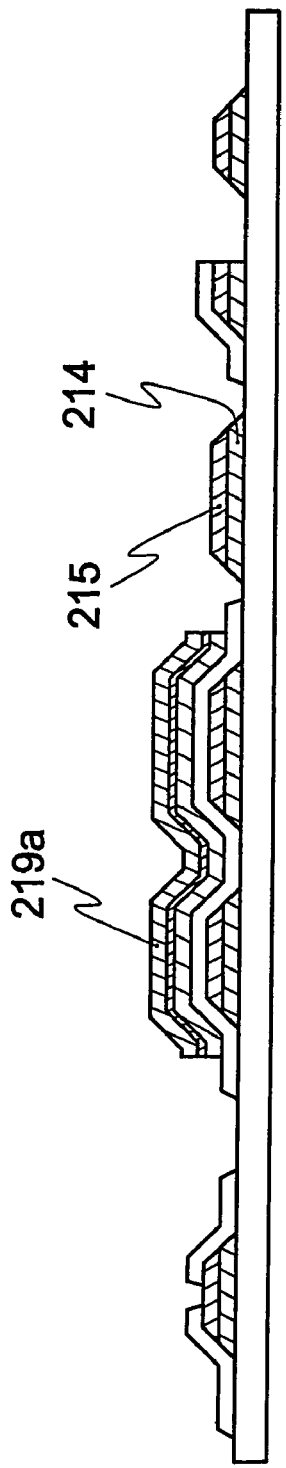
FIG. 30(a)
FIG. 30(b)

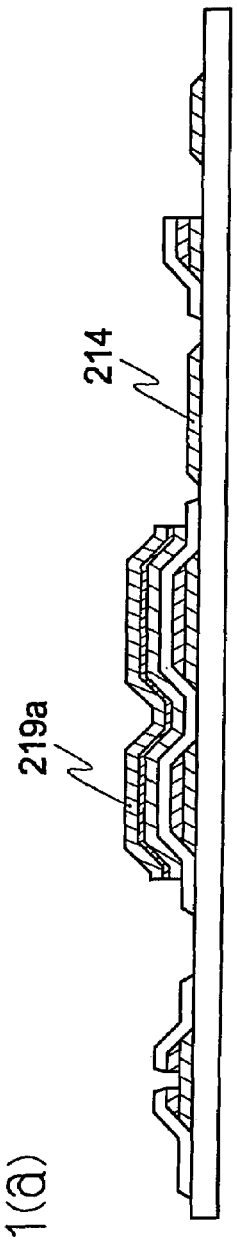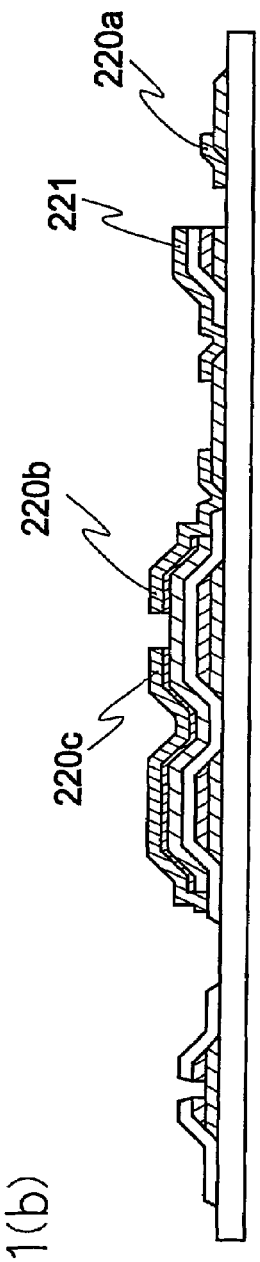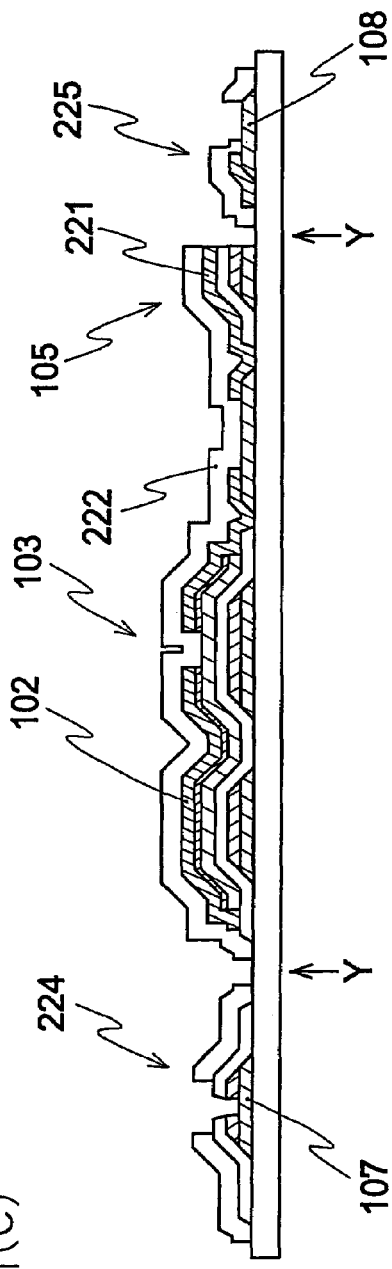

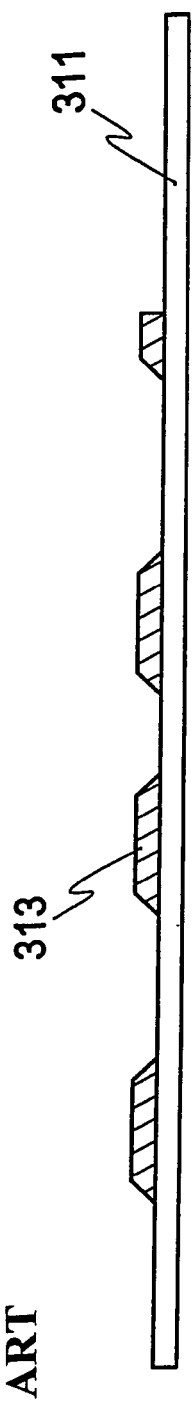
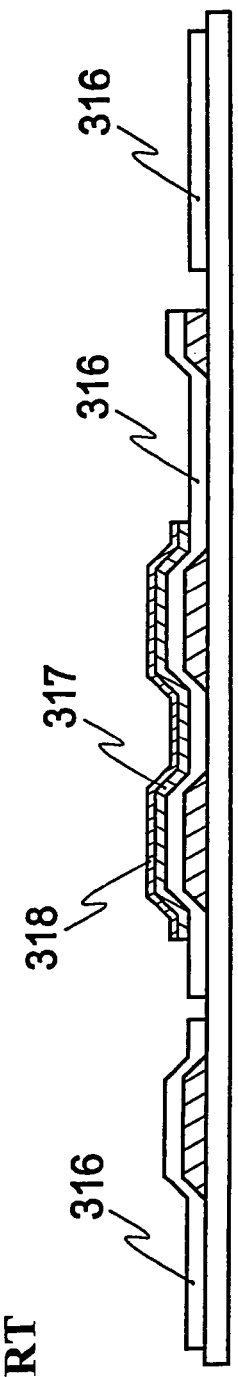
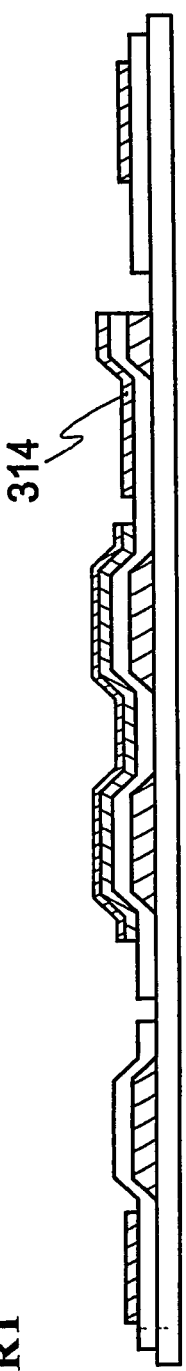
FIG. 59(a) PRIOR ART
FIG. 59(b) PRIOR ART
FIG. 59(c) PRIOR ART

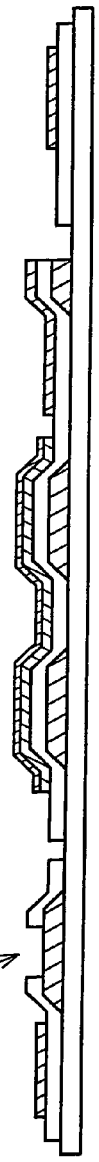
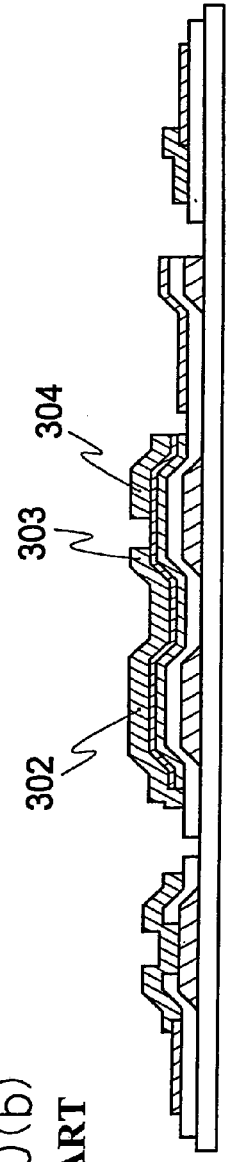
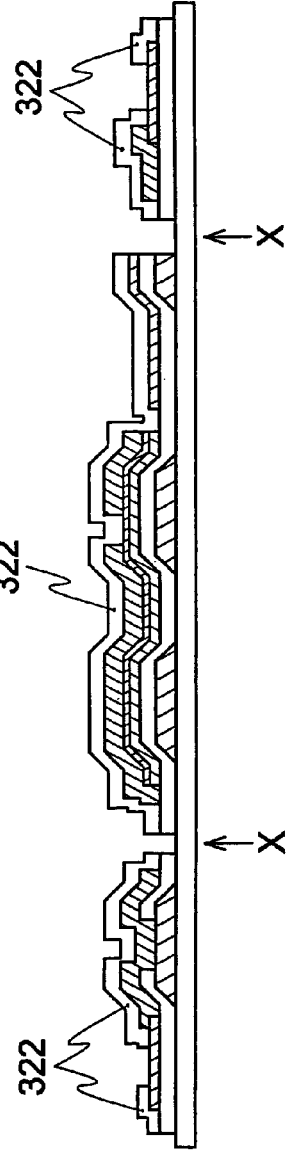
FIG. 60(a) PRIOR ART
FIG. 60(b) PRIOR ART
FIG. 60(c) PRIOR ART

LIQUID CRYSTAL DISPLAY

CROSS-REFERENCE TO RELATED APPLICATIONS

This application is a Divisional and claims the benefit of priority under 35 U.S.C. § 120 from U.S. application Ser. No. 10/973,619, filed Oct. 27, 2004 which is a divisional of U.S. application Ser. No. 09/805,039, filed Mar. 14, 2001, and claims the benefit of priority under 35 U.S.C. § 119 of Japanese Patent Applications Nos. 2000-072766, filed Mar. 15, 2000, 2000-082142, filed Mar. 23, 2000, and 2000-082141, filed Mar. 23, 2000. The entire contents of these applications are incorporated herein by reference.

BACKGROUND OF THE INVENTION

The present invention relates to a thin film transistor array substrate and a method of manufacturing the same. More particularly, the present invention relates to a method of manufacturing a thin film transistor array substrate having less point defect and line defect and capable of reducing a leakage current of a thin film transistor (TFT) by carrying out a photolithographic process four times, and enhances the display characteristic and productivity of a TFT-LCD.

An electro-optic element using a liquid crystal has been vigorously applied to a display. The electro-optic element using the liquid crystal generally has such a structure that the liquid crystal interposed between two substrates including electrodes in a vertical direction and a polarizing plate is provided in the vertical direction. In a transmission type, a back light is provided on a back face. The surfaces of the upper and lower electrode substrates are subjected to a so-called orientation processing, and a director to be an average direction of a liquid crystal molecule is controlled to be brought into a desirable initial state. The liquid crystal has a double refracting property, and a light incident through the polarizing plate from the back light is changed into an elliptically polarized light through the double refraction and is then incident on the polarizing plate on the opposite side. When a voltage is applied to the upper and lower electrodes in this state, the state of array of the director is changed so that a double refractive index of a liquid crystal layer is changed and the state of the elliptically polarized light incident on the polarizing plate on the opposite side. Accordingly, an intensity of the light transmitted through the electro-optic element and a spectrum thereof are varied. The electro-optic effect is varied depending on the type of a liquid crystal layer, an initial orientation state, the direction of an polarizing axis of the polarizing plate, a thickness of the liquid crystal layer or a color filter provided in the middle of a light transmission path or various interference films, which has been reported in detail by well-known papers or the like. In general, a structure referred to as TN or STN using a nematic liquid crystal layer is used.

Examples of an electro-optic element for a display using a liquid crystal include a simple matrix type and a TFT-LCD using a thin film transistor (TFT) as a switching element. The TFT-LCD having more characteristics than those of a CRT and a simple matrix type liquid crystal display in respect of portability and display quality has been widely put into practical use for a notebook type personal computer. The TFT-LCD generally has such a structure that a liquid crystal is interposed between a TFT array substrate having a TFT formed like an array and an opposed substrate having a color filter which is provided with a common electrode, a polarizing plate is provided above and under the structure, and furthermore, a back light is provided on the back. With such a structure, excellent color display can be obtained.

In order to apply a voltage to the liquid crystal in the TFT-LCD, the TFT is turned ON within a gate line selection time and electric charges are caused to flow from a source line to a pixel electrode and a pixel potential is set to be equal to the electric potential of the source line. Then, when a gate is brought into a non-selection state, the TFT is turned OFF so that the electric charges of a pixel are held. Actually, the amount of the electric charges of the pixels is decreased by the TFT and the leakage current in the liquid crystal. As a result, the electric potential of the pixel is reduced. In order to prevent the electric potential of the pixel from fluctuating, an auxiliary capacitor is usually provided to reduce the amount of a change in the electric potential of the pixel for a change in a unit charge amount is reduced. Moreover, a trial to decrease the number of FTF array manufacturing steps has been made to enhance the productivity of the TFT-LCD. A trial to eliminate a photolithographic step has been disclosed in Japanese Unexamined Patent Publication No. 202153/1994, Japanese Unexamined Patent Publication No. 328040/1996 and Japanese Unexamined Patent Publication No. 50308/1996.

FIG. 57 is a sectional view showing a pixel portion of a TFT array substrate manufactured at a five-time photolithographic step disclosed in a seventh embodiment of the Japanese Unexamined Patent Publication No. 50308/1996. In the conventional example, first of all, a first conductive metallic thin film such as Cr, Ta, Mo or Al is formed in a thickness of approximately 100 nm on a transparent substrate. Next, the first conductive metallic thin film is subjected to patterning at a first photolithographic step, thereby forming a gate electrode 51. At this time, if the first conductive metallic thin film is Cr, a wet etching treatment is carried out by using a $(NH_4)_2[Ce(NO_3)_6]+HNO_3+H_2O$ solution, for example. Then, a $SiN_x$ film, an a-Si film and an $n^+$a-Si film are provided in thicknesses of approximately 300 nm, 100 nm and 20 nm as a first insulating film 52, a semiconductor active film 53 and an ohmic contact film 54, respectively. At a second photolithographic step, next, the semiconductor active film 53 and the ohmic contact film 54 are subjected to patterning like an island in a state in which a semiconductor portion is isolated from other portions above a gate electrode. At this time, the semiconductor active film and the ohmic contact film are subjected to dry etching with $SF_6+HCl+He$, for example.

Next, a second metallic thin film such as Ti is formed in a thickness of approximately 300 nm. Then, the second metallic thin film and the ohmic contact film are subjected to patterning at a third photolithographic step so that a source line 55, a source electrode 56, a drain electrode 57 and a semiconductor active layer 58 of a thin film transistor are formed. Subsequently, an interlayer insulating film (passivation film) 59 is formed in a thickness of approximately 400 nm by a method such as plasma CVD. Next, the passivation film is subjected to the patterning at a fourth photolithographic step so that a contact hole 60 communicating with the drain electrode 57, a contact hole communicating with a gate line and a contact hole communicating with a source line are formed. At this time, the passivation film is subjected to the etching through dry etching using $SF_6+O_2$ or the like, for example. Then, a transparent conductive film comprising ITO is formed in a thickness of approximately 150 nm. Thereafter, the transparent conductive film is subjected to the patterning at a fifth photolithographic step to form a transparent pixel electrode 61, a terminal portion for source line connection and a terminal portion for gate line connection. At this time, the ITO film is subjected to wet etching by using an HCl+ HNO$_3$+H$_2$O solution, for example.

In the conventional art, thus, the method of manufacturing a TFT array at five photolithographic steps has been disclosed. The following effects have been described. More specifically, the five photolithographic steps are enough, resulting in an enhancement in yield and a reduction in cost. In addition, since the passivation film is not provided on the transparent pixel electrode, a voltage can be applied efficiently to the liquid crystal. Furthermore, since the transparent pixel electrode, the source line and the gate line are isolated from each other through an insulating film, there is no possibility that the source lines or the gate lines might be short-circuited due to the defective formation of the transparent pixel electrode. As the effects of the conventional art, moreover, the following has been described. More specifically, in the case in which a multilayered film of a metallic thin film and a barrier film made of a material oxidized or a material solidified as a conductive oxide to the transparent conductive film is sued for a first conductive metallic thin film, the barrier film further produces antioxidant effects to maintain contact property of these films with the transparent conductive film. Therefore, a signal delay is caused signal delay with difficulty. Furthermore, Al or Ta having high conductive property is used as a metallic thin film to reduce a thickness of the metallic thin film. Consequently, a step coverage of the whole TFT element can be enhanced and yield can be improved. In the TFT array structure, the gate line, the source line and the pixel electrode are isolated from each other through the insulating film. Therefore, there is also an advantage that a short-circuit is generated with difficulty and the yield can easily be enhanced.

FIGS. 59(*a*) to 59(*c*), 60(*a*) to 60(*c*) and 61(*a*) to 61(*d*) show an example of the TFT array structure to be used for a conventional active matrix type liquid crystal display (AMLCD). FIGS. 59(*a*) to 59(*c*) and 60(*a*) to 60(*c*) are an example of sectional views, FIG. 61(*a*) to 61(*d*) is a plan view, and FIGS. 59(*a*) to 59(*c*) and 60(*a*) to 60(*c*) show sectional structures of X-X in FIG. 61(*a*) to 61(*d*) and a gate—source terminal portion.

In FIGS. 59(*a*) to 59(*c*), 60(*a*) to 60(*c*) and 61(*a*) to 61(*d*), the reference numeral 311 denotes an insulating substrate, the reference numeral 313 denotes a gate electrode and a gate line, the reference numeral 314 denotes a pixel electrode formed of a transparent conductive film, the reference numeral 316 denotes a gate insulating film, the reference numeral 317 denotes a semiconductor layer (active layer), the reference numeral 318 denotes a semiconductor layer (ohmic contact layer) containing an impurity such as P or B, the reference numeral 322 denotes an insulating film such as SiN$_4$, the reference numeral 330 denotes a contact hole, the reference numeral 302 denotes a source line, the reference numeral 303 denotes a source electrode, and the reference numeral 304 denotes a drain electrode.

Description will be given to a method of manufacturing a TFT array substrate to be used for a conventional active matrix liquid crystal display (AMLCD). A layer of a substance comprising a metal such as Cr, Al or Mo, an alloy having them as a main component, a metal having them multilayered or the like is formed on the insulating substrate 311 by sputtering or the like. Next, a gate electrode, a gate line pattern 313 and the like are formed by using a photoresist or the like through photolithography and succeeding etching or the like (FIGS. 59(*a*) and 61(*a*)).

Next, an insulating film 316 comprising Si$_3$N$_4$, SiO$_2$ or the like to be a gate insulating film formed by various CVD methods such as plasma CVD, sputtering, evaporation, coating or the like, a semiconductor layer 317 comprising an a-Si:H film (amorphous silicon hydride film), and an ohmic contact layer 318 comprising an n$^+$a-Si:H film or a microcrystal n$^+$Si layer to be a semiconductor layer formed by the plasma CVD or sputtering and doped with an impurity such as phosphorus, antimony boron in order to take a contact with a metal are continuously formed. Then, a semiconductor layer (active layer) 317 in as a TFT portion, a gate line—source line cross section and the like and a semiconductor layer (ohmic contact layer) 318 containing an impurity such as P or B are formed by photolithography and succeeding etching or the like using a photoresist or the like (FIGS. 59(*b*) and 61(*b*)).

Then, a transparent conductive layer formed of a transparent conductive material such as ITO (Indium Tin Oxide) is provided by sputtering, evaporation, a sol-gel method and the like. Thereafter, a pixel electrode 314, a terminal electrode and the like are formed by photolithography and succeeding etching or the like by using the photoresist or the like (FIGS. 59(*c*) and 61(*c*)).

Subsequently, a pattern is formed such that a contact hole can be provided in a gate terminal portion or the like by the photolithography using the photoresist or the like. Then, the gate insulating film 316 is removed by dry etching or the like using a CF$_4$ based gas or the like. Thereafter, the photoresist is removed to form a contact hole 330 (see FIG. 60(*a*)).

Next, a layer of a substance comprising a metal such as Cr, Al or Mo, an alloy comprising them as a main component or a metal having them multilayered is formed by the sputtering or the like. Then, a source line 302, a source electrode 303 and a drain electrode 304 are formed by using the photoresist or the like through the photolithography and succeeding etching or the like (FIGS. 60(*b*) and 61(*d*)).

Thereafter, an insulating film 322 such as Si$_3$N$_4$, SiO$_2$ or their multilayered layer, that is, Si$_3$N$_4$ to act as a gate insulating film is formed by various CVD methods such as plasma CVD, sputtering, evaporation, coating and the like. Next, a photoresist or the like is used to remove an insulating film in a terminal portion or the like through the photolithography and succeeding dry etching using a CF$_4$ based gas or the like such that a signal can be input from an external TCP or the like to each wiring. Consequently, a TFT array is formed (FIG. 60(*c*)).

Subsequently, an orientation film is formed on the TFT array and counter electrodes are opposed and a liquid crystal is interposed therebetween. Thus, an active matrix type liquid crystal display is formed.

In the seventh embodiment of the Japanese Unexamined Patent Publication No. 50308/1996, there has been disclosed a technique in which the semiconductor layer 53 is isolated like an island. In the case in which a source line is formed of a single metal layer and is patterned by wet etching, etching liquid enters a metal and semiconductor interface from a step portion of the semiconductor layer to cause a disconnection if a source metal has poor adhesion in the step portion. As disclosed in Japanese Unexamined Patent Publication No. 268353/1998, it is preferable that a semiconductor pattern should be extended under the source line. FIG. 58 is a plan view showing a thin film transistor in which the semiconductor layer 53 is isolated. In general, a leakage current easily flows to a semiconductor end face. With such a structure, therefore, an end face leak path 62 provided from a source electrode 56 to a drain electrode 57 is present to increase a leakage current of the thin film transistor. Consequently, the display quality of a display is greatly affected, for example, a contrast is reduced, a luminescent spot is increased during use at a high temperature (in the case of normally white).

On the other hand, there has been disclosed a technique in which the photolithographic process is carried out five times in the state in which the gate line, the source line and the pixel electrode are isolated. However, a technique in which the photolithographic process is reduced has not been disclosed. It is an object of the present invention to carry out the photolithographic step four times while maintaining the above-mentioned structure, to have no semiconductor layer step under a source electrode or a source line and to efficiently prevent display defects from being caused by the end face leakage of the semiconductor layer, thereby maintaining display quality and yield, and furthermore, enhancing productivity.

Moreover, in the case in which the TFT array is to be formed by using a conventional manufacturing method, the photolithographic step should be carried out at least five times. Therefore, a manufacturing process is prolonged. In particular, there is a problem in that an exposing step having a high operation cost for production equipment is often used. For this reason, the cost of the TFT array to be fabricated is necessarily increased.

The present invention has been made to solve the above-mentioned problems of the conventional art, and has an object to decrease the number of photolithographic steps required for manufacturing the TFT array, and furthermore, to reduce the number of masks, thereby improving productivity and reducing a cost.

In the case in which the TFT array is to be fabricated by using a conventional manufacturing method, the photolithographic step should be carried out at least five times. Therefore, the manufacturing process is prolonged. In particular, there is a problem in that an exposing step having a high operation cost for production equipment is often used. For this reason, the cost of the TFT array to be fabricated is necessarily increased.

It is an object of the present invention to reduce the number of photolithographic steps (the number of masks) required for manufacturing the TFT array in order to enhance the productivity of an active matrix type liquid crystal display or to reduce a cost thereof.

SUMMARY OF THE INVENTION

A first aspect of the present invention is directed to a thin film transistor array substrate comprising an insulating substrate, a first metal pattern formed on the insulating substrate, an insulating film on the first metal pattern, a semiconductor pattern formed on the insulating film, and a second metal pattern formed on the semiconductor pattern, the semiconductor pattern including the second metal pattern.

A second aspect of the present invention is directed to a thin film transistor array substrate comprising an insulating substrate, a gate line formed on the substrate, a gate insulating film formed on the gate line, a semiconductor layer formed on the gate insulating film, a source line formed on the semiconductor layer, a source electrode, a drain electrode, an interlayer insulating film formed on the source line, the source electrode and the drain electrode, and a pixel electrode formed on the interlayer insulating film, the semiconductor pattern including the source line, the source electrode and the drain electrode and having a first contact hole penetrating through the interlayer insulating film and reaching the drain electrode, a second contact hole reaching the source line and a third contact hole penetrating the gate insulating film and reaching the gate line, the first to third contact holes being covered with a pattern of a pixel electrode material.

A third aspect of the present invention is directed to a method of manufacturing a thin film transistor array substrate comprising the steps of forming a first metallic thin film on an insulating substrate, forming a gate line at a first photolithographic step and an etching step, forming a gate insulating film, a semiconductor film and an ohmic film, and a second metal film, forming a resist pattern in corresponding portions of a source line, a source electrode, a drain electrode and a semiconductor active layer of a thin film transistor at a second photolithographic step such that a thickness of the resist in the corresponding portion of the semiconductor active layer is smaller than that in other portions, etching the second metal film to form the source line, the source electrode and the drain electrode, etching the ohmic contact film and the semiconductor film, reducing the thickness of the resist, removing the resist in the corresponding portion of the active layer of the thin film transistor, etching the second metal film to remove the second metal film on the corresponding portion of the semiconductor active layer, removing the ohmic film on the corresponding portion of the semiconductor active layer, forming an interlayer insulating film, patterning the gate insulating film and the interlayer insulating film at a third photolithographic step and an etching step, forming a first contact hole reaching the drain electrode, a second contact hole reaching the source line and a third contact hole reaching the gate line, forming a conductive film, forming a pixel electrode to be connected to the drain electrode through the first contact hole at a fourth photolithographic step and an etching step, forming a source terminal to be connected to the source line through the second contact hole, and forming a gate terminal to be connected to the gate line through the third contact hole.

In order to reduce the number of photolithographic steps, a fourth aspect of the present invention is directed to a method comprising the steps of forming a gate electrode and a gate line to be upper layers of a transparent conductive layer with such a structure that the gate electrode and gate line and a pixel electrode are constituted by at least two layers of the transparent conductive layer and a metal layer and simultaneously patterning them to form respective predetermined patterns, forming a region X in which a thickness of a photoresist is greater in a portion leaving a semiconductor layer, a region Z in which the photoresist in such a portion as to expose at least the pixel electrode is removed, and a region Y in which the thickness of the photoresist in other portions is smaller than that of a semiconductor layer portion, etching the semiconductor layer and a gate insulating layer with the same pattern by using the photoresist, thereby exposing the pixel electrode, removing, through etching, a layer from an upper metal in a two-layered structure including a gate line material and a transparent conductive material which are formed of a metal in the exposed pixel electrode, removing the photoresist from the region Y while leaving the photoresist in the region X, and removing the semiconductor layer in portions other than the region X. Thus, the number of photolithographic steps can be reduced.

In order to reduce the number of photolithographic steps, a fifth aspect of the present invention is directed to a method comprising the steps of forming a gate insulating film and a semiconductor layer on a gate electrode and a gate line, forming a region A in which a thickness of a photoresist is greater in a portion leaving a semiconductor layer, a region C in which the photoresist is removed to etch at least the gate insulating film and the semiconductor layer and to expose a part of the gate electrode and the gate line and a region B in which the thickness of the photoresist in other portions is smaller than that of the semiconductor layer portion, etching the semiconductor layer and a gate insulating layer with the same pattern by using the photoresist, thereby exposing at least a part of the gate line, removing the photoresist from the region B while leaving the photoresist in the region A, and removing the semiconductor layer in portions other than the region A, and furthermore, comprising the steps of forming two layers including a transparent electrode and a metal film provided thereon, forming a source/drain electrode wiring and a pixel electrode by using a photoresist pattern simultaneously forming the source/drain electrode wiring and the pixel electrode, forming a protective film thereon, removing at least a portion on the pixel electrode where light is transmitted and a protective film on a connecting part in a terminal portion of a source/gate line, and removing a metal layer provided to form the source/drain electrode wiring in that portion. Consequently, the number of photolithographic steps can be reduced to four.

BRIEF DESCRIPTION OF THE DRAWINGS

FIGS. 29(a) and 29(b) are sectional views showing a manufacturing process of the TFT array substrate according to the present invention;

FIGS. 30(a) and 30(b) are sectional views showing the manufacturing process of the TFT array substrate according to the present invention;

FIGS. 31(a) to 31(c) are sectional views showing the manufacturing process of the TFT array substrate according to the present invention;

FIGS. 59(a) to 59(c) are sectional views showing a process for manufacturing a TFT array substrate of a conventional active matrix type liquid crystal display;

FIGS. 60(a) to 60(c) are sectional views showing the process for manufacturing a TFT array substrate of the conventional active matrix type liquid crystal display;

DETAILED DESCRIPTION

Embodiment 1

Figure 1:
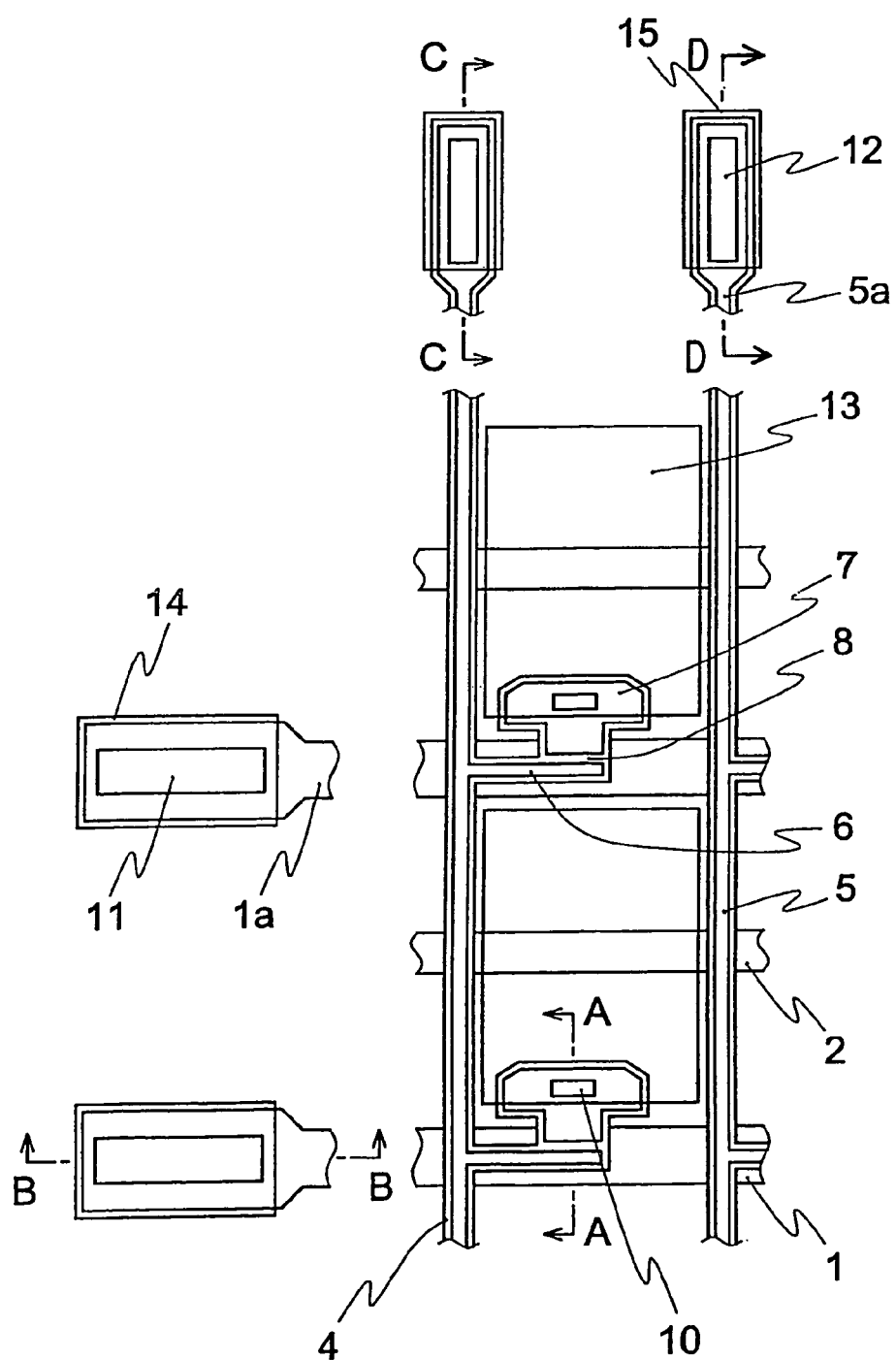
FIG. 1 is a plan view showing a thin film transistor array according to a first embodiment of the present invention.
Figure 2A:
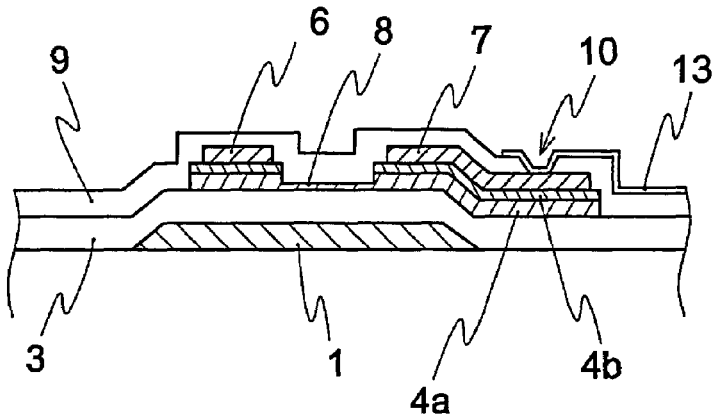
FIG. 2(a) is a sectional view taken along the line A-A in FIG. 1.
Figure 2B:
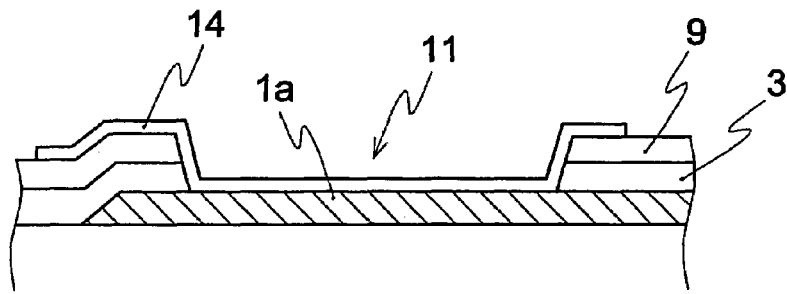
FIG. 2(b) is a sectional view taken along the line B-B in FIG. 1.
Figure 2C:
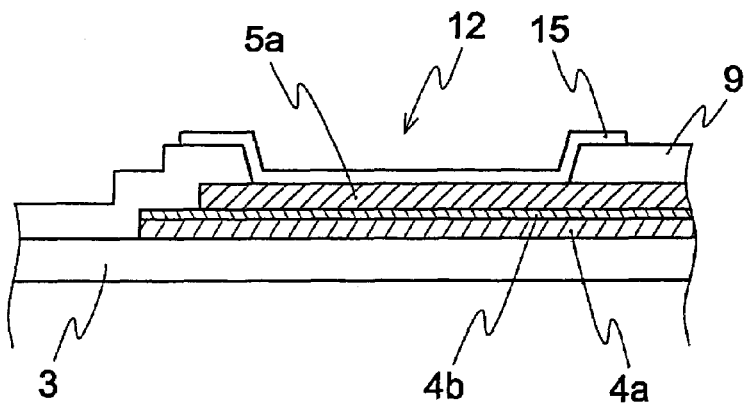
FIG. 2(c) is a sectional view taken along the line C-C in FIG. 1.

FIGS. 1 and 2(a) to 2(c) show a thin film transistor array substrate according to embodiment 1 of the present invention. FIG. 1 is a plan view, FIG. 2(a) is a sectional view taken along the line A-A in FIG. 1, FIG. 2(b) is a sectional view taken along the line B-B in FIG. 1, and FIG. 2(c) is a sectional view taken along the line C-C in FIG. 1. In FIGS. 1 and 2(a) to 2(c), the reference numeral 1 denotes a gate line, the reference numeral 1a denotes a gate terminal portion metal pad, the reference numeral 2 denotes an auxiliary capacity wiring, the reference numeral 3 denotes a gate insulating film, the reference numeral 4 denotes a semiconductor pattern, the reference numeral 4a denotes a semiconductor layer (semiconductor active film), the reference numeral 4b denotes an ohmic layer (ohmic contact layer), the reference numeral 5 denotes a source line, the reference numeral 5a denotes source terminal portion metal pad, the reference numeral 6 denotes a source electrode, the reference numeral 7 denotes a drain electrode, the reference numeral 8 denotes a semiconductor active layer of a thin film transistor, the reference numeral 9 denotes an interlayer insulating film, the reference numeral 10 denotes a drain electrode contact hole, the reference numeral 11 denotes a gate terminal portion contact hole, the reference numeral 12 denotes a source terminal portion contact hole, the reference numeral 13 denotes a pixel electrode, the reference numeral 14 denotes a gate terminal connecting pad, and the reference numeral 15 denotes a source terminal connecting pad.

Figure 3:
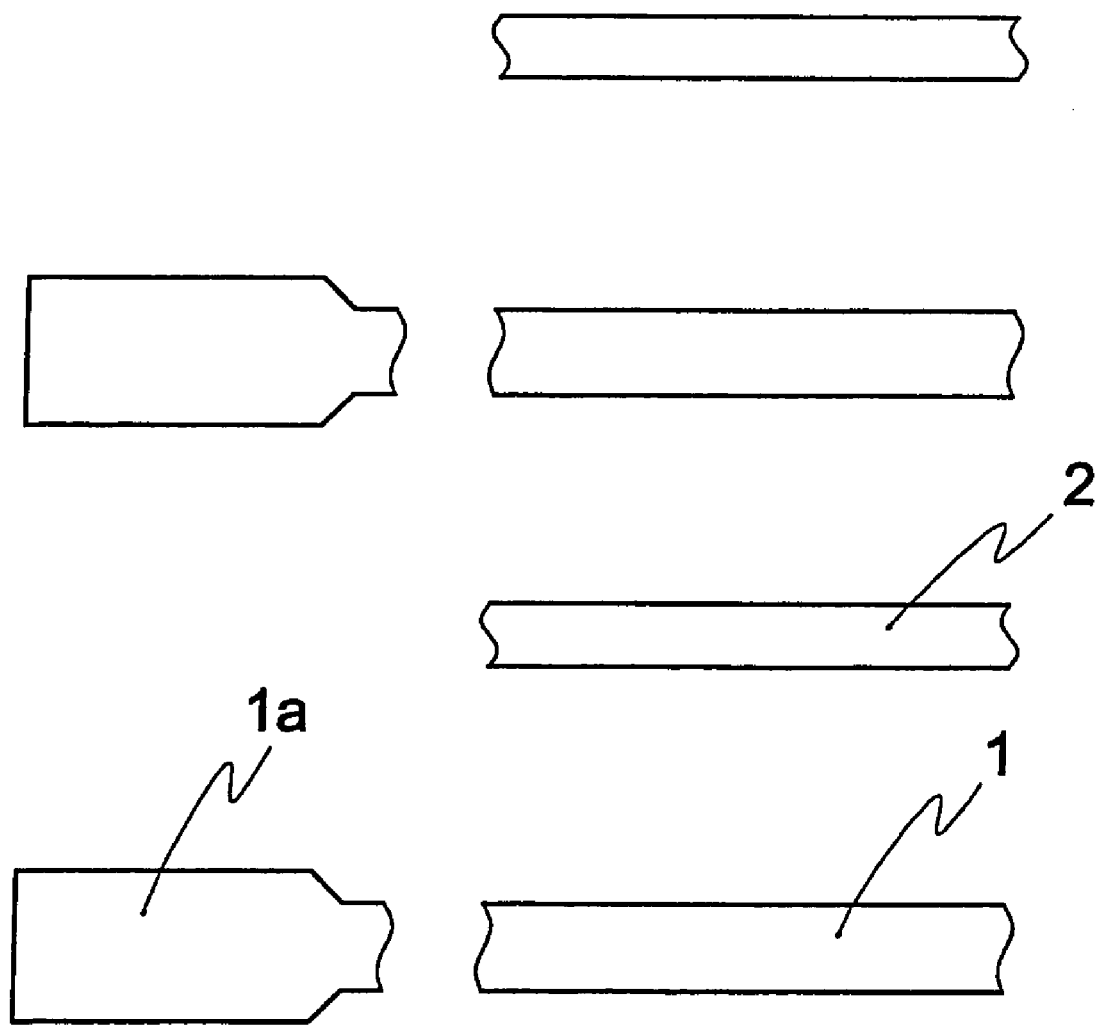
FIG. 3 is a plan view showing the thin film transistor array at each step according to EMBODIMENT 1 of the present invention.
Figure 7:
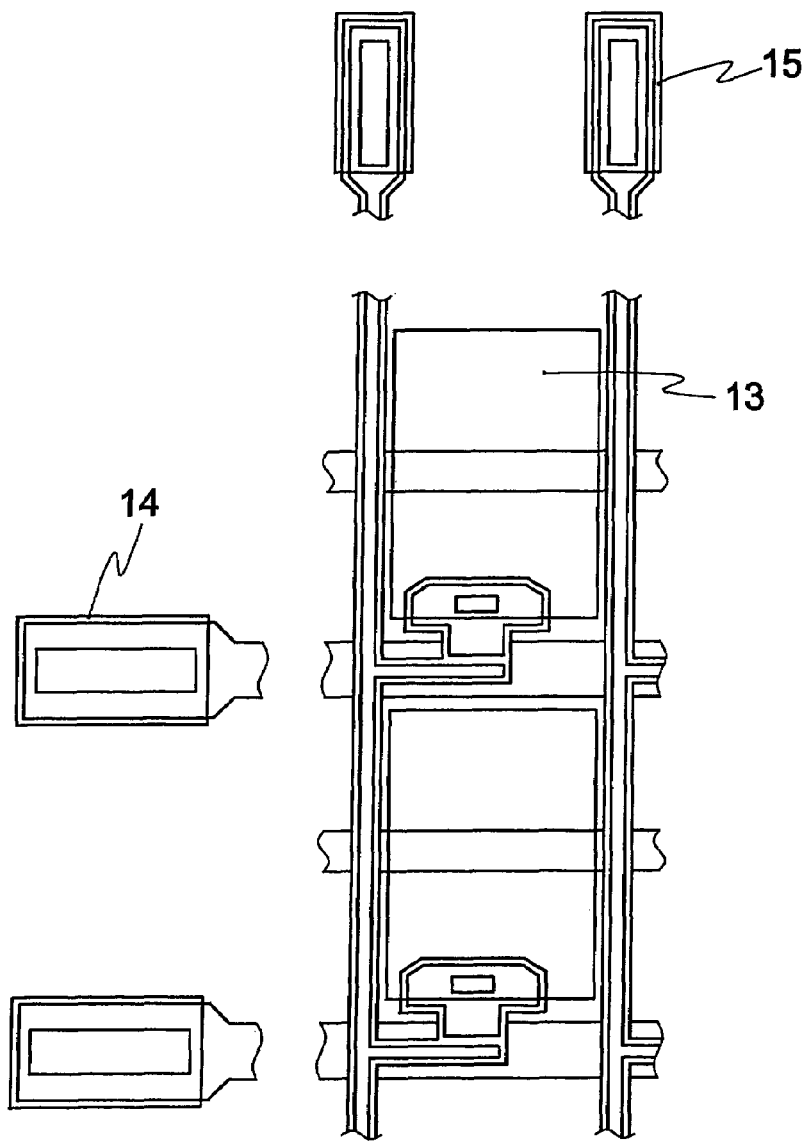
FIG. 7 is a plan view showing the thin film transistor array at each step according to EMBODIMENT 1 of the present invention.
Figure 8:
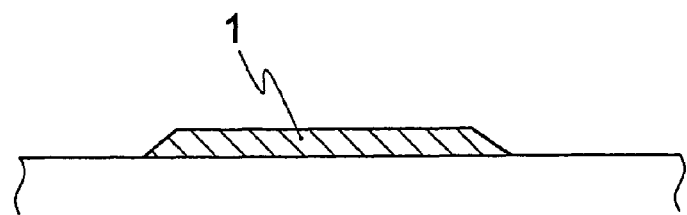
FIG. 8 is a sectional view taken along the line A-A in FIG. 1 at each step according to EMBODIMENT 1 of the present invention.
Figure 9:
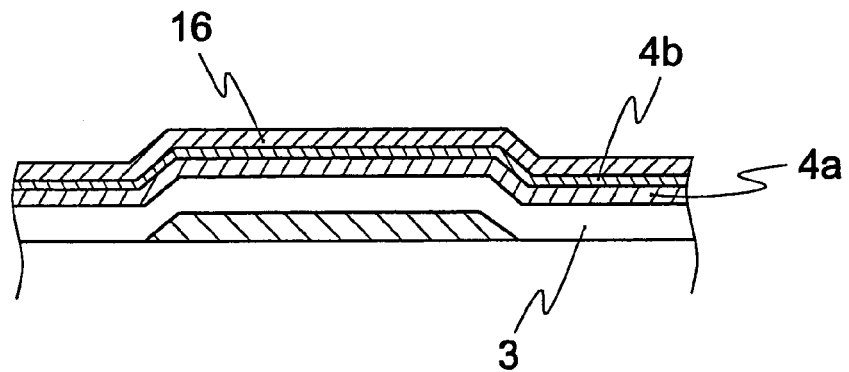
FIG. 9 is a sectional view taken along the line A-A in FIG. 1 at each step according to EMBODIMENT 1 of the present invention.
Figure 10:
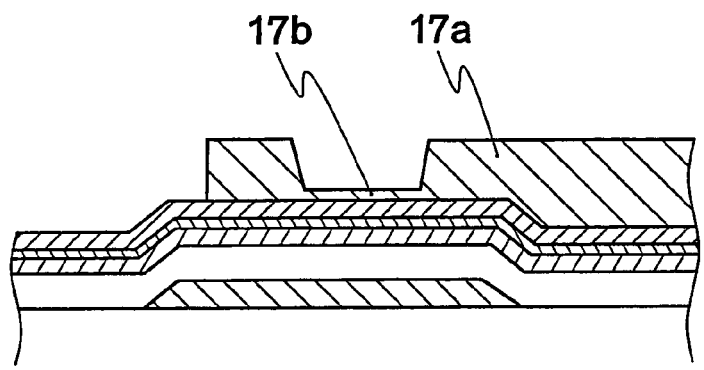
FIG. 10 is a sectional view taken along the line A-A in FIG. 1 at each step according to EMBODIMENT 1 of the present invention.

Next, a manufacturing method will be described. FIGS. 3 to 7 are plan views showing each step, and FIGS. 8 to 14 are sectional views taken along the line A-A in FIG. 1 at each step. First of all, a first conductive metallic thin film such as Cr, Ta, Mo or Al is formed in a thickness of approximately 400 nm on a transparent substrate. Then, the first conductive metallic thin film is subjected to patterning at a first photolithographic step. As shown in FIGS. 3 and 8, the gate line 1, the gate terminal portion metal pad 1a and the auxiliary capacitance line 2 are formed. At this time, in the case in which the first conductive metallic thin film is Cr, wet etching is carried out with an $(NH_4)_2[Ce(NO_3)_6]+HNO_3+H_2O$ solution, for example. As shown in FIG. 9, next, a $SiN_x$ film, an a-Si film, an n$^+$a-Si film and Cr are provided as a gate insulating film 3, a semiconductor active film 4a, an ohmic contact film 4b and a second metal film 16 in thicknesses of approximately 400 nm, 150 nm, 30 nm and 400 nm, respectively. The $SiN_x$ film, the a-Si film and the n$^+$a-Si film are formed by using a plasma CVD device, and $PH_3$ is doped to form n$^+$a-Si during the formation of the ohmic layer. The Cr film is formed by using a DC magnetron type sputtering device.

Figure 4:
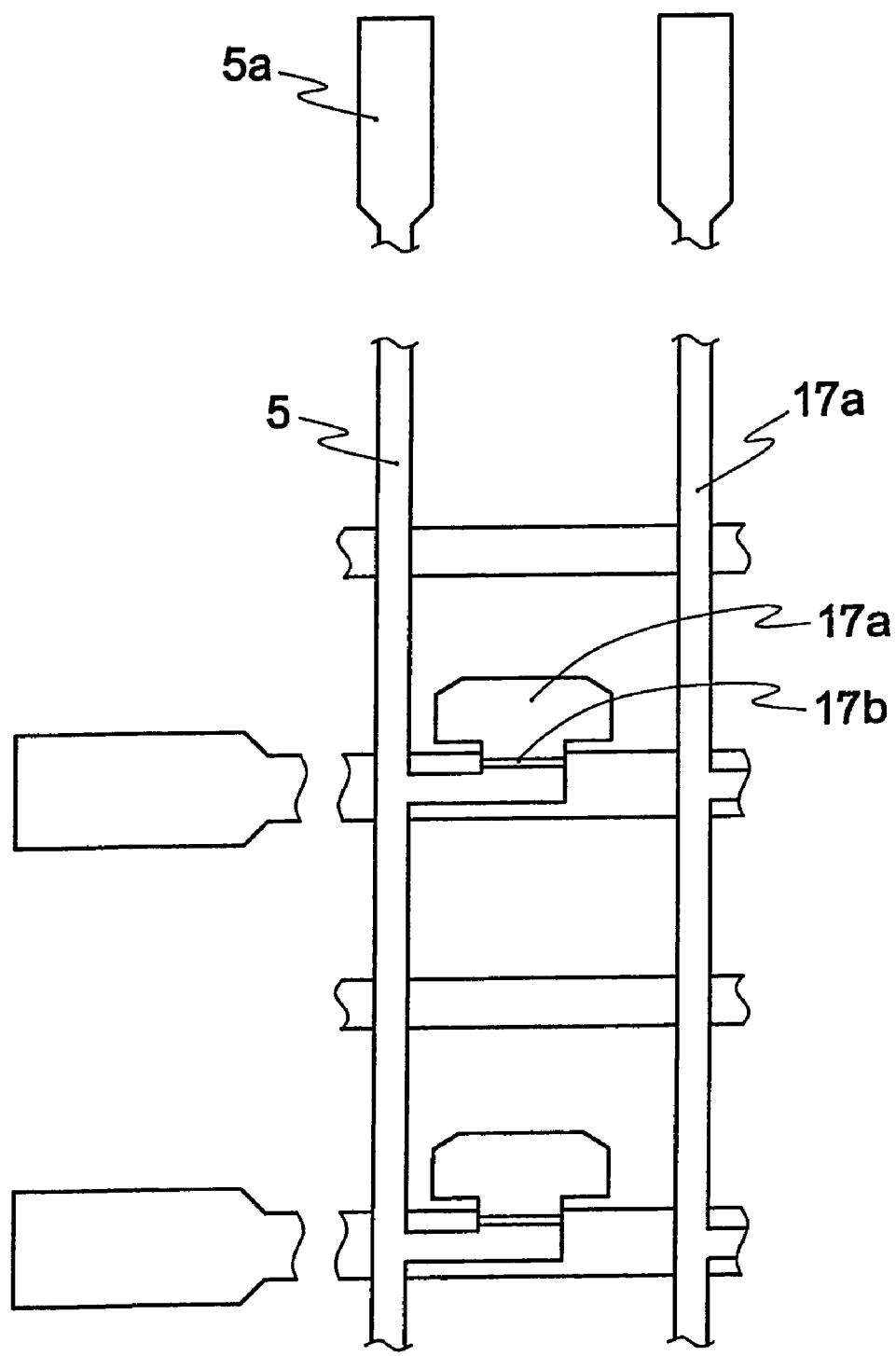
FIG. 4 is a plan view showing the thin film transistor array at each step according to EMBODIMENT 1 of the present invention.

Next, a resist pattern 17a having an ordinary thickness for forming the source line 5, the source terminal portion metal pad 5a and the drain electrode 7 and a thin film resist pattern 17b for forming the semiconductor active layer 8 of the thin film transistor are provided at a second photolithographic step as shown in FIG. 4. A novolak resin based positive resist is used and the resist is coated in a thickness of 1.5 μm by a spin coater. After the resist is coated, prebaking is carried out for 90 seconds at a temperature of 120° C. Then, exposure is carried out for 1000 milliseconds by using a mask pattern including the resist pattern 17a and the resist pattern 17b. Thereafter, additional exposure is carried out for 400 milliseconds by using a mask pattern capable of exposing only the resist pattern 17b in a semiconductor active layer portion. By carrying out the exposure in two stages, the resist pattern 17a having an ordinary thickness and the thin film resist pattern 17b have different thicknesses. An exposing machine is of a stepper or mirror projection type, and g rays and h rays of a high pressure mercury are used for a light source. Subsequently, development is carried out by using an organic alkali based developing solution and postbaking is then carried out for 180 seconds at a temperature of 100° C. to 120° C. Consequently, a solvent in the resist is volatilized and the adhesion of the resist and Cr is increased. By these processes, the resist of the thin film transistor portion has a shape shown in FIG. 10. A thickness of the resist film of the resist pattern 17a having an ordinary thickness is approximately 1.4 μm and a thickness of the resist of the thin film resist pattern 17b is approximately 0.4 μm.

Figure 11:
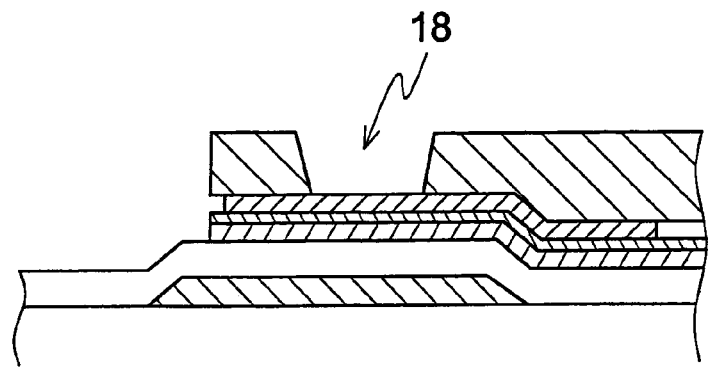
FIG. 11 is a sectional view taken along the line A-A in FIG. 1 at each step according to EMBODIMENT 1 of the present invention.

Then, oven baking is further carried out at a temperature of 120° C. to 130° C. Thus, the adhesion of the resist and Cr is further increased. At this time, if a baking temperature is too high, a resist end face is becomes inactive, to which care should be given. Thereafter, the Cr film 16 is etched with the $(NH_4)_2[Ce(NO_3)_6]+HNO_3+H_2O$ solution. Thereafter, the ohmic film 4b and the semiconductor film 4a are etched with an $HCl+SF_6+He$ gas. Subsequently, the resist is subjected to ashing through oxygen plasma and the thin film resist pattern 17b is removed so that the Cr film of the corresponding portion of the thin film transistor active layer 8 is exposed as shown in FIG. 11. The ashing is carried out at a pressure of 40 Pa for 60 seconds. During the ashing, the size of a resist opening indicated as 18 in FIG. 11 can be controlled in a RIE mode more easily than in PE mode.

Figure 5:
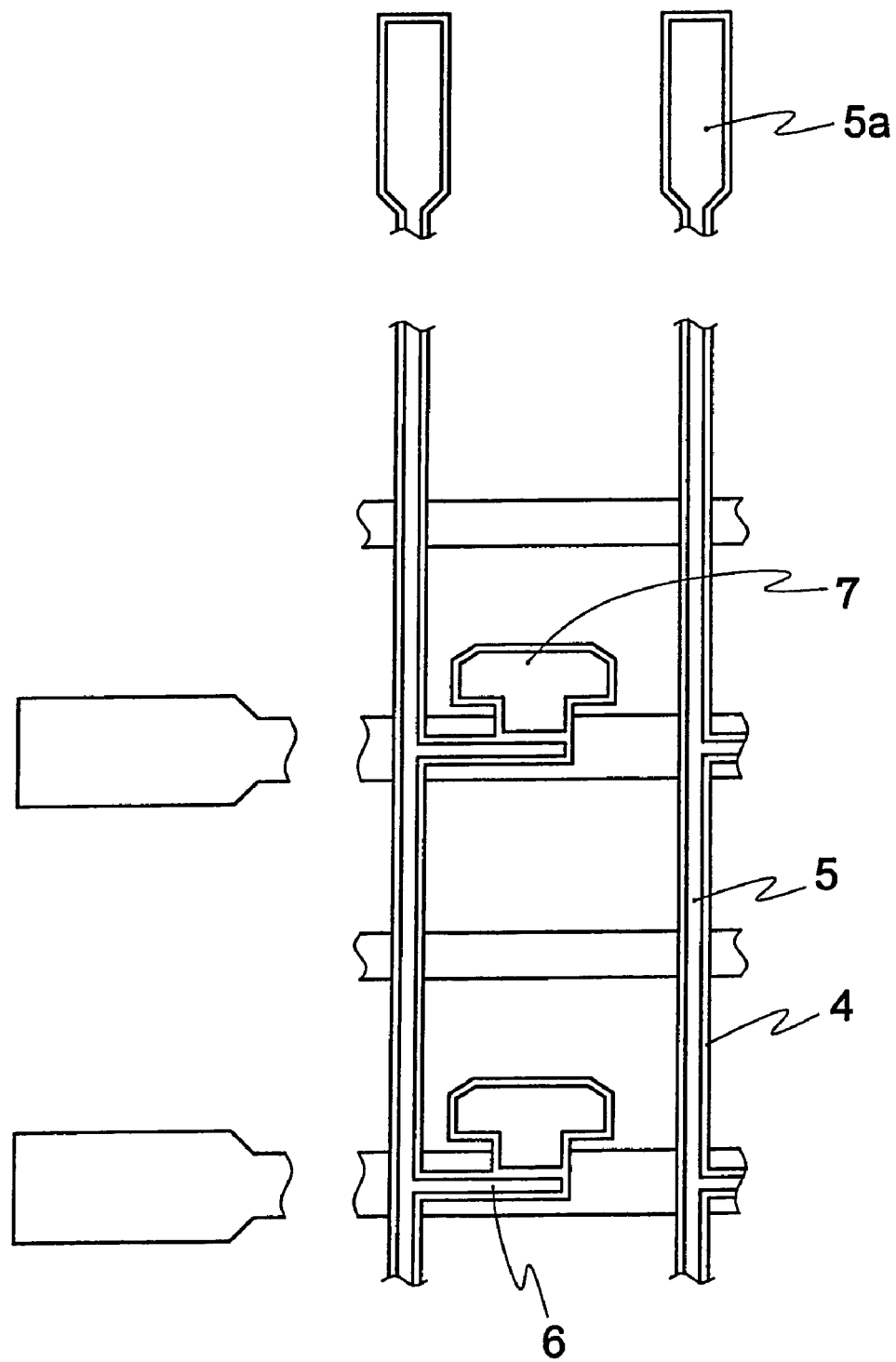
FIG. 5 is a plan view showing the thin film transistor array at each step according to EMBODIMENT 1 of the present invention.
Figure 12:
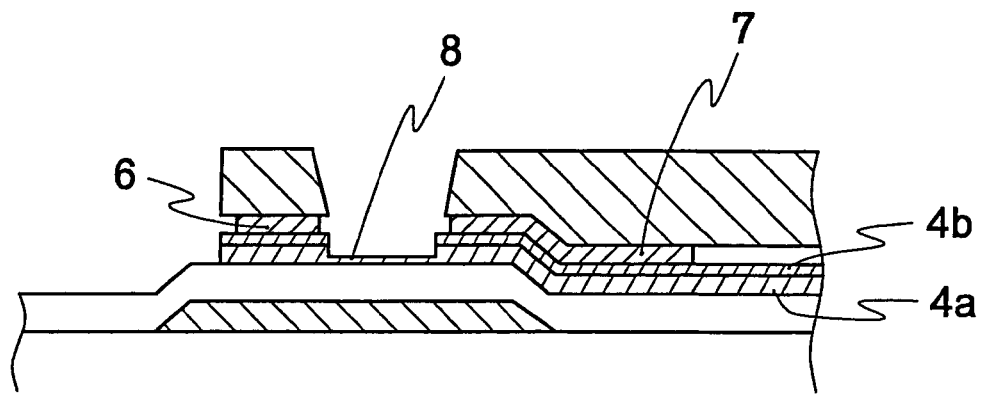
FIG. 12 is a sectional view taken along the line A-A in FIG. 1 at each step according to EMBODIMENT 1 of the present invention.

Then, the oven baking is carried out at a temperature of 130° C. to 140° C. Thereafter, the Cr film 16 in the opening 18 is etched with the $(NH_4)_2[Ce(NO_3)_6]+HNO_3+H_2O$ solution. At this time, the whole Cr pattern is subjected to side etching. Therefore, the Cr pattern is made thinner by approximately 1.5 to 2 μm than an a-Si pattern (the inner side of the a-Si Pattern). Consequently, it is possible to suppress a leakage current from flowing through an a-Si pattern end face from the source electrode to the drain electrode. For the Cr etching, overetching is required to some extent. It is desirable that the amount of the overetching should be approximately 50%. As shown in FIG. 12, subsequently, the ohmic layer 4b and the semiconductor layer 4a in the corresponding portion of the semiconductor active layer 8 are partially etched by approximately 100 nm in total by using $SF_6+HCl$. Then, when the resist is removed, the semiconductor pattern 4, the source line 5, the source electrode 6, the drain electrode 7 and the source terminal portion metal pad 5a are formed as shown in FIG. 5.

Figure 6:
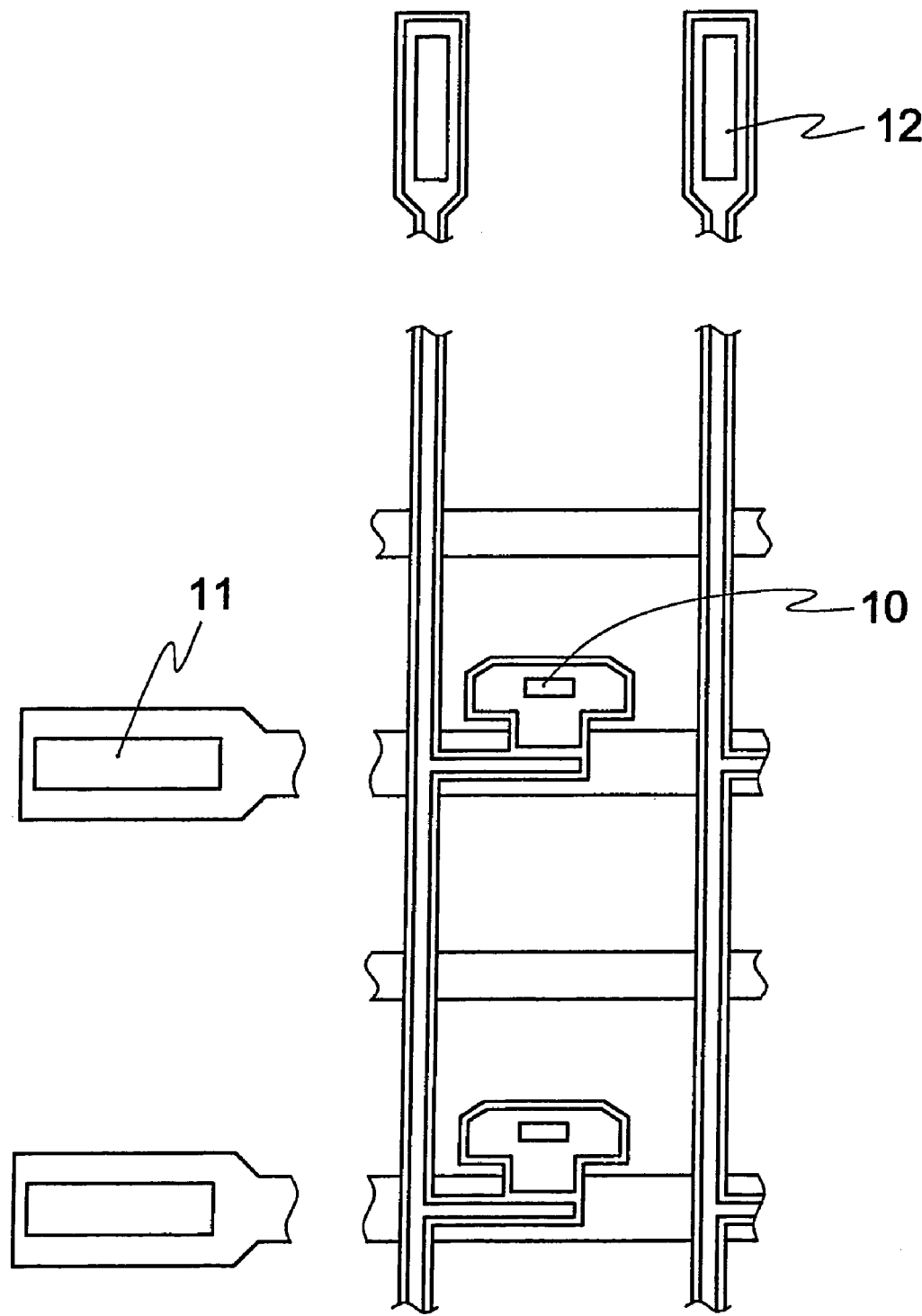
FIG. 6 is a plan view showing the thin film transistor array at each step according to EMBODIMENT 1 of the present invention.
Figure 13:
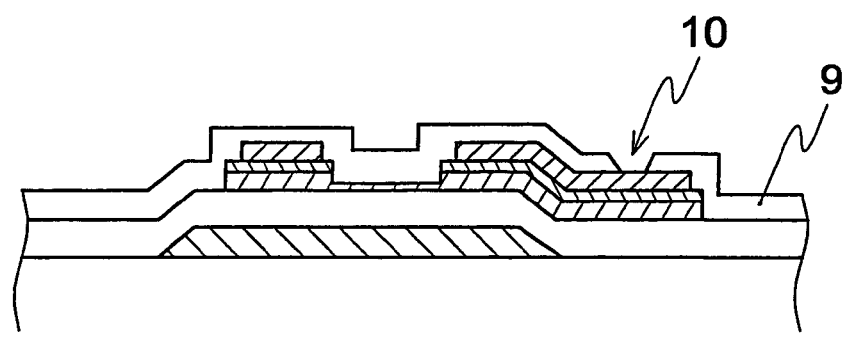
FIG. 13 is a sectional view taken along the line A-A in FIG. 1 at each step according to EMBODIMENT 1 of the present invention.
Figure 14:
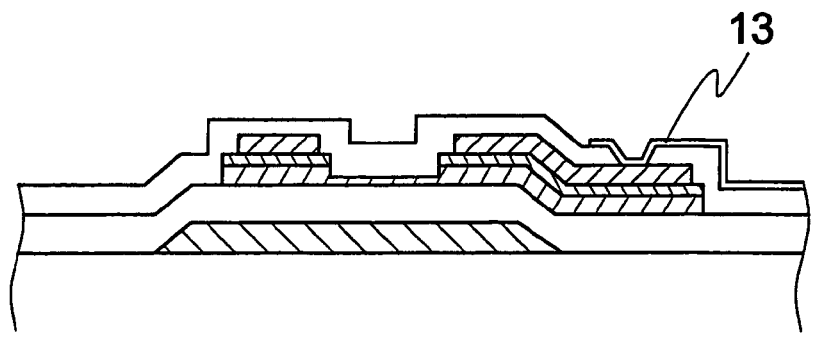
FIG. 14 is a sectional view taken along the line A-A in FIG. 1 at each step according to EMBODIMENT 1 of the present invention.

As shown in FIGS. 6 and 13, next, $SiN_x$ to be the inter-layer insulating film is formed in a thickness of 300 nm by using a PCVD device, and is subjected to patterning at a third photolithographic step. Consequently, a contact hole 10 communicating with the drain electrode 7, a contact hole 11 communicating with the gate terminal portion metal pad 1a and a contact hole 12 communicating the source terminal portion metal pad 15 shown in FIGS. 2(a), 2(b), 2(c), 6 and 13 are formed through dry etching using $CF_4O_2$. As shown in FIGS. 7 and 14, subsequently, a transparent conductive film comprising ITO is formed in a thickness of approximately 100 nm by using a DC magnetron type sputtering device as shown in FIGS. 7 and 14. Then, the ITO is subjected to patterning at a fourth photolithographic step to form the transparent pixel electrode 13, the gate terminal portion pad 14 and the source terminal portion pad 15. At this time, the ITO film is subjected wet etching by using the $HCl+HNO_3+H_2O$ solution, for example.

The thin film transistor array substrate thus manufactured is created at the fourth photolithographic step and a semiconductor step is not present under the source line. Therefore, a source disconnection is generated with difficulty, and the patterns of the source electrode and the drain electrode are included in the semiconductor pattern and do not cross each other. Therefore, a leakage current in the thin film transistor portion can be reduced. Moreover, the second metal film 16 is formed of a single metal. Consequently, it is sufficient that the second metal film 16 is etched twice. Furthermore, Cr is used for the metal. Therefore, when the pixel is to be formed of the ITO, it is possible to prevent a source line or the like from being corroded with an etchant through a pinhole provided in the interlayer insulating film 9.

Figure 2D:
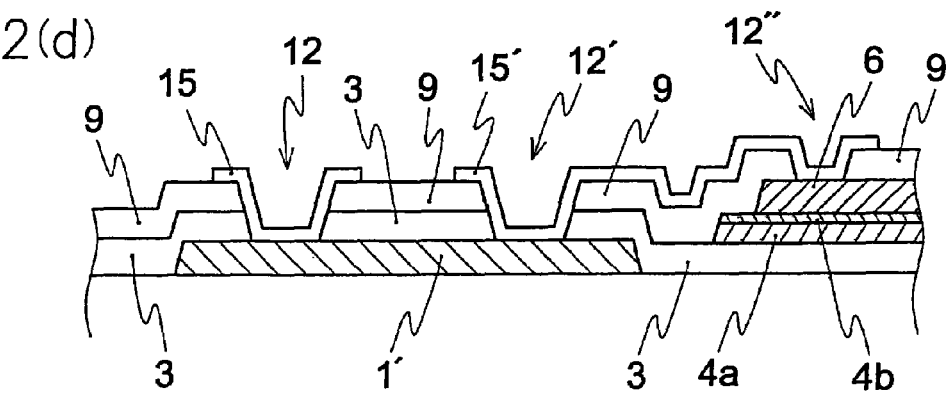
FIG. 2(d) is a sectional view taken along the line D-D in FIG. 1.

FIG. 2(a) is a sectional view of a TFT portion, FIG. 2(b) is a sectional view of a gate terminal portion, FIGS. 2(c) and 2(d) are sectional views of each source terminal portion. The source terminal may be formed of source line layer 5a as shown in FIG. 2(c). Alternatively, the source terminal may be formed of the material of the gate line 1, into which source line layer 5a is converted at an intervening part of source terminal as shown in FIG. 2(d). The intervening part where the source line layer 5a is converted into the gate line 1 is situated under a repair line for the source line, where the repair line is formed of a material of the source line, or in the vicinity of a seal portion or liquid crystal portion. By virtue of converting the material of the source line into the material of the gate line, the source line can be prevented from being corroded in the vicinity of the source terminal portion, so that disconnection of the source line can be avoided.

FIG. 2(a) is a sectional view of the TFT, FIG. 2(b) of the gate terminal and FIG. 2(c), (d) of the source terminal. Source terminal may be formed using the source line layer 5a connected to a transparent conductive film 15 thereon, preferably converted to the gate line material 1 in a point of its route. The point converting the material of source terminal (line) may be under a repair line serving for source lines (in this case, the repair line is formed of source line layer material) or a vicinity of sealing portion of pairing substrates or in a region of liquid crystal. Conversion of the source terminal (line) material saves from anticipated cut off of the source line by a corrosion in the vicinity of the source terminal.

Source terminal structure in case of converting the material of the source line to the material of the gate line 1 is illustrated in FIG. 2(d). In the process of forming the gate line pattern, a conversion line for source line 1' is formed.

Figure 64:
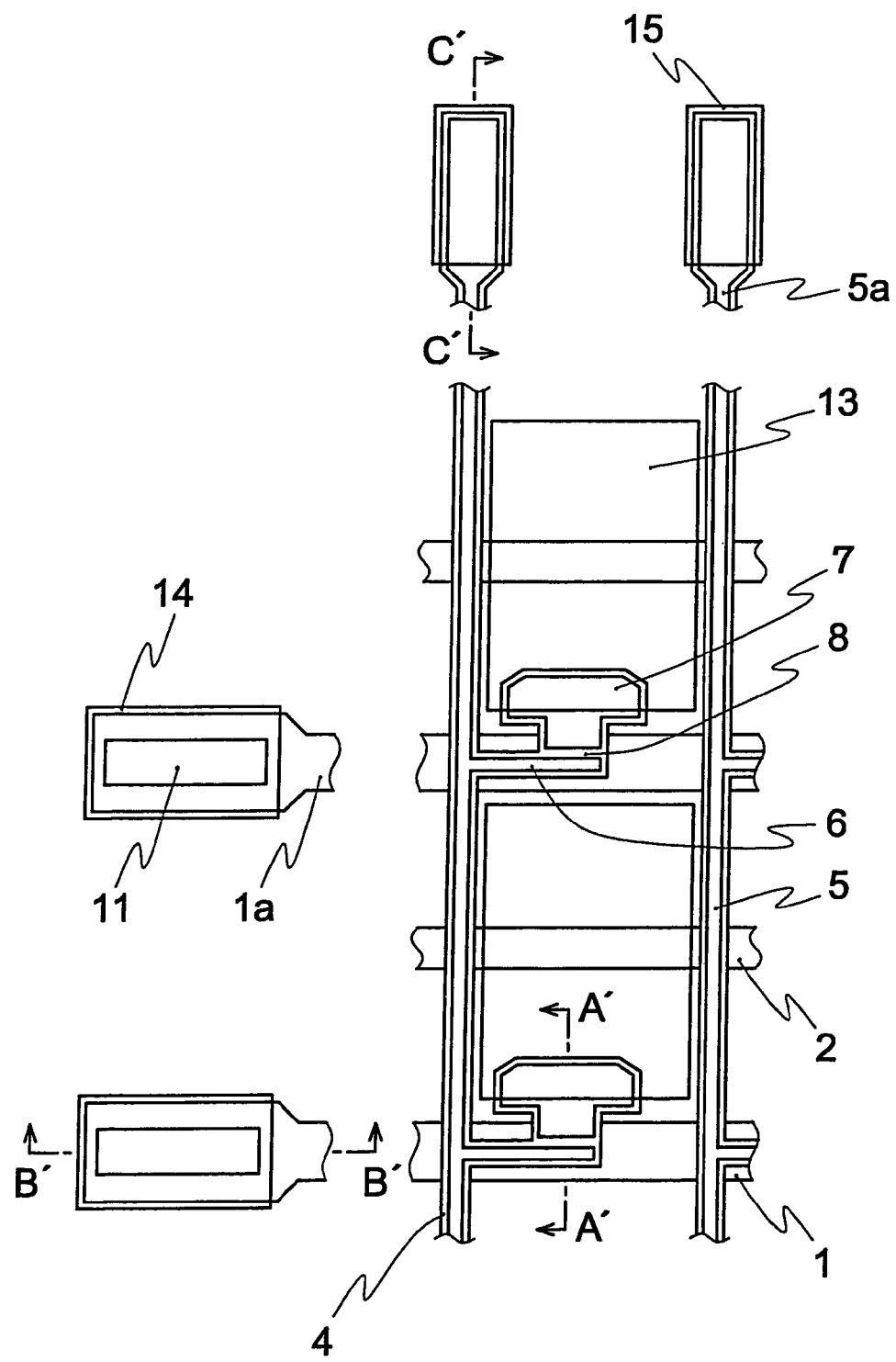
FIG. 64 is a plan view corresponding to FIG. 1.
Figure 65A:
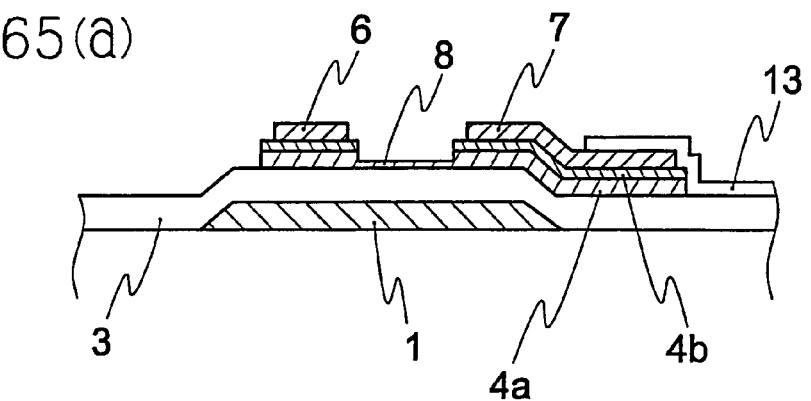
FIGS. 65(a) to 65(d) are explanatory views respectively corresponding to FIGS. 2(a) to 2(d)
Figure 66:
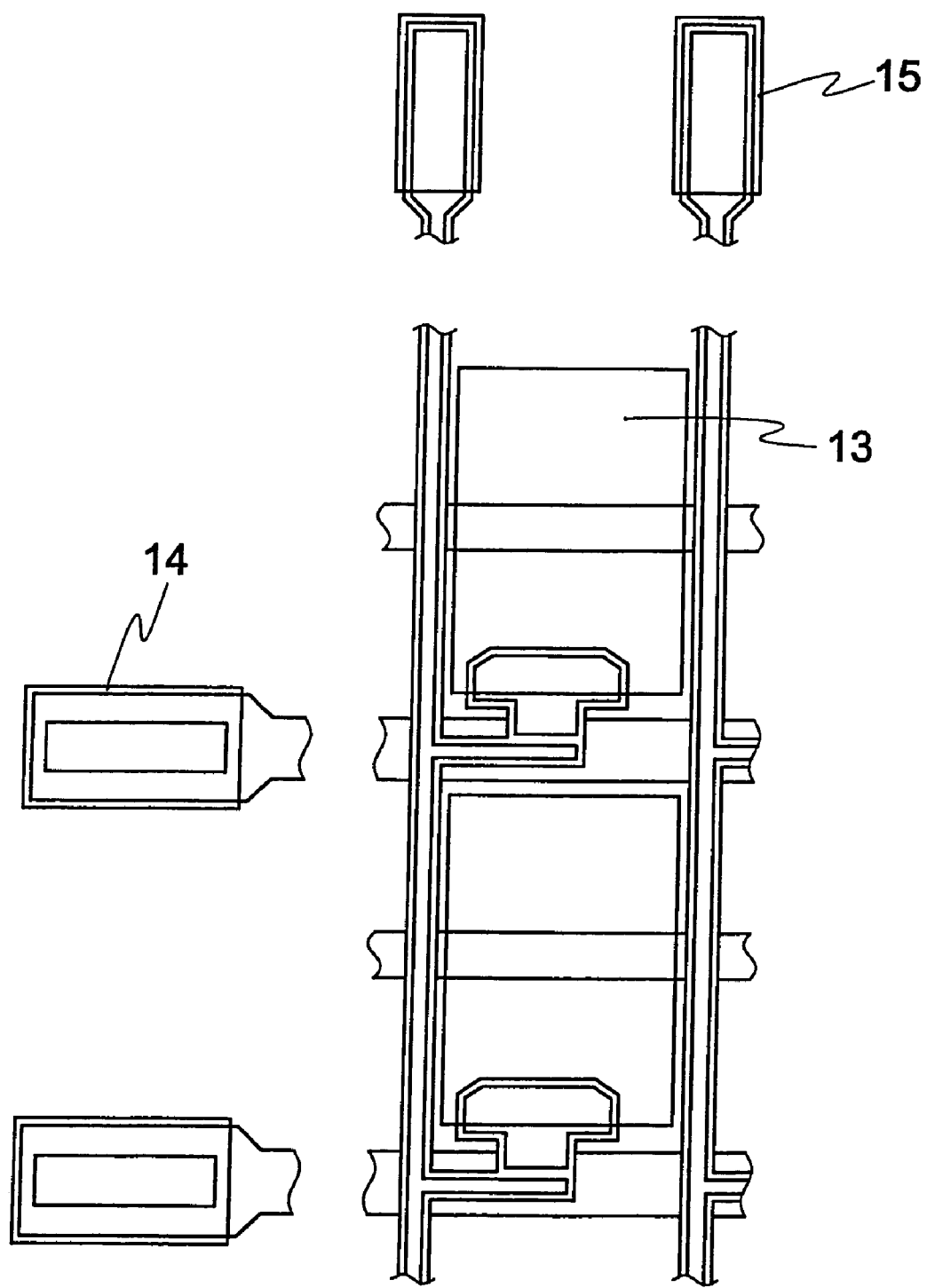
FIG. 66 is an explanatory view showing additional step added to the manufacturing steps shown in FIGS. 3 to 5.
Figure 67:
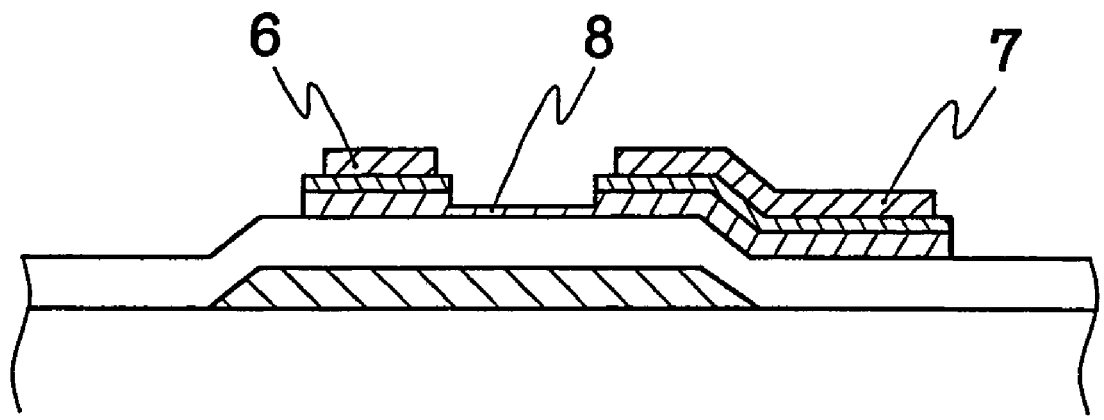
FIG. 67 is an explanatory view showing manufacturing step of another embodiment corresponding to the embodiment shown in FIG. 13.
Figure 68:
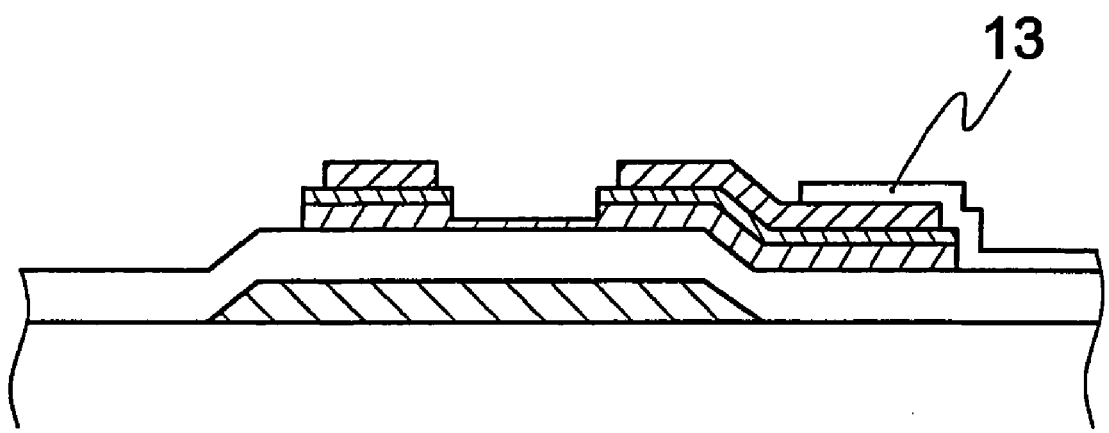
FIG. 68 is an explanatory view showing manufacturing step of still another embodiment corresponding to the embodiment shown in FIG. 14.

Although an interlayer film 9 is used in this embodiment, it is not needed in some case. In this case, a plan view FIG. 1 corresponds to FIG. 64. Sectional views FIGS. 2(a), (b), (c), (d) illustrating a manufacturing process correspond to FIGS. 65(a), (b), (c), (d). In connection to plan views FIGS. 3 through 7, manufacturing processes indicated in FIGS. 3 through 5 are similar to said processes above, and next process is shown in a plan view FIG. 66.

Embodiment 2

Figure 15:
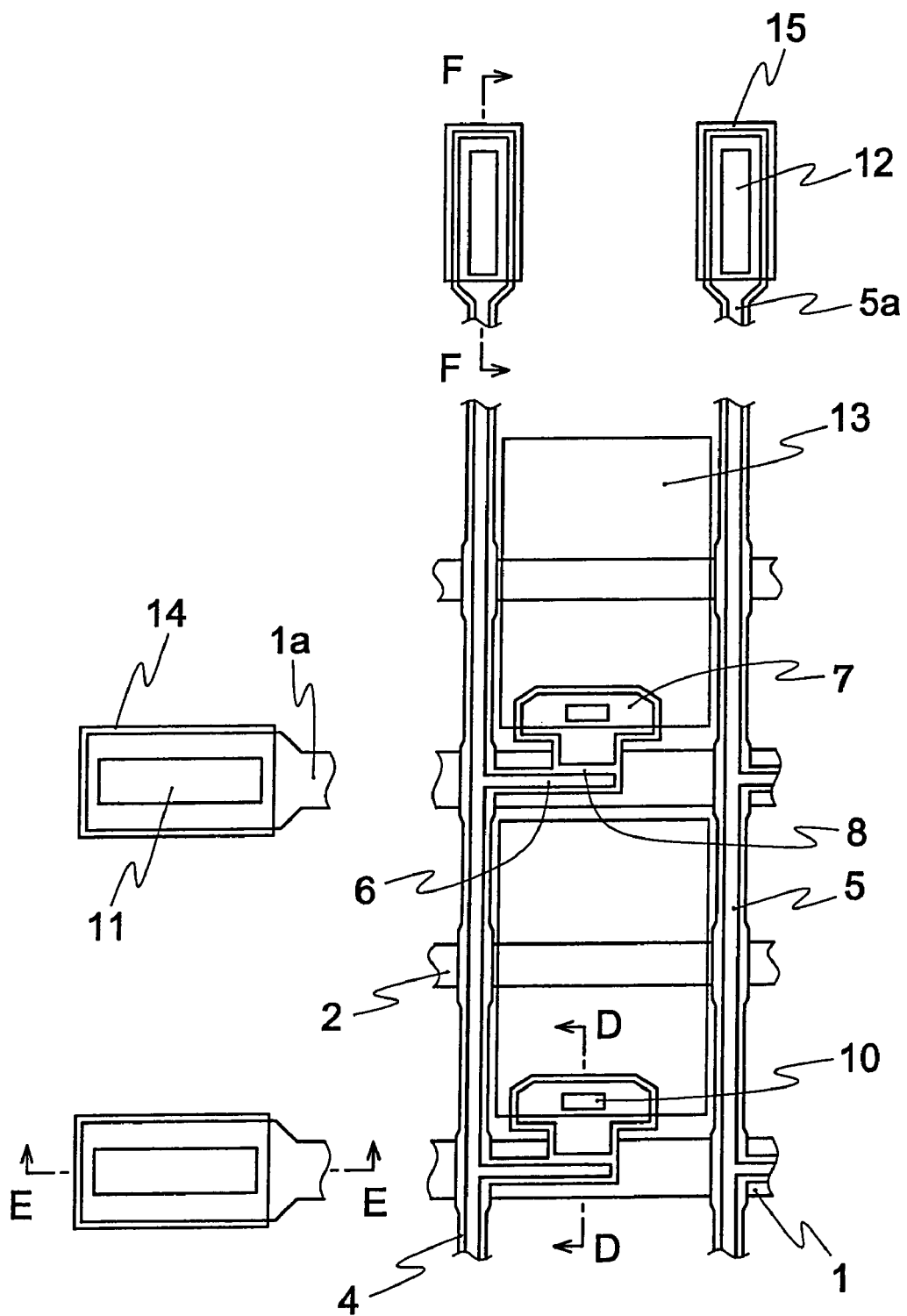
FIG. 15 is a plan view showing a thin film transistor array according to EMBODIMENT 2 of the present invention.

FIG. 15 shows a thin film transistor substrate according to embodiment 2 of the present invention. D-D, E-E and F-F sections in FIG. 15 are the same as those in embodiment 1 and are shown in FIGS. 2(a), 2(b) and 2(c) respectively. The reference numeral 1 denotes a gate line, the reference numeral 1a denotes a gate terminal portion metal pad, the reference numeral 2 denotes an auxiliary capacitance line, the reference numeral 3 denotes a gate insulating film, the reference numeral 4 denotes a semiconductor pattern, the reference numeral 4a denotes a semiconductor layer, the reference numeral 4b denotes an ohmic layer, the reference numeral 5 denotes a source line, the reference numeral 5a denotes source terminal portion metal pad, the reference numeral 6 denotes a source electrode, the reference numeral 7 denotes a drain electrode, the reference numeral 8 denotes a semiconductor active layer of a thin film transistor, the reference numeral 9 denotes an inter-layer insulating film, the reference numeral 10 denotes a drain electrode contact hole, the reference numeral 11 denotes a gate terminal portion contact hole, the reference numeral 12 denotes a source terminal portion contact hole, the reference numeral 13 denotes a pixel electrode, the reference numeral 14 denotes a gate terminal connecting pad, and the reference numeral 15 denotes a source terminal connecting pad.

Next, a manufacturing method will be described. FIGS. 16 to 20 are plan views showing each step, and FIGS. 8 to 14 are sectional views taken along the line D-D in FIG. 15 at each step in the same manner as in embodiment 1.

Figure 16:
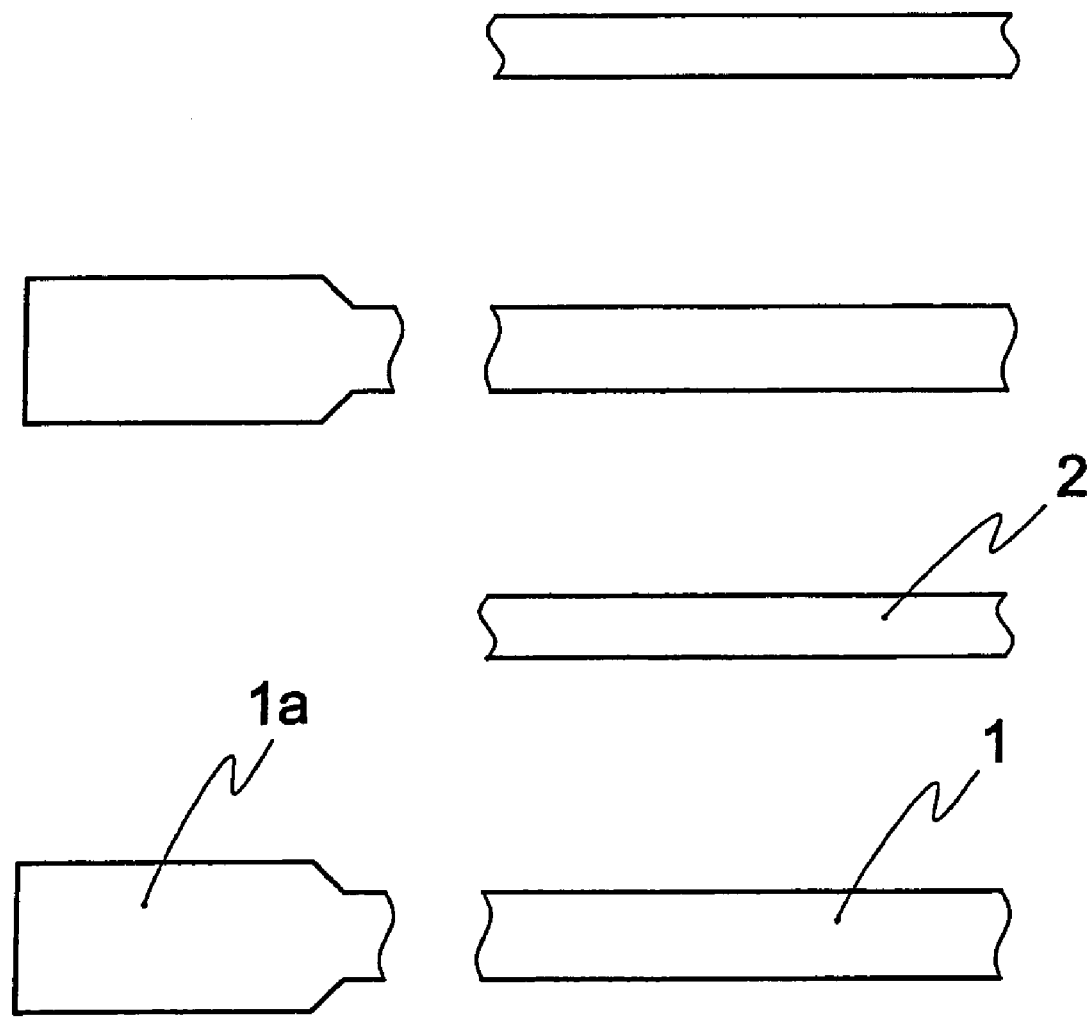
FIG. 16 is a plan view showing the thin film transistor array at each step according to EMBODIMENT 1 of the present invention.

First of all, a first conductive metallic thin film such as Cr, Ta, Mo or Al is formed in a thickness of approximately 400 nm on a transparent substrate. Then, the first conductive metallic thin film is subjected to patterning at a first photolithographic step. As shown in FIGS. 16 and 8, the gate line 1, the gate terminal portion metal pad 1a and the auxiliary capacity wiring 2 are formed. At this time, in the case in which the first conductive metallic thin film is Cr, wet etching is carried out with an $(NH_4)_2[Ce(NO_3)_6]+HNO_3+H_2O$ solution, for example. As shown in FIG. 9, next, a $SiN_x$ film, an a-Si film, an $n^+$a-Si film and Cr are provided as a gate insulating film 3, a semiconductor active film 4a, an ohmic contact film 4b and a second metal film 16 in thicknesses of approximately 400 nm, 105 nm, 30 nm and 400 nm, respectively. The $SiN_x$ film, the a-Si film and the $n^+$a-Si film are formed by using a plasma CVD device, and $PH_3$ is doped to form $n^+$a-Si during the formation of the ohmic layer. The Cr film is formed by using a DC magnetron type sputtering device.

Figure 17:
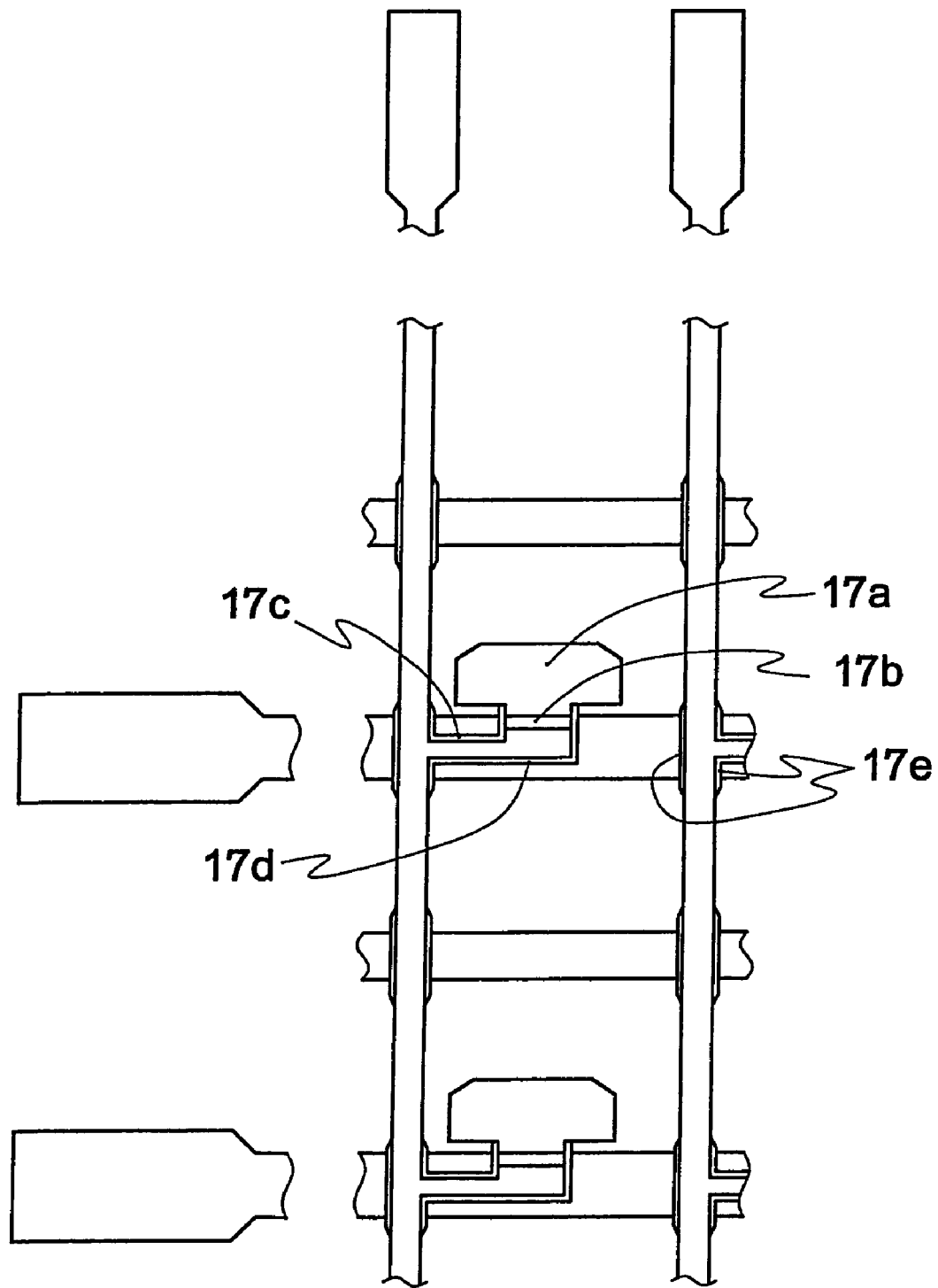
FIG. 17 is a plan view showing the thin film transistor array at each step according to EMBODIMENT 1 of the present invention.
Figure 21:
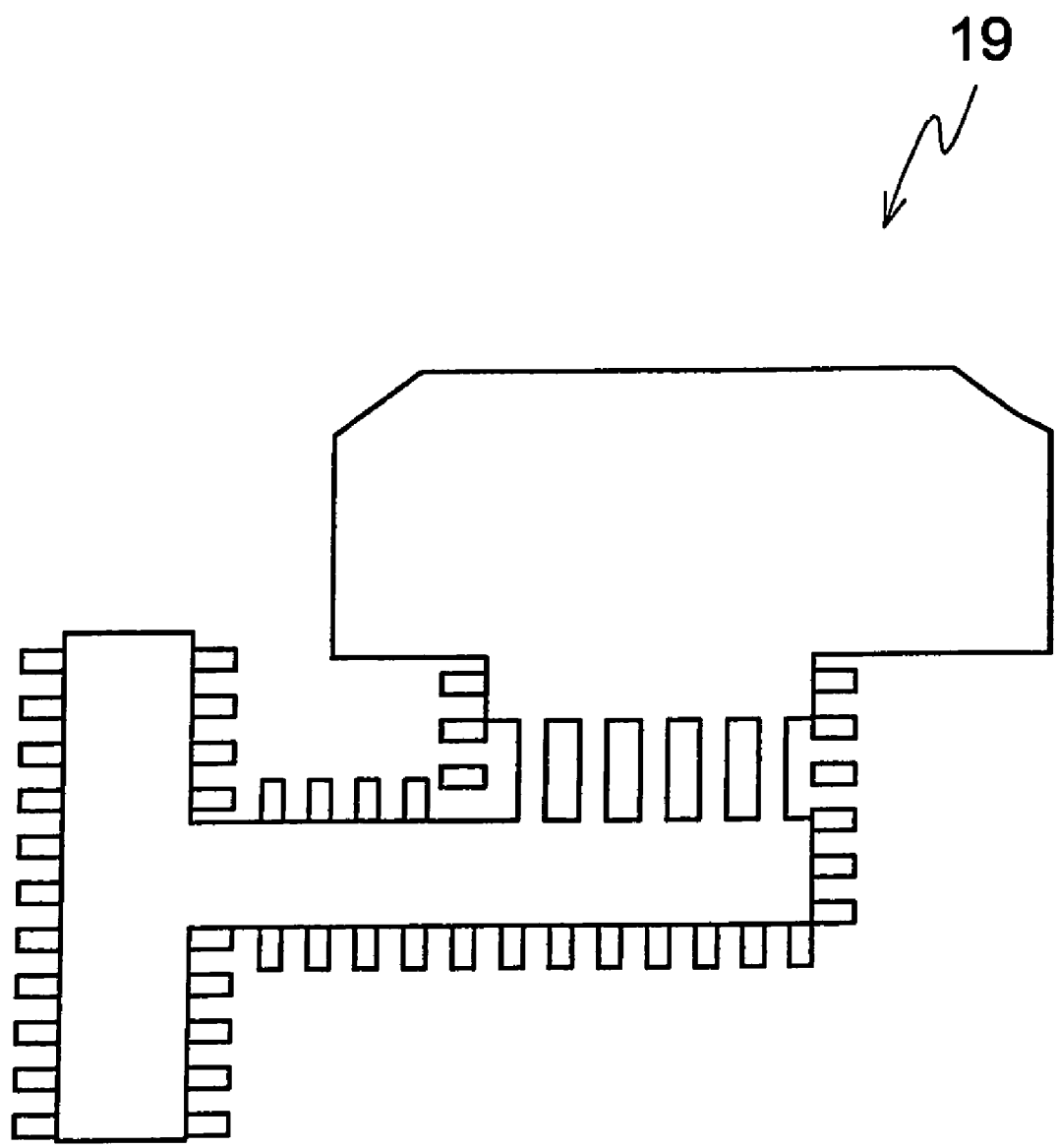
FIG. 21 is a view showing a TFT portion pattern of a mask to be used for second photolithography according to EMBODIMENT 2 of the present invention.

Next, a resist pattern 17a for forming the source line, the source terminal portion metal pad and the drain electrode, a resist pattern 17b for forming the semiconductor active layer 8 of the thin film transistor, resist patterns 17c and 17d for preventing the leakage of a semiconductor end face, and a resist pattern 17e for preventing a short-circuit between the gate—source lines are provided at a second photolithographic step as shown in FIG. 17. A novolak resin based positive resist is used and the resist is coated in a thickness of 1.5 µm by a spin coater. After the resist is coated, prebaking is carried out for 90 seconds at a temperature of 120° C. Then, the resist pattern 17a is exposed by using an ordinary Cr whole surface mask pattern and the resist patterns 17b, 17c, 17d and 17e are exposed by using a mask pattern having a Cr stripe shape of line/space=1.5 µm/1.5 µm for 1000 milliseconds. The stripe mask pattern is shown in FIG. 21. An exposing machine is of an ordinary stepper or mirror projection type, and g rays and h rays of a high pressure mercury are used for a light source. At this time, the stripe pattern is finer than a resolution limit of an exposing device. Therefore, the resist is not exposed like a stripe but the amount of the exposure is uniformly smaller than that in other exposed portion.

Subsequently, development is carried out by using an organic alkali based developing solution and postbaking is then carried out for 180 seconds at a temperature of 100° C. to 120° C. Consequently, a solvent in the resist is volatilized and the adhesion of the resist and Cr is increased. By these processes, the resist of the thin film transistor portion has a shape shown in FIG. 10. A thickness of the resist film of the resist pattern 17a having an ordinary thickness is approximately 1.4 µm and thicknesses of the resist patterns 17b, 17c, 17d and 17e are approximately 0.4 µm to 0.6 µm. Then, oven baking is further carried out at a temperature of 120° C. to 130° C. Thus, the adhesion of the resist and Cr is further increased. At this time, if a baking temperature is too high, a resist end face is becomes inactive, to which care should be given. Thereafter, the Cr film 16 is etched with the $(NH_4)_2[Ce(NO_3)_6]+HNO_3+H_2O$ solution. Next, the ohmic film 4b and the semiconductor film 4a are etched with an $HCl+SF_6$ gas. Subsequently, the resist is subjected to ashing through oxygen plasma such that the Cr film in the resist patterns 17b, 17c, 17d and 17e portions is exposed. The ashing is carried out at a pressure of 40 Pa for 60 seconds. During the ashing, the size of a resist opening indicated as 18 in FIG. 11 can be controlled in a RIE mode more easily than in PE mode.

Figure 18:
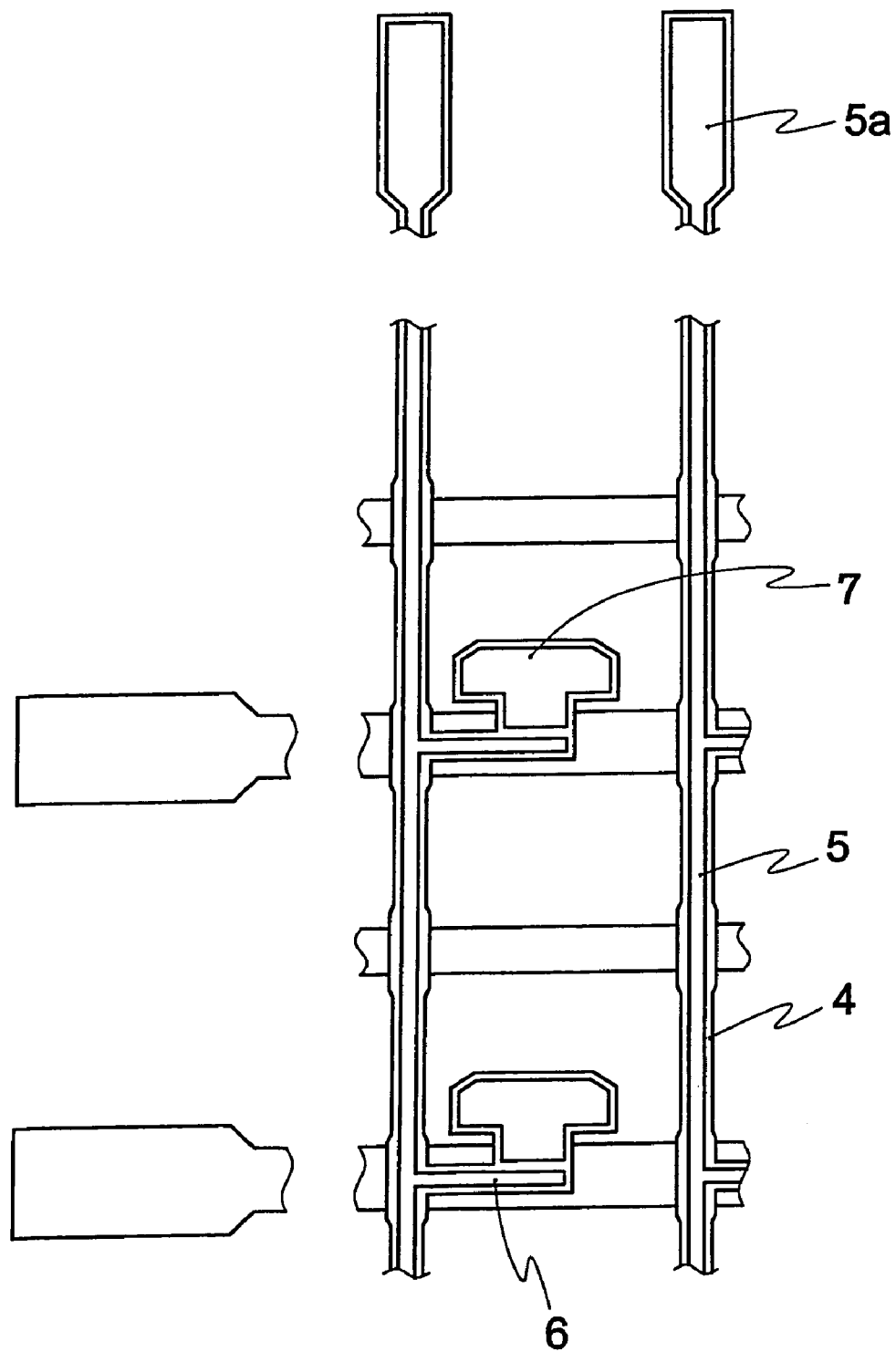
FIG. 18 is a plan view showing the thin film transistor array at each step according to EMBODIMENT 1 of the present invention.
Figure 19:
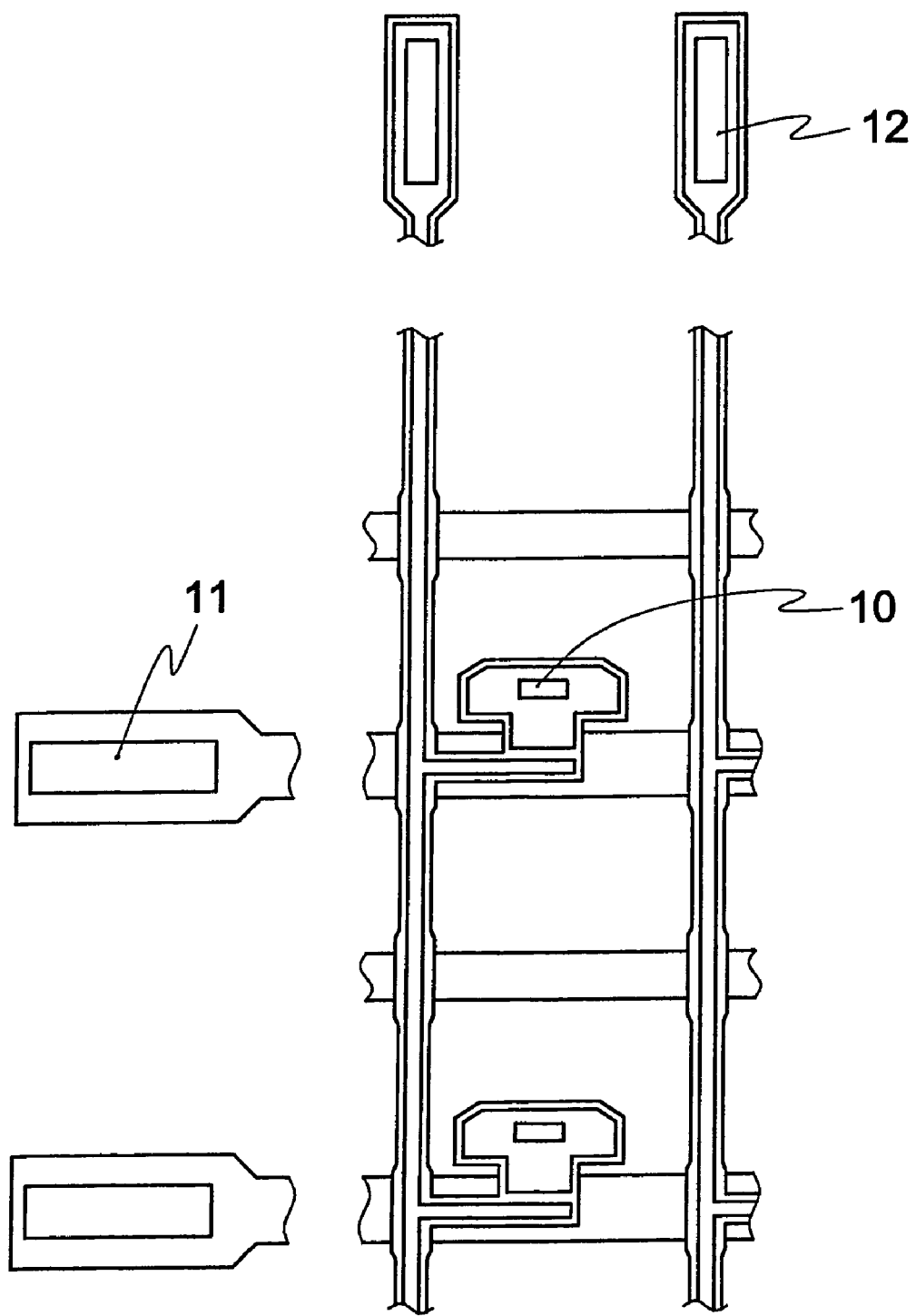
FIG. 19 is a plan view showing the thin film transistor array at each step according to EMBODIMENT 1 of the present invention.
Figure 20:
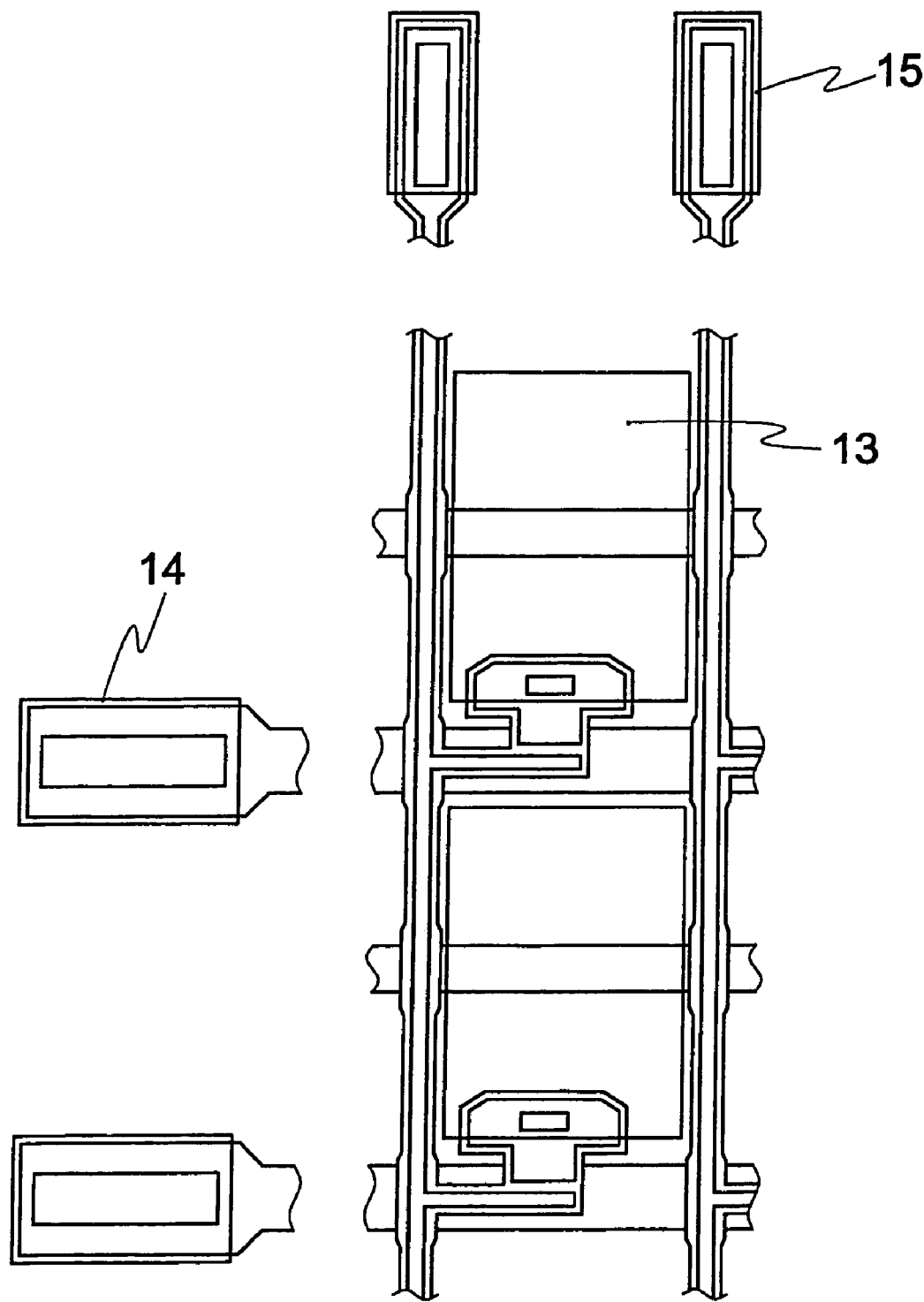
FIG. 20 is a plan view showing the thin film transistor array at each step according to EMBODIMENT 1 of the present invention.

Then, the oven baking is carried out at a temperature of 130° C. to 140° C. Thereafter, the Cr film 16 in the resist patterns 17b, 17c, 17d and 17e is etched with the $(NH_4)_2[Ce(NO_3)_6]+HNO_3+H_2O$ solution. In the present patterns, semiconductor patterns in the vicinity of the source electrode and the drain electrode are provided more apart from each other. As compared with the first embodiment, therefore, the effect of suppressing the generation of the semiconductor end face leakage and a Cr overetching margin can be increased still more. In the case of this pattern, approximately 20% to 50% of Cr overetching can be carried out. In this case, however, care should be given to the following. In the case in which the a-Si pattern formed by the resist pattern 17c continuously gets out of an outer edge of the gate line, a gate off bias is not applied to this portion in a hold state and this portion is not shielded by a gate pattern. Therefore, a leakage current is increased. Accordingly, at least a part of the outer edge of the semiconductor pattern including the source line and the drain electrode should enter the inside from the outer edge of the gate line as shown in FIG. 17. In other word, on a route of semiconductor pattern which extend from a region surrounding the TFT to a region surrounding the source line, both outside edge of the semiconductor pattern should intersect the outside edge of the gate line. Semiconductor pattern edge 17d intersects the gate line edge automatically because of the disposition of the TFT. As for 17c, it is preferable to have it intersect the gate line intentionally. Then, the ohmic layer 4b and the semiconductor layer 4a corresponding to the resist patterns 17b, 17c, 17d and 17e portions are partially etched by approximately 100 nm in total with $SF_6+HCl$ as shown in FIG. 12. Then, when the resist is removed, the semiconductor pattern 4, the source line 5, the source electrode 6, the drain electrode 7 and the source terminal portion metal pad 5a are formed as shown in FIG. 18.

Next, $SiN_x$ to be the inter-layer insulating film is formed in a thickness of 300 nm by using a PCVD device, and is subjected to patterning at a third photolithographic step. Consequently, a contact hole 10 communicating with the drain electrode 7, a contact hole 11 communicating with the gate terminal portion metal pad 1a and a contact hole 12 communicating the source terminal portion metal pad 15 shown in FIGS. 2(a), 2(b), 2(c), 13 and 19 are formed through dry etching using $CF_4+O_2$. Subsequently, a transparent conductive film comprising ITO is formed in a thickness of approximately 100 nm by using a DC magnetron type sputtering device. Then, the ITO is subjected to patterning at a fourth photolithographic step to form the transparent pixel electrode 13, the gate terminal portion pad 14 and the source terminal portion pad 15 as shown in FIGS. 2(a), 2(b), 2(c), 14 and 20. At this time, the ITO film is subjected wet etching by using the $HCl+HNO_3+H_2O$ solution, for example.

The thin film transistor array thus manufactured is created at the fourth photolithographic step and a semiconductor step is not present under the source line. Therefore, a source disconnection is generated with difficulty, and the patterns of the source electrode and the drain electrode do not cross each other. In addition, a space between the semiconductor pattern end face of the thin film transistor and the source electrode and drain electrode is increased. Therefore, a leakage current can also be reduced still more. Moreover, at least a part of the outer edge of the semiconductor pattern including the source line and the drain electrode enter the inner side from the outer edge of the gate line. Consequently, it is possible to prevent a leakage current from being increased due to light leakage or the like.

Figure 69:
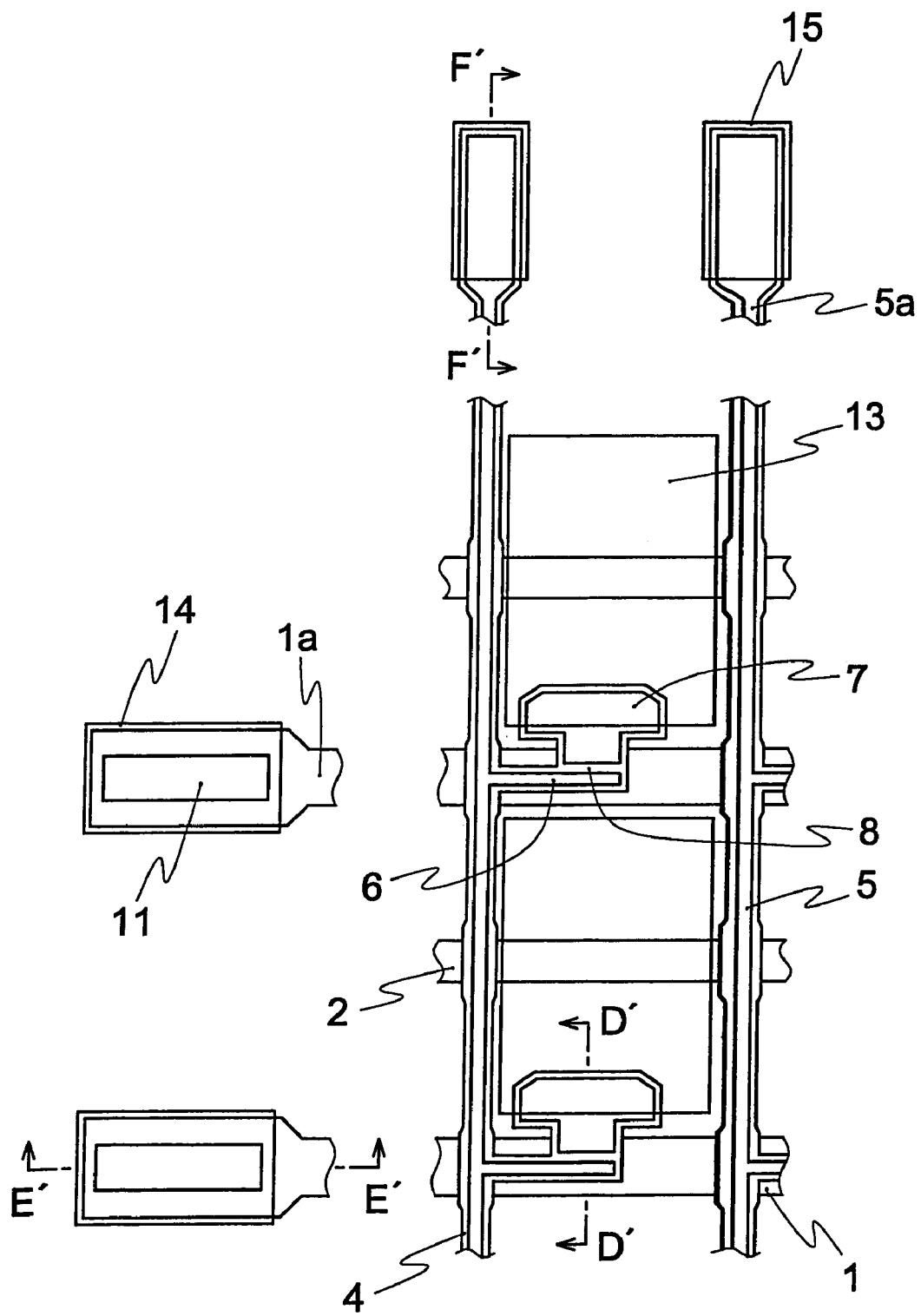
FIG. 69 is a plan view showing another embodiment corresponding to the embodiment shown in FIG. 15.
Figure 70:
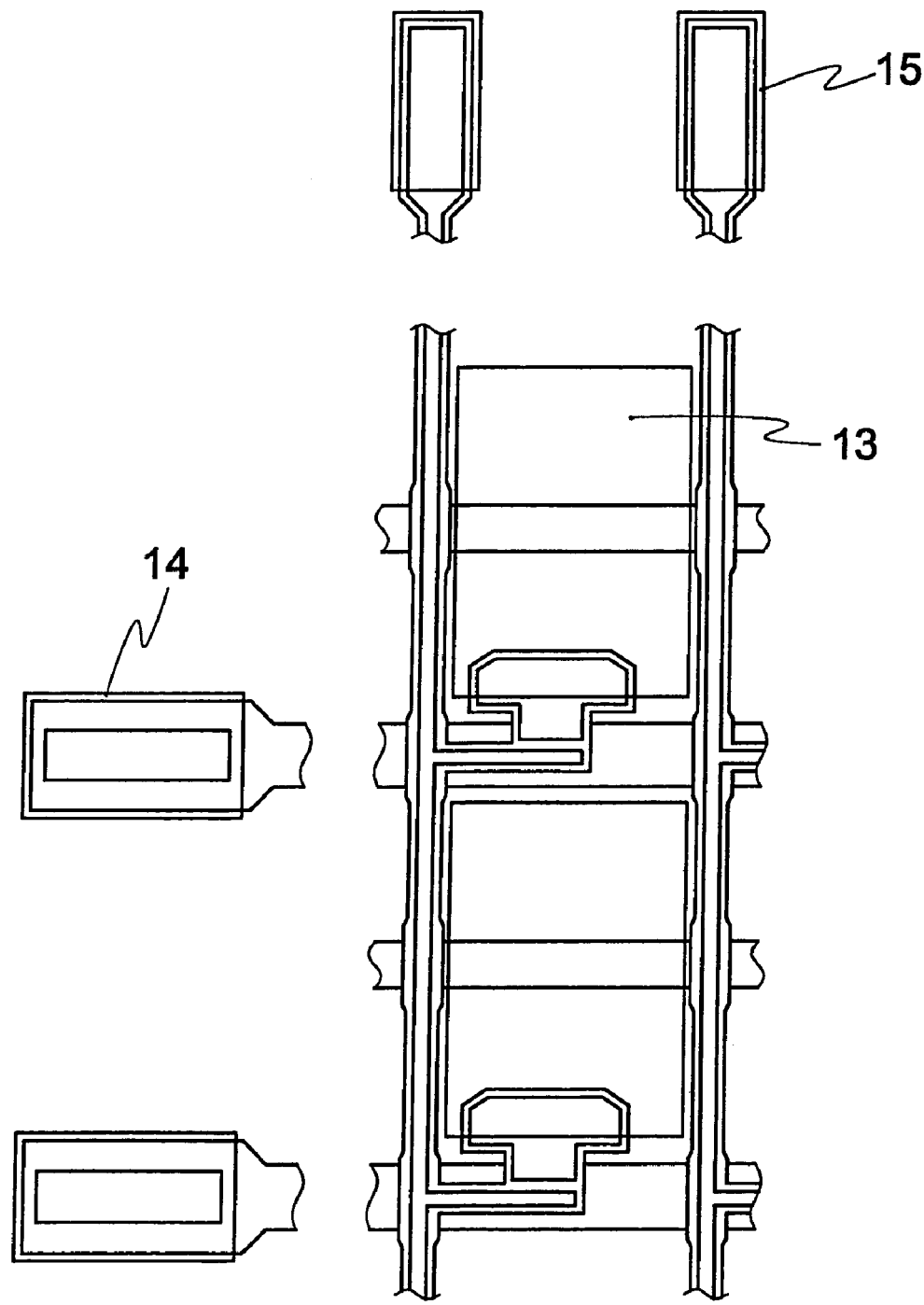
FIG. 70 is an explanatory view showing additional step added to the manufacturing steps shown in FIGS. 16 to 18.

Although an interlayer film 9 is used in this embodiment, it is not needed in some case. In this case, a plan view FIG. 15 corresponds to FIG. 69. In connection to plan views FIG. 16 through FIG. 20, manufacturing processes indicated in FIG. 16 through FIG. 18 are similar to said processes above, and next process is shown in a plan view FIG. 70.

In this embodiment, there is formed a transparent conductive film (pixel electrode 13) as a gate terminal pad 14 and a source terminal pad 15. In some case where there is no need of the transparent conductive film 13 on the gate terminal and source terminal, the transparent conductive film 13 may not be formed there and the first metallic layer (1a: gate line layer) and the second metallic layer (5a: source line layer) may be left uncovered at their contact holes 11 and 12.

Embodiment 3

Figure 22:
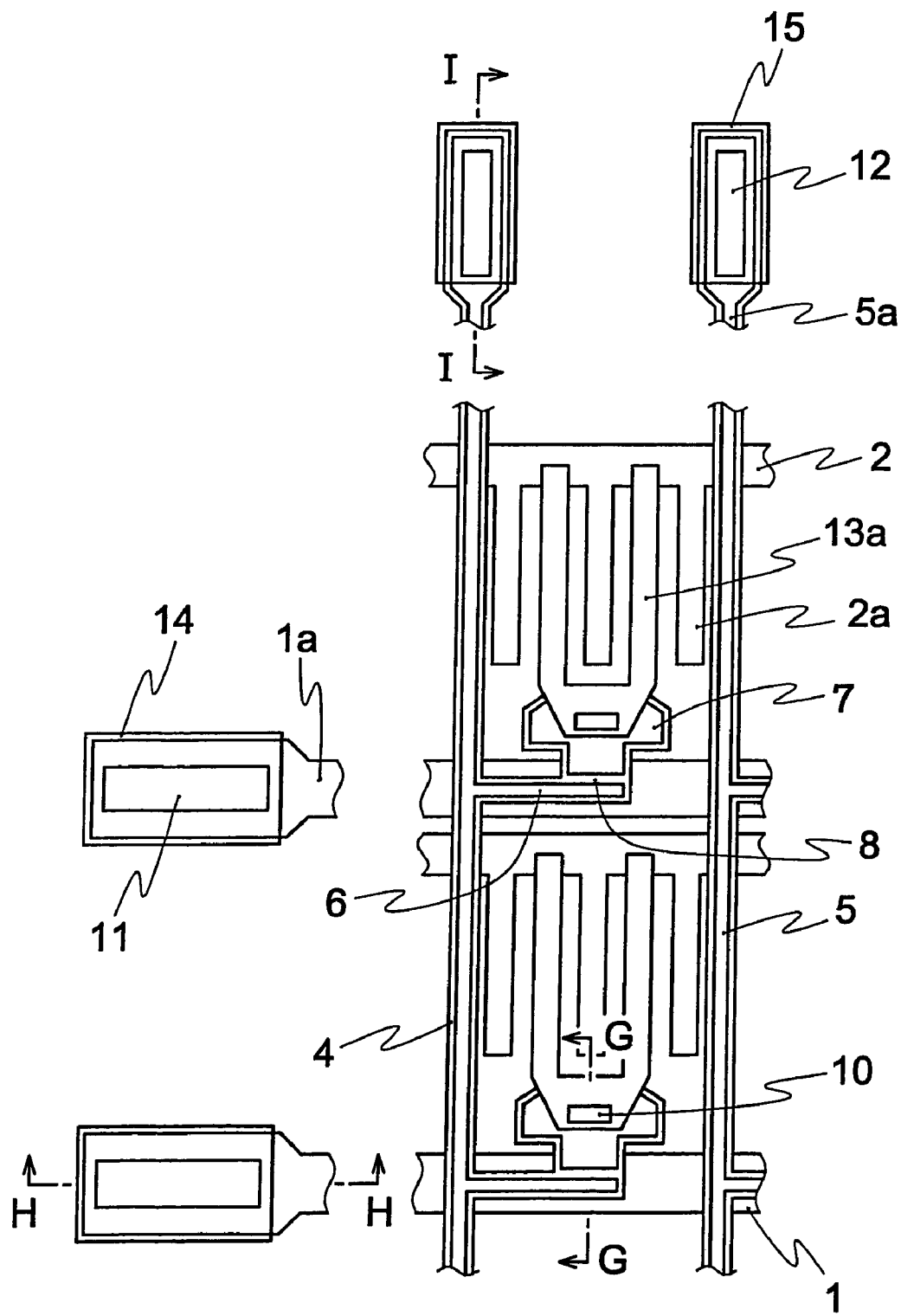
FIG. 22 is a plan view showing a thin film transistor array according to EMBODIMENT 3 of the present invention.

FIG. 22 shows a thin film transistor substrate according to embodiment 3 of the present invention. G-G, H-H and I-I sections are the same as those in embodiment 1 and are shown in FIGS. 2(a), 2(b) and 2(c) respectively. The reference numeral 1 denotes a gate line, the reference numeral 1a denotes a gate terminal portion metal pad, the reference numeral 2 denotes an auxiliary capacitance line, the reference numeral 2a denotes an IPS counter electrode, the reference numeral 3 denotes a gate insulating film, the reference numeral 4 denotes a semiconductor pattern, the reference numeral 4a denotes a semiconductor layer, the reference numeral 4b denotes an ohmic layer, the reference numeral 5 denotes a source line, the reference numeral 5a denotes source terminal portion metal pad, the reference numeral 6 denotes a source electrode, the reference numeral 7 denotes a drain electrode, the reference numeral 8 denotes a semiconductor active layer of a thin film transistor, the reference numeral 9 denotes an inter-layer insulating film, the reference numeral 10 denotes a drain electrode contact hole, the reference numeral 11 denotes a gate terminal portion contact hole, the reference numeral 12 denotes a source terminal portion contact hole, the reference numeral 13a denotes an IPS electrode, the reference numeral 14 denotes a gate terminal connecting pad, and the reference numeral 15 denotes a source terminal connecting pad.

Next, a manufacturing method will be described. FIGS. 23 to 27 are plan views showing each step, and FIGS. 8 to 14 are sectional views taken along the line G-G in FIG. 22 at each step in the same manner as in embodiment 1.

Figure 23:
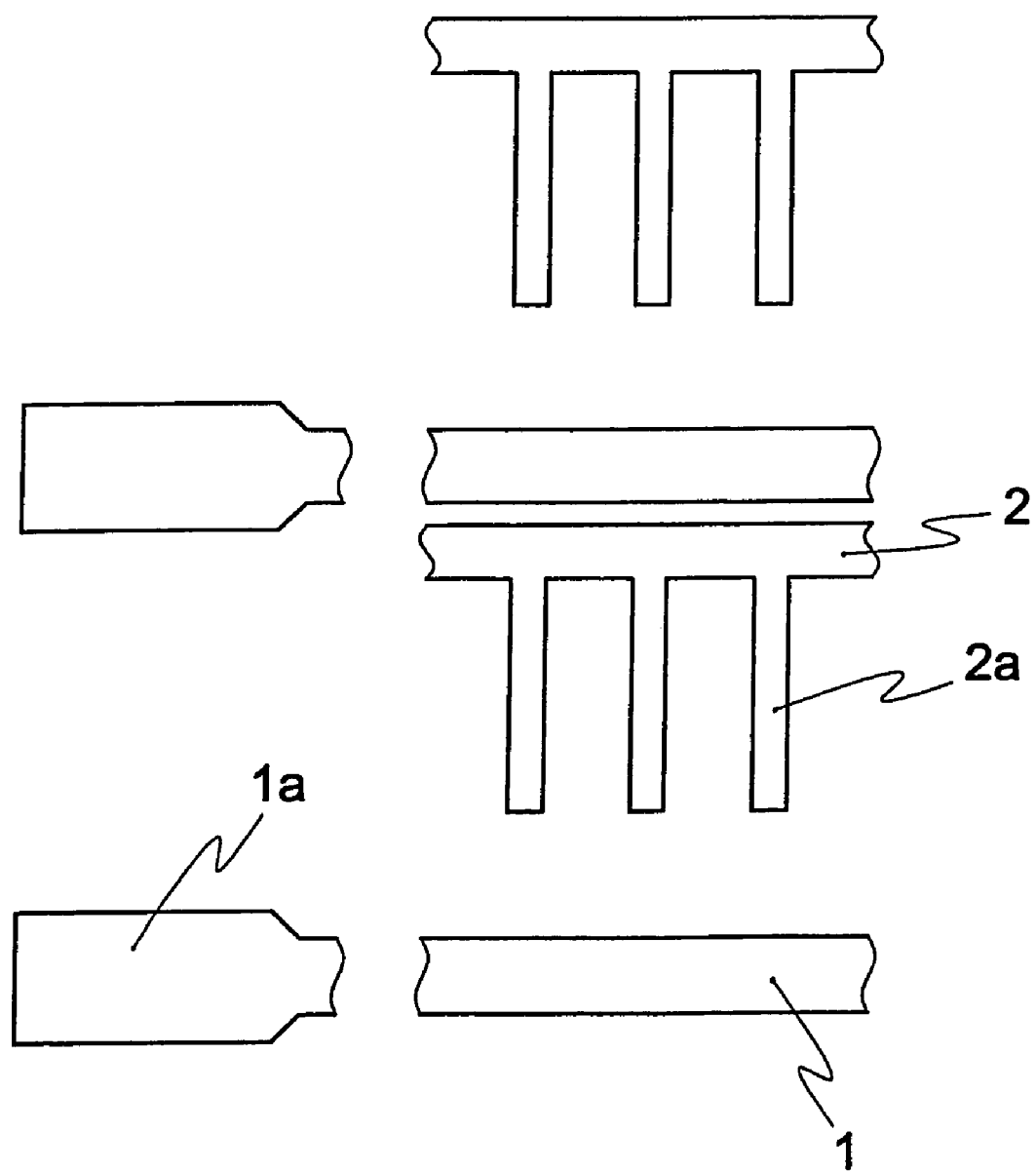
FIG. 23 is a plan view showing the thin film transistor array at each step according to EMBODIMENT 1 of the present invention.

First of all, a first conductive metallic thin film such as Cr, Ta, Mo or Al is formed in a thickness of approximately 400 nm on a transparent substrate. Then, the first conductive metallic thin film is subjected to patterning at a first photolithographic step. As shown in FIGS. 23 and 8, the gate line 1, the gate terminal portion metal pad 1a, the auxiliary capacitance line 2 and the IPS counter electrode 2a are formed. At this time, in the case in which the first conductive metallic thin film is Cr, wet etching is carried out with an $(NH_4)_2[Ce(NO_3)_6]+HNO_3+H_2O$ solution, for example. As shown in FIG. 9, next, a $SiN_x$ film, an a-Si film, an $n^+$a-Si film and Cr are provided as a gate insulating film 3, a semiconductor active film 4a, an ohmic contact film 4b and a second metal film 16 in thicknesses of approximately 400 nm, 150 nm, 30 nm and 400 nm, respectively. The $SiN_x$ film, the a-Si film and the $n^+$a-Si film are formed by using a plasma CVD device, and $PH_3$ is doped to form $n^+$a-Si during the formation of the ohmic layer. The Cr film is formed by using a DC magnetron type sputtering device.

Figure 24:
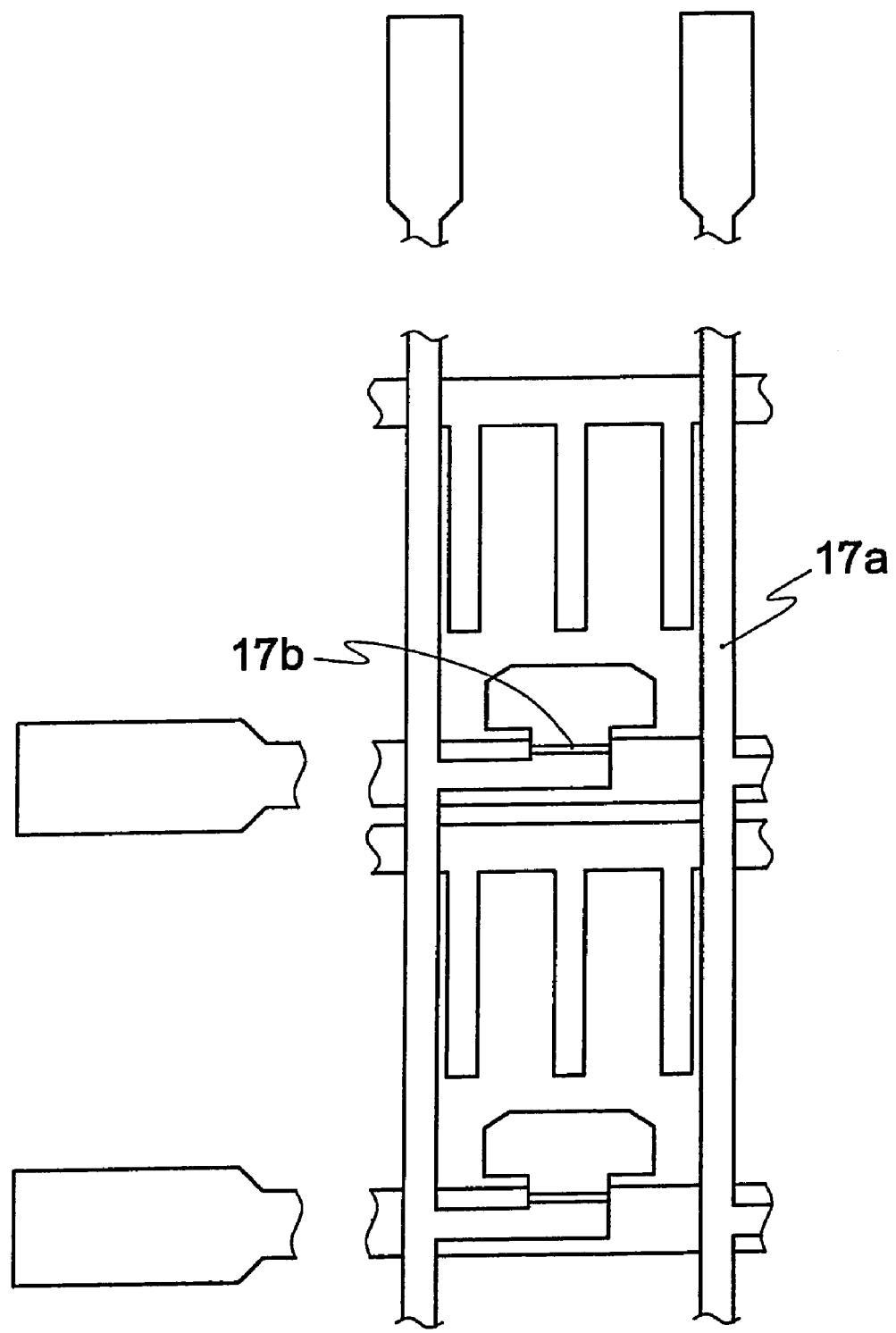
FIG. 24 is a plan view showing the thin film transistor array at each step according to EMBODIMENT 1 of the present invention.
Figure 25:
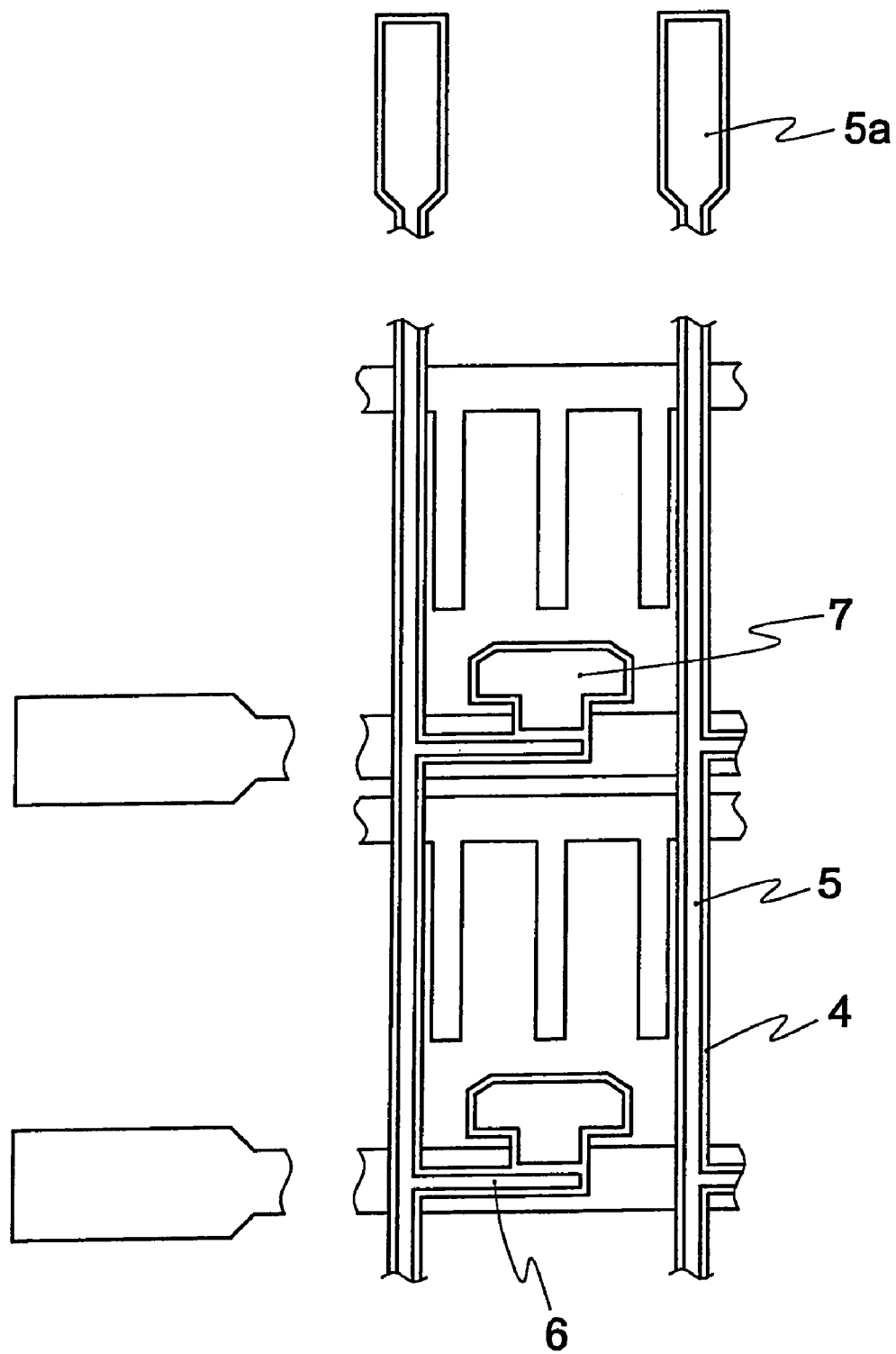
FIG. 25 is a plan view showing the thin film transistor array at each step according to EMBODIMENT 1 of the present invention.
Figure 26:
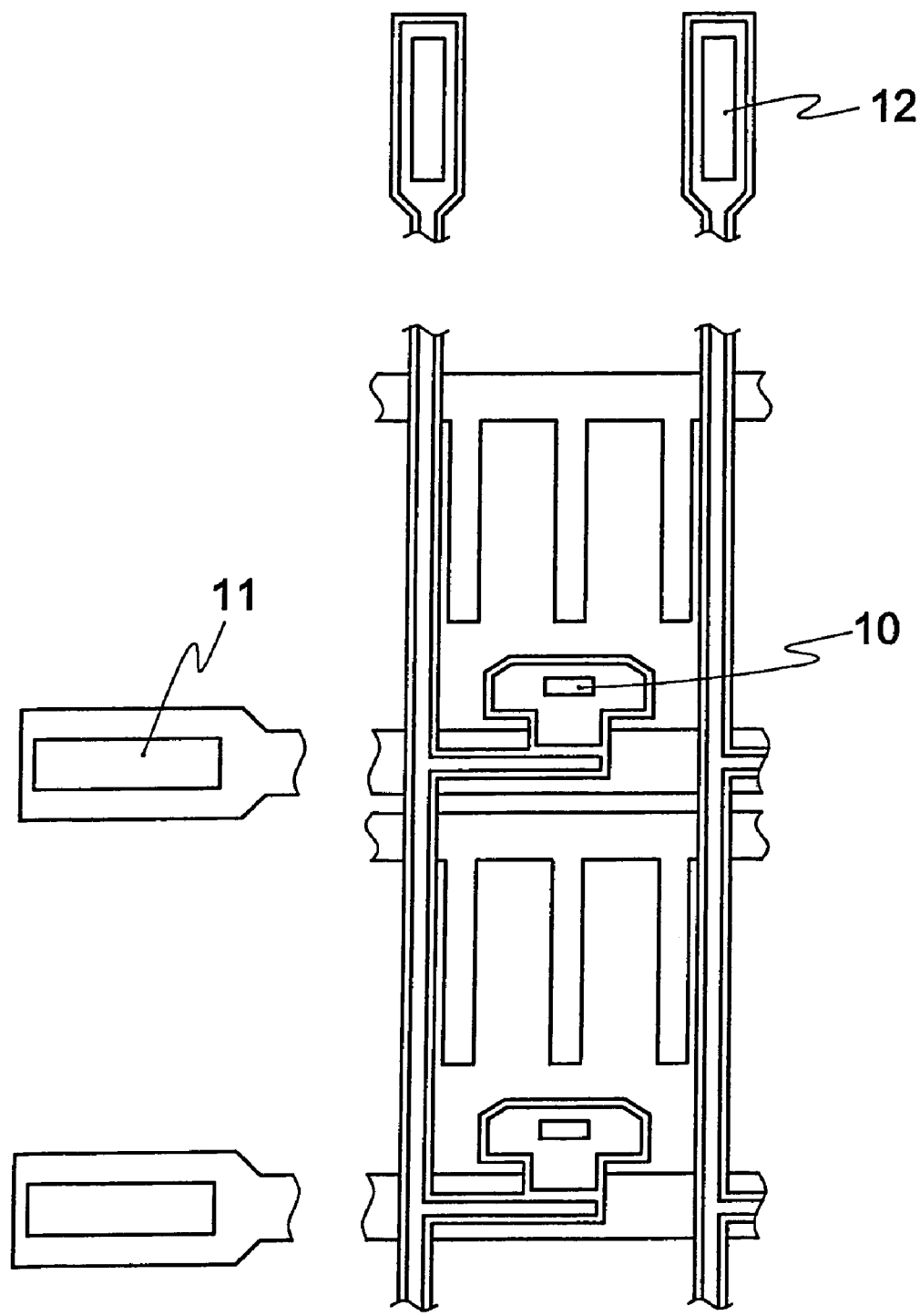
FIG. 26 is a plan view showing the thin film transistor array at each step according to EMBODIMENT 1 of the present invention.

Next, a resist pattern 17a for forming the source line, the source terminal portion metal pad and the drain electrode and a resist pattern 17b for forming the semiconductor active layer 8 of the thin film transistor are provided at a second photolithographic step as shown in FIG. 24. A novolak resin based positive resist is used and the resist is coated in a thickness of 1.5 µm by a spin coater. After the resist is coated, prebaking is carried out for 90 seconds at a temperature of 120° C. Then, exposure is carried out for 1000 milliseconds by using a mask pattern including the resist pattern 17a and the resist pattern 17b. Thereafter, additional exposure sis carried out for 400 msec by using a mask pattern capable of exposing only the resist pattern 17b in a semiconductor active layer portion. An exposing machine is of a stepper or mirror projection type, and g rays and h rays of a high pressure mercury are used for a light source. Subsequently, development is carried out by using an organic alkali based developing solution and postbaking is then carried out for 180 seconds at a temperature of 100° C. to 120° C. Consequently, a solvent in the resist is volatilized and the adhesion of the resist and Cr is increased. By these processes, the resist of the thin film transistor portion has a shape shown in FIG. 10. A thickness of the resist film of the resist pattern 17a having an ordinary thickness is approximately 1.4 µm and a thickness of the resist of the resist pattern 17b is approximately 0.4 µm.

Then, oven baking is further carried out at a temperature of 120° C. to 130° C. Thus, the adhesion of the resist and Cr is further increased. At this time, if a baking temperature is too high, a resist end face is becomes inactive, to which care should be given. Thereafter, the Cr film 16 is etched with the $(NH_4)_2[Ce(NO_3)_6]+HNO_3+H_2O$ solution. Next, the ohmic film 4b and the semiconductor film 4a are etched with an $HCl+SF_6+He$ gas. Subsequently, the resist is subjected to ashing through oxygen plasma and the thin film resist pattern 17b is removed so that the Cr film of the corresponding portion of the semiconductor active layer 8 is exposed as shown in FIG. 11. The ashing is carried out at a pressure of 40 Pa for 60 seconds. During the ashing, the size of a resist opening indicated as 18 in FIG. 11 can be controlled in a RIE mode more easily than in PE mode.

Then, the oven baking is carried out at a temperature of 130° C. to 140° C. Thereafter, the Cr film 16 in the opening 18 is etched with the $(NH_4)_2[Ce(NO_3)_6]+HNO_3+H_2O$ solution. At this time, the whole Cr pattern is subjected to side etching. Therefore, the Cr pattern is made thinner by approximately 1.5 to 2 μm than an a-Si pattern. Consequently, it is possible to suppress a leakage current from flowing through an a-Si pattern end face from the source electrode to the drain electrode. For the Cr etching, overetching is required to some extent. It is desirable that the amount of the overetching should be approximately 50%.

As shown in FIG. 12, subsequently, the ohmic film 4b and the semiconductor layer 4a in the corresponding portion of the semiconductor active layer 8 are partially etched by approximately 100 nm in total by using $SF_6+HCl$ as shown in FIG. 12. Then, when the resist is removed, the semiconductor pattern 4, the source line 5, the source electrode 6, the drain electrode 7 and the source terminal portion metal pad 5a are formed as shown in FIG. 5. As shown in FIGS. 6 and 13, next, $SiN_x$ to be the interlayer insulating film is formed in a thickness of 300 nm by using a PCVD device, and is subjected to patterning at a third photolithographic step. Consequently, a contact hole 10 communicating with the drain electrode 7, a contact hole 11 communicating with the gate terminal portion metal pad 1a and a contact hole 12 communicating the source terminal portion metal pad 15 shown in FIGS. 26, 2(a), 2(b) and 2(c) are formed through dry etching using $CF_4+O_2$.

Figure 27:
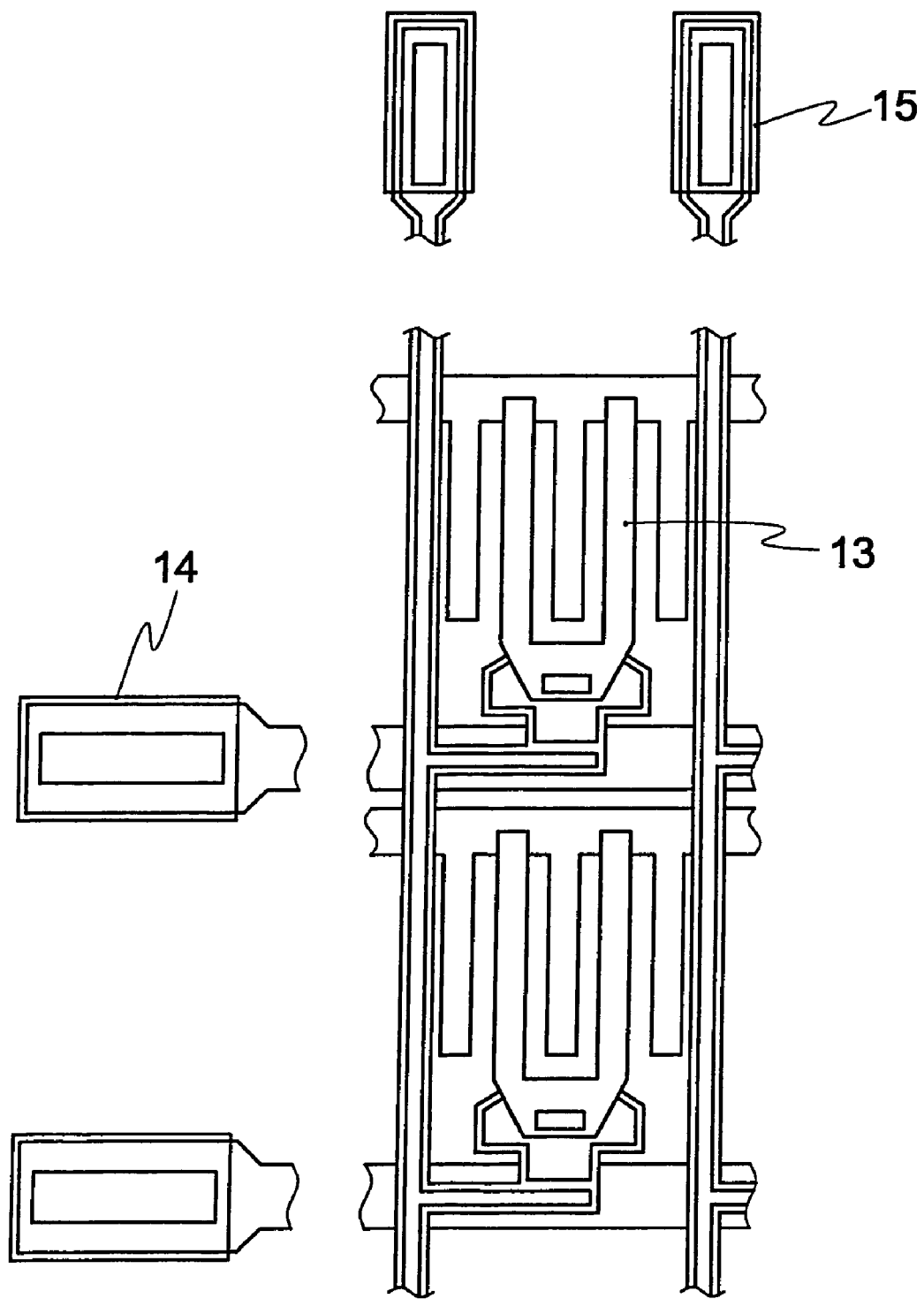
FIG. 27 is a plan view showing the thin film transistor array at each step according to EMBODIMENT 1 of the present invention.

As shown in FIGS. 27 and 14, subsequently, a conductive film comprising Cr is formed in a thickness of approximately 100 nm by using a DC magnetron type sputtering device as shown in FIGS. 7 and 14. Then, the Cr is subjected to patterning at a fourth photolithographic step to form the IPS electrode 13a, the gate terminal portion pad 14 and the source terminal portion pad 15. At this time, the Cr film is subjected wet etching by using the$(NH_4)_2[Ce(NO_3)_6]+HNO_3+H_2O$ solution, for example.

The thin film transistor array thus manufactured is created at the fourth photolithographic step and a semiconductor step is not present under the source line. Therefore, a source disconnection is generated with difficulty, and the patterns of the source electrode and the drain electrode are included in the semiconductor pattern and do not cross each other. Therefore, a leakage current can be also reduced.

Moreover, the IPS electrode provided on the uppermost layer is formed of the Cr. Therefore, also in the case in which brush washing is to be carried out at a step after a panel assembling step, it is possible to prevent a disorder of the pattern such as a damage from being generated.

Figure 71:
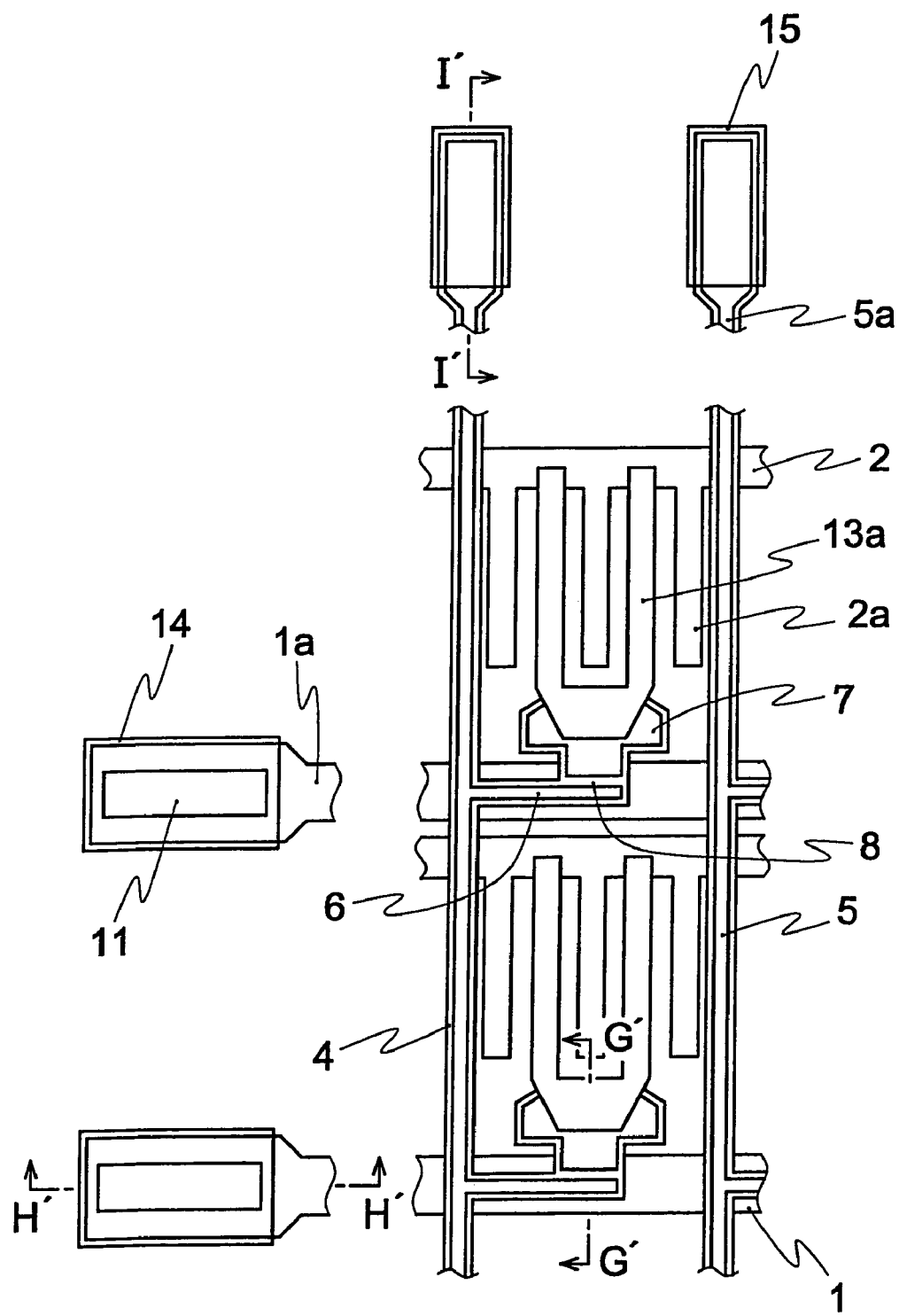
FIG. 71 is a plan view showing another embodiment corresponding to the embodiment shown in FIG. 22.
Figure 72:
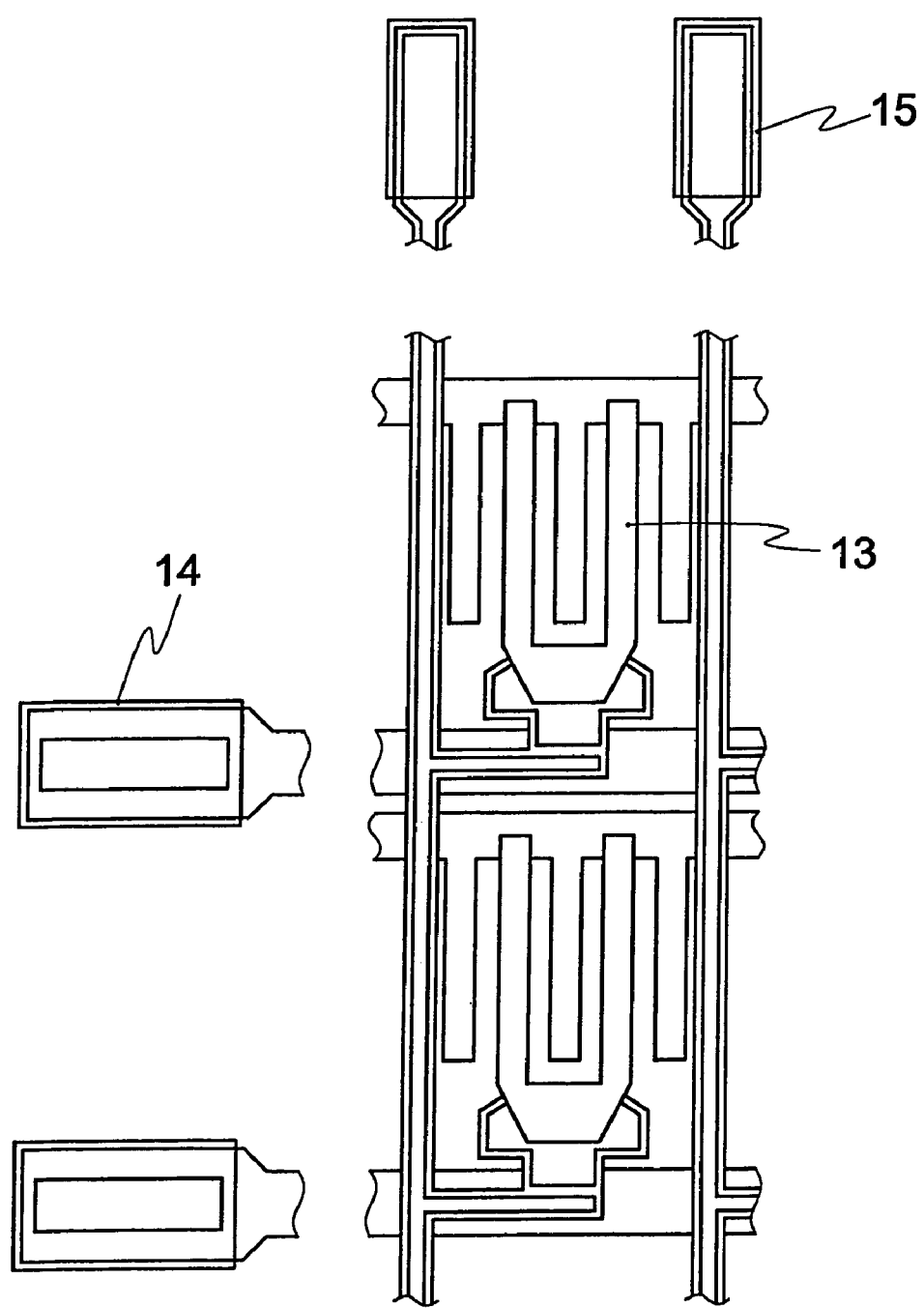
FIG. 72 is an explanatory view showing a manufacturing step added to the steps shown in FIGS. 23 to 25.

Although an interlayer film 9 is used in this embodiment, it is not needed in some case. In this case, a plan view FIG. 22 corresponds to FIG. 71. In connection to plan views FIG. 23 through FIG. 27, manufacturing processes indicated in FIG. 23 through FIG. 5 are similar to said processes above, and next process is shown in a plan view FIG. 72.

Embodiment 4

Figure 28:
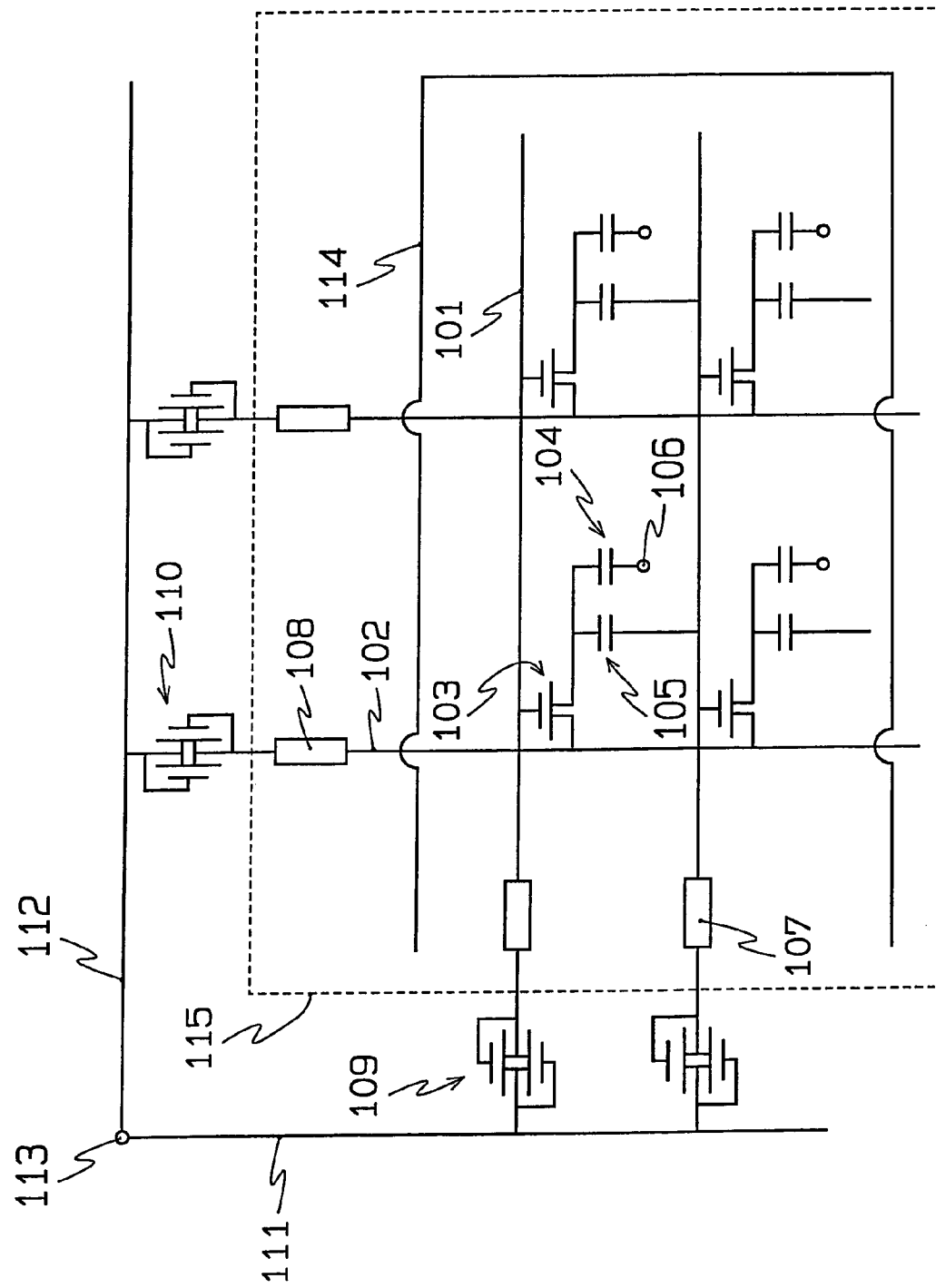
FIG. 28 is a circuit diagram showing a TFT array substrate of an active matrix type liquid crystal display to which the present invention is applied.

FIG. 28 is an example of a circuit diagram showing a TFT array substrate of an active matrix type liquid crystal display (AMLCD) to which the present invention is applied. The circuit structure shown in FIG. 28 is referred to as a Cs on gate type in which a retaining capacitance Cs is formed by a pixel electrode and a gate line. The reference numeral 101 denotes a gate line for supplying a scan voltage, the reference numeral 102 denotes a source line for supplying a signal voltage, the reference numeral 103 denotes a thin film transistor (TFT) to be used as a switching element when applying a voltage is to be applied to a liquid crystal, the reference numeral 104 denotes a liquid crystal for switching transmission/non-transmission of light through a capacity on an equivalent circuit basis, the reference numeral 105 denotes a retaining capacitance Cs provided in parallel with the liquid crystal 104 and serving to reduce the influence of a parasitic capacitance of the TFT, the reference numeral 106 denotes a common electrode for connecting an electrode on one of sides of the liquid crystal 104 to a common voltage, the reference numeral 107 denotes a gate terminal for connecting a gate side external circuit to the gate line 101 through a TCP or the like, the reference numeral 108 denotes a source terminal for connecting the source side external circuit to the source line 102 through the TCP or the like, the reference numerals 109 and 110 denote a high resistance element formed of a TFT or a linear or non-linear element having a high resistance and serving to electrically isolate the gate terminal 107 and the source terminal 108 during signal application and to electrically couple them when static electricity having a high voltage is applied, the reference numeral 111 denotes a line A connected to the gate line 101 through the high resistance element 109, the reference numeral 112 denotes a line B connected to the source line 102 through the high resistance element 110, and the reference numeral 113 denotes a connecting portion for connecting the line A (111) and the line B (112) for taking countermeasures against the static electricity. The reference numeral 114 denotes a repair line to be used when the source line has an open failure or the like. A counter substrate provided with a color filter opposite to the TFT array substrate is combined, a liquid crystal is injected. Then, the outside of a region 115 shown in a dotted line of FIG. 28 is cut away. Thus, an LCD (liquid crystal display) panel is obtained.

Moreover, it is not necessary to form at least a part of a portion outside the region 115 shown in the dotted line during the formation of the TFT array in some cases.

FIGS. 29, 30 and 31 are sectional views showing a process for manufacturing the TFT array substrate in which the number of photolithographic steps (the number of masks) according to the present invention is reduced, illustrating the manufacturing process implementing a circuit of the TFT array substrate shown in FIG. 28. FIG. 32 is a plan view corresponding to FIGS. 29, 30 and 31, and FIGS. 29, 30 and 31 show a section taken along the line Y-Y in FIG. 32 and the sectional structure of a gate—source terminal portion.

In FIGS. 29, 30 and 31, the reference numeral 211 denotes an insulating substrate, the reference numeral 212 denotes a gate electrode and a gate line which are formed of a transparent conductive layer, and the reference numeral 213 denotes a gate electrode and a gate line which are formed of a metallic layer. The reference numerals 212 and 213 form the gate line 101. The reference numeral 204 denotes a pixel electrode formed of a transparent conductive layer, the reference numeral 215 denotes a pixel electrode formed of a metallic layer, the reference numeral 216 denotes a gate insulating film, the reference numeral 217 denotes a semiconductor layer (active layer), the reference numeral 218 denotes a semiconductor layer (contact layer) containing an impurity such as P or B with a high concentration, the reference numeral 219 (219a and 219b) denotes a photosensitive organic resin capable of being used as a photoresist, the reference numeral 220 (220a, 220b and 220c) denotes a conductor layer to be a source electrode and a drain electrode, the reference numeral 102 denotes a source line, the reference numeral 103 denotes a thin film transistor (TFT) portion, the reference numeral 221 denotes a retaining capacitance electrode, the reference numeral 222 denotes an insulating film such as $Si_3N_4$ or the like, and the reference numeral 230 denotes a semiconductor region in the plan view (FIG. 32).

The reference numerals used in FIG. 32 which are the same numerals shown in FIG. 28 to FIG. 31 denotes the same contents.

Next, the manufacturing method according to the present invention will be described.

A transparent conductive layer such as IOT (Indium Tin Oxide), $SnO_2$ or InZnO or a transparent conductive layer comprising their multilayer or mixed layer is formed on the insulating substrate 211 by a method such as sputtering, evaporation, coating, CVD, printing or a sol-gel method. Subsequently, a layer of a substance formed of a metal such as Cr, Al, Mo, W, Ti, Cu, Ag, Au or Ta, an alloy comprising them as a main component or a metal having them multilayered and having a lower resistance than that of the transparent conductive layer is provided on the transparent conductive layer by the method such as sputtering, evaporation, CVD or printing. Consequently, it is possible to obtain a line structure in which a low resistance layer formed of at least one metal is provided on the transparent conductive layer. Next, the gate electrodes and the gate line patterns 212 and 213 comprising the transparent conductive layer and the low resistance layer such as a metal are formed by photolithography using a photoresist or the like and succeeding etching. At this time, pixel electrode patterns 214 and 215 are simultaneously formed with a layer structure comprising the transparent conductive layer having the same material and structure as those of the gate line and the low resistance layer such as a metal (FIGS. 29(*a*) and 32(*a*)).

In general, a polycrystalline silicon is also used for the transparent conductive layer such as the ITO. In this case, a substance containing ferric chloride or HCl and nitric acid as a main component is used as an etchant for the ITO or the like, for example.

However, if the ITO layer 214 is formed to be amorphous and the metallic layer 215 is formed thereon at such a temperature that the ITO is crystallized or less, for example, the ITO can be etched with comparatively weak acid such as oxalic acid because it is in an amorphous state. In the case in which Al or the like is used for a metallic layer, the metal such as Al is rarely etched during the etching of the ITO. For structure formation, the ITO may be maintained to be amorphous until the metal is completely etched. For this reason, it is desirable that the metal such as Al should be formed at a temperature 160° C. or less at which the ITO is not crystallized.

Moreover, the ITO may be etched by using a gas such as HCl, HBr or HI.

Subsequently, there are consecutively provided an insulating film 216 comprising $Si_3N_4$, SiOxNy, $SiO_2$, $Ta_2O_5$ or $Al_2O_5$, a substance slightly deviated their stoichiometric composition or their multiplayer which is to be formed as a gate insulating film by various CVD methods such as plasma CVD, sputtering, evaporation or coating, an a-Si:H film (hydrate amorphous silicon film) 217 to be used as a semiconductor layer (active layer) for a channel which is formed by the plasma CVD or the sputtering, for example, and is intentionally doped with no impurity to be a dopant or is intentionally doped with the impurity and has a concentration of the impurity reduced to be approximately 50 ppm or less or a dopant impurity reduced to such that a leakage current does not exceed 50 pA in the dark on the actual usage voltage conditions of the TFT, and an $n^+$a-Si:H film or a microcrystal $n^+$Si film 218 to be a semiconductor layer (contact layer) which is formed by the plasma CVD or the sputtering to take a contact with a metal and is doped with an impurity with a high concentration in which an impurity such as phosphorus, antimony or boron is present in the film at an atom ratio of 0.05% or more, for example.

Next, the whole surface is first coated with a photoresist. Then, a photoresist pattern is formed by exposure using a photomask. The shape of the photoresist pattern is obtained in the following manner. First of all, the photoresist is not formed in at least a part of a portion to be a pixel electrode and a contact hole portion as shown in FIG. 29(*b*) or FIG. 32(*b*) (region C). A photoresist having a thickness A is formed in a portion formed of the a-Si:H film and leaving the semiconductor layer (region A, 219*a*). For example, only the a-Si:H film 217 and the $n^+$a-Si:H film 218 are etched and a photoresist having a thickness B is formed in a region where the gate insulating film 216 is to remain (region B, 219*b*). The thickness of the photoresist of the region A (219*a*) is set be greater than that of the photoresist (219*b*) of the region B. It is desirable that the region B (219*b*) should be formed between adjacent source lines on the gate line, for example, the a-Si:H film 217 and the $n^+$a-Si:H film 218 in that portion should be removed and a portion between the adjacent source lines should be brought into an electrically insulation state. Moreover, at least a part of the source line may leave the semiconductor layers 217 and 218 on a lower layer as the region A on a lower layer such that the disconnection of the source line can be prevented.

Such a difference in the thickness of the photoresist depending on a place is made in the following manner. A positive photoresist will be described. A negative photoresist pattern is also formed basically in the same manner.

In a portion where the photoresist is not formed, a mask is brought into an almost transparent state, and light is fully transmitted in such an amount as not to leave the photoresist during development. As a result, a region C in which the photoresist is not formed is provided. On the other hand, a portion having the thickness A of the photoresist, for example, a mask portion corresponding to that position, is shielded by a material which does not transmit light, for example, Cr having such a great thickness as to rarely transmit the light. As a result, the light is not sufficiently incident on the photoresist in this portion during exposure. Therefore, it is possible to implement the region A in which the photoresist remains with a sufficient thickness during development. The photoresist in the region B having the thickness B of the photoresist is exposed in an intermediate amount of exposure between the regions A and C. By thus adjusting the amount of exposure, the thickness of the region B is set to be smaller than that of the region A during the development. As a result, the shape of photoresist shown in FIGS. 29(*b*) and 32(*b*) can be implemented. The amount of exposure or the amount of light is represented by a light intensity X time for radiation.

In order to set the thickness of the photoresist to be region A>region B>region C (substantially zero), the amount of exposure for the photoresist in the region B is equal to the intermediate amount of exposure between the regions A and C (the amount of exposure is region A<region B<region C) by several methods. For example, a transmittance of the pattern on the mask forming the region B is set to be higher than that in the region A portion on the mask used when forming the region A, and is set to be lower than that in a portion forming the region C. For example, the thickness of a shielding material such as Cr to be used as a shielding film of the photoresist in the portion forming the region B may be set to be smaller than that of the portion forming the region A, thereby controlling the amount of light. Alternatively, a single insulating layer or more may be formed in the region B portion to change a transmittance, a reflectance, a phase or the like such that the transmittance of the region B is set to be substantially lower than that of the region C.

In order to set the amount of exposure to be region A<(substantially zero)<region B<region C, the following method can also be employed. The pattern is formed on the mask in the shielding portion having a lower transmittance than that with respect to the regions A and B and a pattern provided with no shielding pattern which has a sufficient transmittance for the region C is formed on the mask, for example. Subsequently, only exposure is carried out in an amount 1 by using a mask having a shielding pattern of the region A+the region B to radiate light on the region C. Next, the exposure is carried out in an amount 2 by using a mask having a pattern in which only a portion corresponding to the region A is shielded. The light is irradiated in the amount 2 in portions other than the portion where the region A is formed. At this time, the amount 1 of exposure is set such that the exposure is carried out with such an intensity as to sufficiently remove the photoresist in the region C during the development and the amount 2 of exposure is set such that the photoresist having a thickness required for the region B remains during the development. In general, in the case in which the positive photoresist is used, the amount 1 is set to be larger than the amount 2 such that a result of calculation for a light intensity X a light irradiation time during light irradiation is increased.

As a third method of setting the thickness of the photoresist to region A>region B>region C (substantially zero), a pattern is formed on a mask with a shielding layer having a lower transmittance and a pattern provided with no shielding pattern having a sufficient transmittance for the region C is formed. Thus, the region A is formed.

Figure 33:
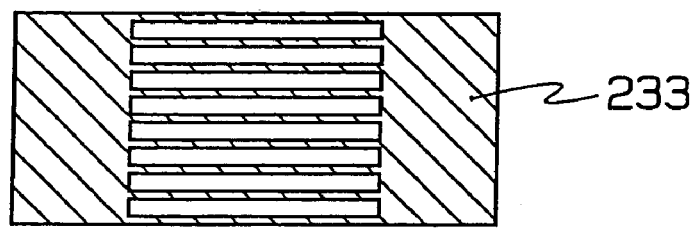
FIG. 33 is a view showing an example of a pattern of a half tone mask.

For the region B, a so-called half tone mask shown in FIG. 33 may be used, for example. The half tone mask is formed such that a space frequency of the shielding pattern on the mask is set to be higher than a pattern resolution as in a pattern 233 and the pattern of the mask cannot be resolved over the photoresist and an exposure intensity is more reduced than that in the region C. The half tone mask is repeated with such a fineness having a cycle in which the total width of a light shielding portion and a light transmitting portion is 6 µm or less.

As a result, the thickness of the photoresist can be set to be region A>region B>region C (substantially zero). Consequently, the shape of the photoresist shown in FIGS. 29(b) and 32(b) can be implemented.

Subsequently, a semiconductor film such as an n$^+$a-Si:H film and an a-Si:H film and a gate insulating film such as an Si$_3$N$_4$ film are etched. The etching is carried out by using a gas containing HCl as a main component, a gas containing CH$_4$ as a main component, a mixed gas of CF$_4$ and O$_2$, a gas containing SF$_6$ as a main component or the like. As a result, these films are removed on a portion where light is to be transmitted in at least a portion to be a pixel electrode. Moreover, in a terminal portion 223 to be connected to a TCP or the like to externally input a signal through a gate line, for example, a portion (FIG. 28, 113 or the like) short-circuited with a source line portion directly through a source line, a TFT or a resistor to prevent static electricity, a part of the n$^+$a-Si:H film, the a-Si:H film and the gate insulating film such as Si$_3$N$_4$ may be removed at this step (FIG. 30(a)).

The n$^+$a-Si:H film, the a-Si:H film and the gate insulating film such as Si$_3$N$_4$ may be wholly etched with a single gas such as CF$_4$ or CH$_4$O$_2$. For example, the a-Si TFT film is etched with such a gas that the etching of the SiN film can be controlled. Thus, at least the a-Si:H film and the Si$_3$N$_4$ film may be subjected to dry etching with a separate etching gas.

In this case, SF$_6$, HCl or F123, their mixed gas or a mixed gas with an inert gas or O$_2$ is used for the etching of the a-Si:H film, and CF$_4$ or F$_6$, their mixed gas or a mixed gas with O$_2$ or an inert gas may be used for the etching of the Si$_3$N$_4$ film.

Next, a plasma capable of reducing the thickness of the resist such as an oxygen plasma is used to carry out ashing, thereby scraping a resist. Thus, the resist is removed from the region B (219b). At this time, the thickness of the resist in the region A (219a) is smaller than an initial thickness. The thickness to be controlled to fully protect a portion which is not subjected to etching during subsequent etching. Then, at least the n$^+$a-Si:H film and the a-Si:H film are etched by dry etching or the like and is removed from the region B (FIG. 30(b)).

The step of reducing the thickness of the resist is not carried out independently, and the n$^+$a-Si:H film, the a-Si:H film and the gate insulating film such as Si$_3$N$_4$ are etched. Thus, the photoresist in the region B may be simultaneously scraped by utilizing such a phenomenon as to somewhat cut the photoresist itself.

Thereafter, the metallic layer 215 provided on the pixel electrode 214 in the portion removed by the etching of the n$^+$a-Si:H film, the a-Si:H film and the gate insulating film such as Si$_3$N$_4$ in FIG. 30B is removed through wet etching or dry etching (FIG. 31(a)). Next, the photoresist is removed.

Subsequently, there is provided a conductive layer 220 (220a, b and c) to be a source electrode, a source line and a drain electrode formed of Cr, Al, Ti, Ta, W, Mo, Mo—W or Cu, an alloy containing them as a main component, their multilayered product or the like, for example. Then, a line pattern is formed on the shapes of the source electrode, the source line and the drain electrode by photolithographic, and is then subjected to wet etching, dry etching or the like. Thereafter, an n$^+$ semiconductor layer 218 formed of the a-Si:H film or the like between the source electrode 220c and the drain electrode 220b is removed by the dry etching. Finally, the resist is finally taken away. Thus, a predetermined pattern is formed (FIGS. 31(b) and 32(c)). At this time, a retaining capacitance electrode 221 to be fabricated simultaneously with the formation of the source line is opposed to the gate line 212 or 213 in a next stage or a last stage, for example, through at least the gate insulating film 216 in order to form a retaining capacitance Cs. At this time, the n$^+$a-Si:H film and the a-Si:H film as well as the gate insulating film 216 may remain between the retaining capacitance electrode 221 and the gate insulating film 216. The holding capacity electrode should be connected to at least a part of the pixel electrode as shown.

Then, a passivation film 222 is formed by an insulating film comprising Si$_3$N$_4$, SiO$_2$, or their mixture or multilayered product. In order to input at least a signal by photolithography, a pattern is formed such that a contact hole can be provided in a gate terminal portion 224 and a source terminal portion 225 which are to be connected to an external TCP or the like. Next, the contact hole is formed by dry etching or wet etching using a CF$_4$ based gas or the like. After the etching is completed, a photoresist is removed. Consequently, a TFT array is formed (FIG. 31(c) and FIG. 32(d)).

Subsequently, an orientation film is formed on the TFT array and is opposed to a counter substrate having an orientation film and a common electrode formed on at least a surface, and a liquid crystal is injected therebetween. Thus, an active matrix type liquid crystal display is formed.

By the above-mentioned process, the TFT array and the liquid crystal display using the same are formed with the structure shown in FIG. 28.

While FIG. 28 shows the repair wiring 114 for the source line which is formed by using a gate line material, for example, the repair line 114 may be formed depending on circumstances.

Figure 34:
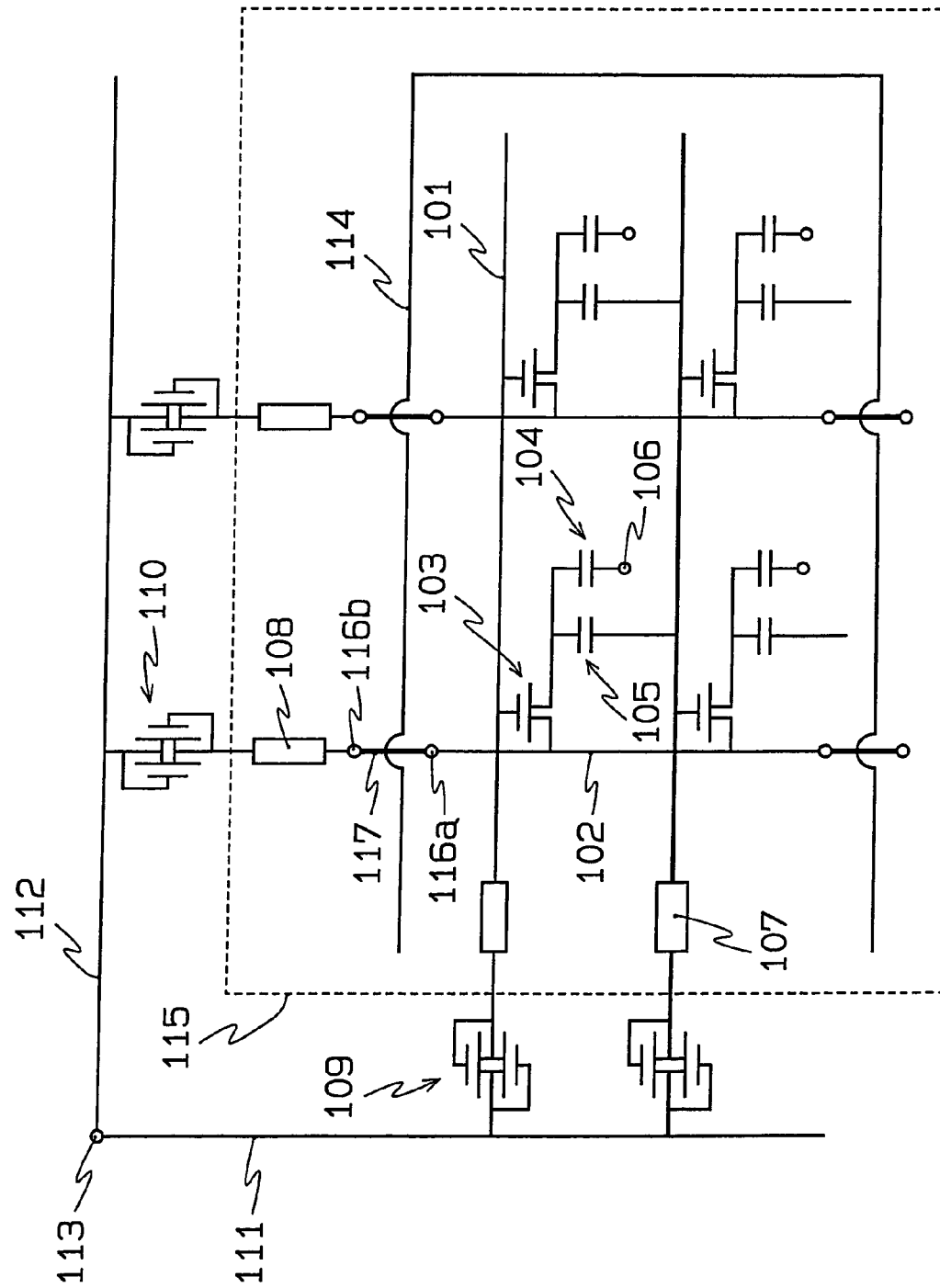
FIG. 34 is a circuit diagram showing an example of a cross portion of a source line and a repair line.

As shown in FIG. 34, moreover, the source line 102 may be once converted into the line 117 to be the same layer as the gate line formed of a gate line material by utilizing the contact holes 116a and 116b in the cross portion with the repair line 114. At this time, the repair line 114 is formed by using the source line material.

In FIG. 31(a), the metal layer 215 provided on the pixel electrode 214 formed of the gate electrode material is removed. In FIG. 31(b), the source—drain electrodes 220b and 220c and the source line 102 are subjected to etching and patterning. In the case in which both are formed of the same material, the etching of the gate electrode material 215 shown in FIG. 31(a) is omitted. In FIG. 31(b), when the source line 220 is to be etched, the pixel electrode 215 formed of the gate electrode material may be simultaneously removed by the etching.

Figure 32A:
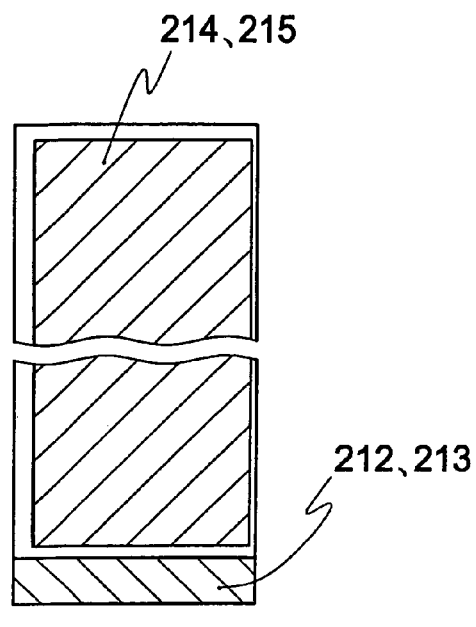
FIGS. 32(a) to 32(d) are plan views corresponding to FIGS. 29, 30 and 31.
Figure 32B:
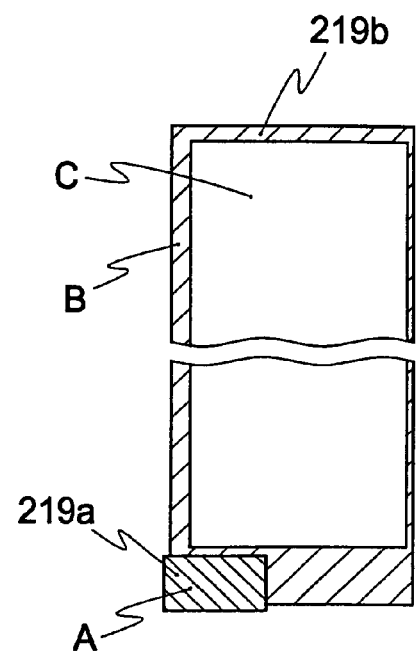
Figure 32C:
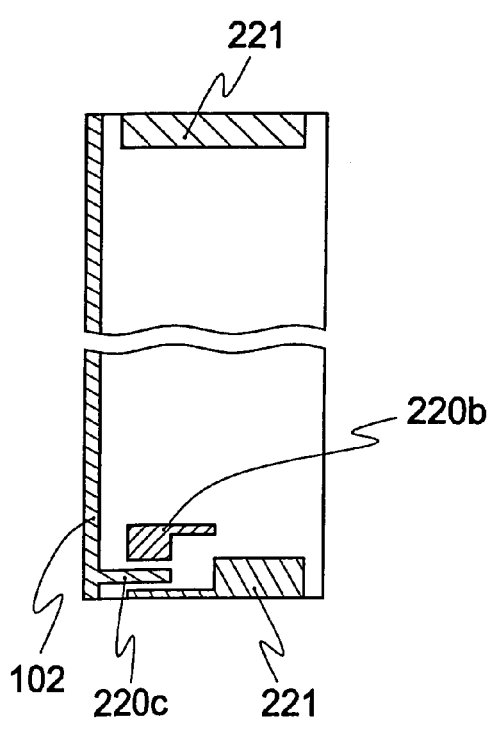
Figure 32D:
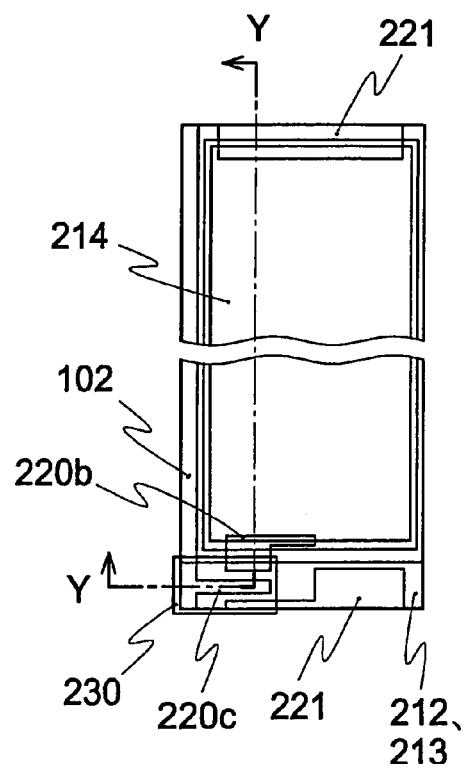
Figure 73:
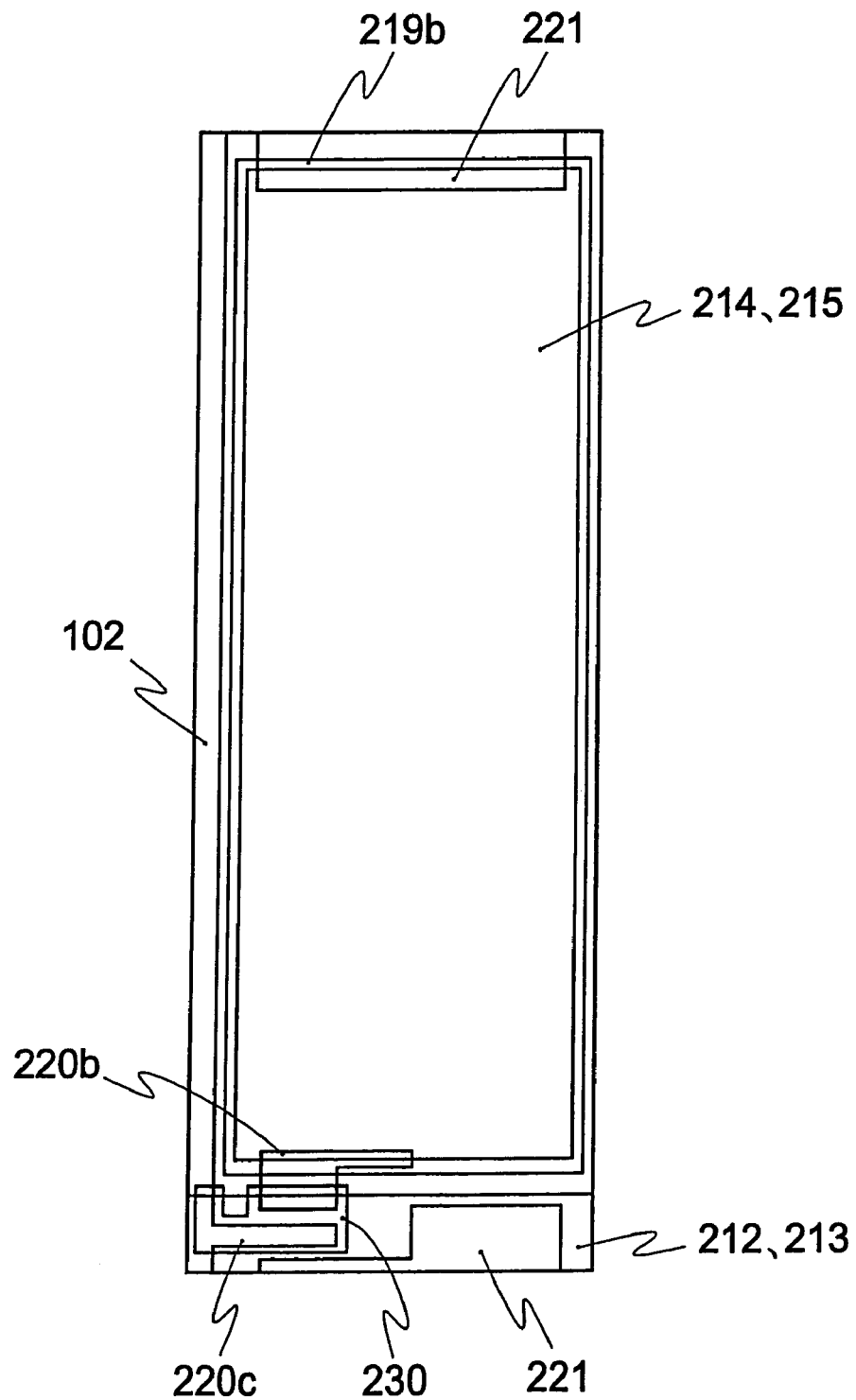
FIG. 73 is an explanatory view showing a semiconductor region of another embodiment corresponding to the embodiment shown FIG. 32(d)

The shape of the semiconductor region 230 is extended over the gate line 213 both to upper and under side in FIG. 32(d). In another case, the semiconductor region 230 may preferably be included in the gate line in its upper or under side or both sides as shown in FIG. 73. In case shown in FIG. 32(d), upper side of semiconductor region 230 is extended over the gate line, so the gate off bias potential is not applied to this portion causing a leakage current when a light is exposed. For avoiding the leakage current, it is effective to form a recession particularly on the upper side of the semiconductor region 230 to make an intersection with the outer edge of the gate line.

Having the semiconductor region 230 be included in the gate line region at least in the source electrode region passively in both of source and a part of drain electrode region so that a part of the semiconductor region 230 surrounding the source electrode exists only on the gate line (electrode), the gate electrode shields the light exposed from the back side of it to the semiconductor region 230 so preventing the leakage current due to the light.

Figure 74:
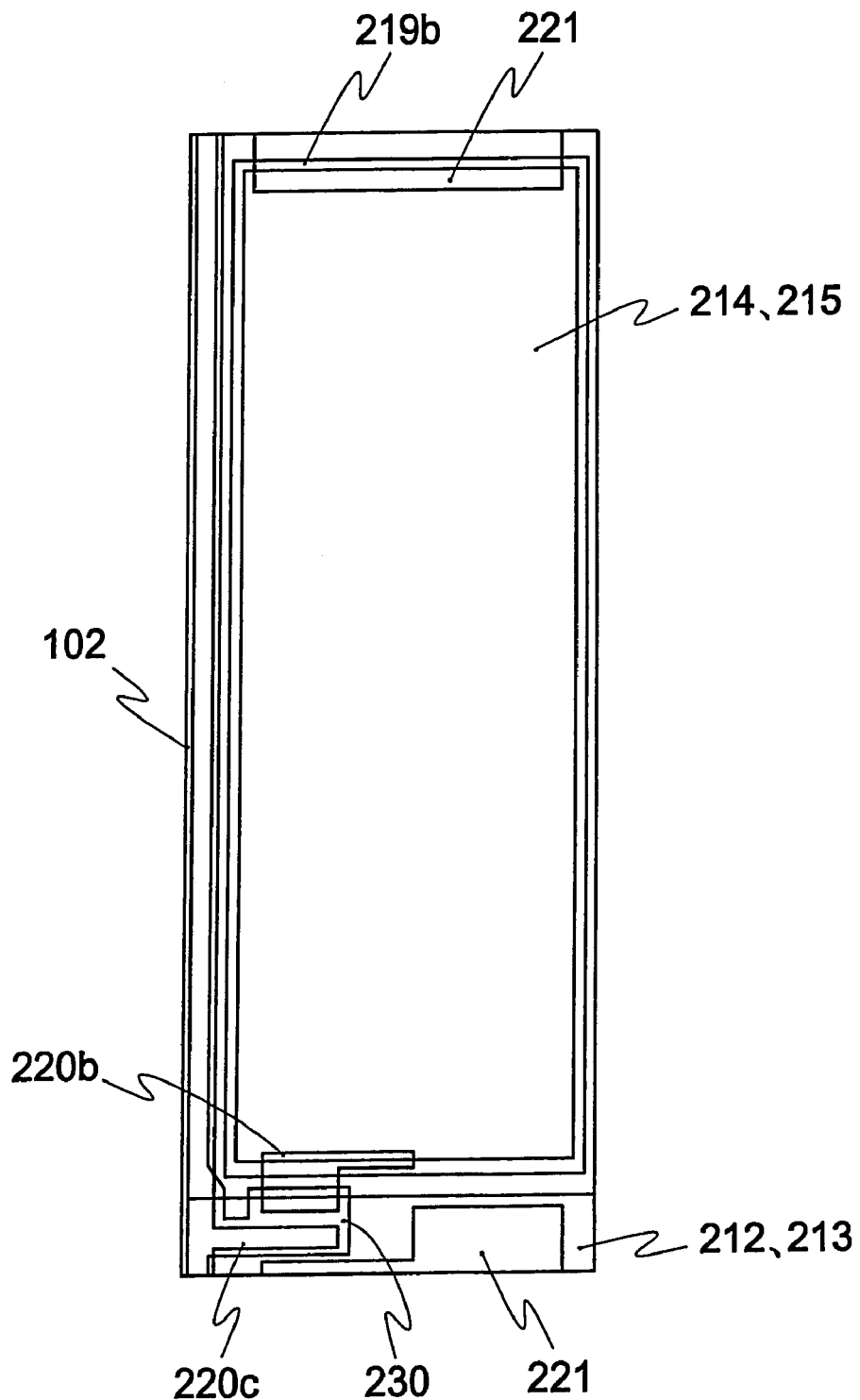
FIG. 74 is an explanatory view showing a semiconductor region of still another embodiment corresponding to the embodiment shown FIG. 32(d).

Further extending the semiconductor region 230 beneath the source line as shown in FIG. 74, anticipated cut off of the source line at the end step of the semiconductor region 230 is prevented.

Reformation of the semiconductor region 230 as above mentioned is also effective for any other embodiments. Embodiment 1 as shown in FIG. 1, for example, has a like arrangement of the semiconductor region.

Embodiment 5

Figure 35:
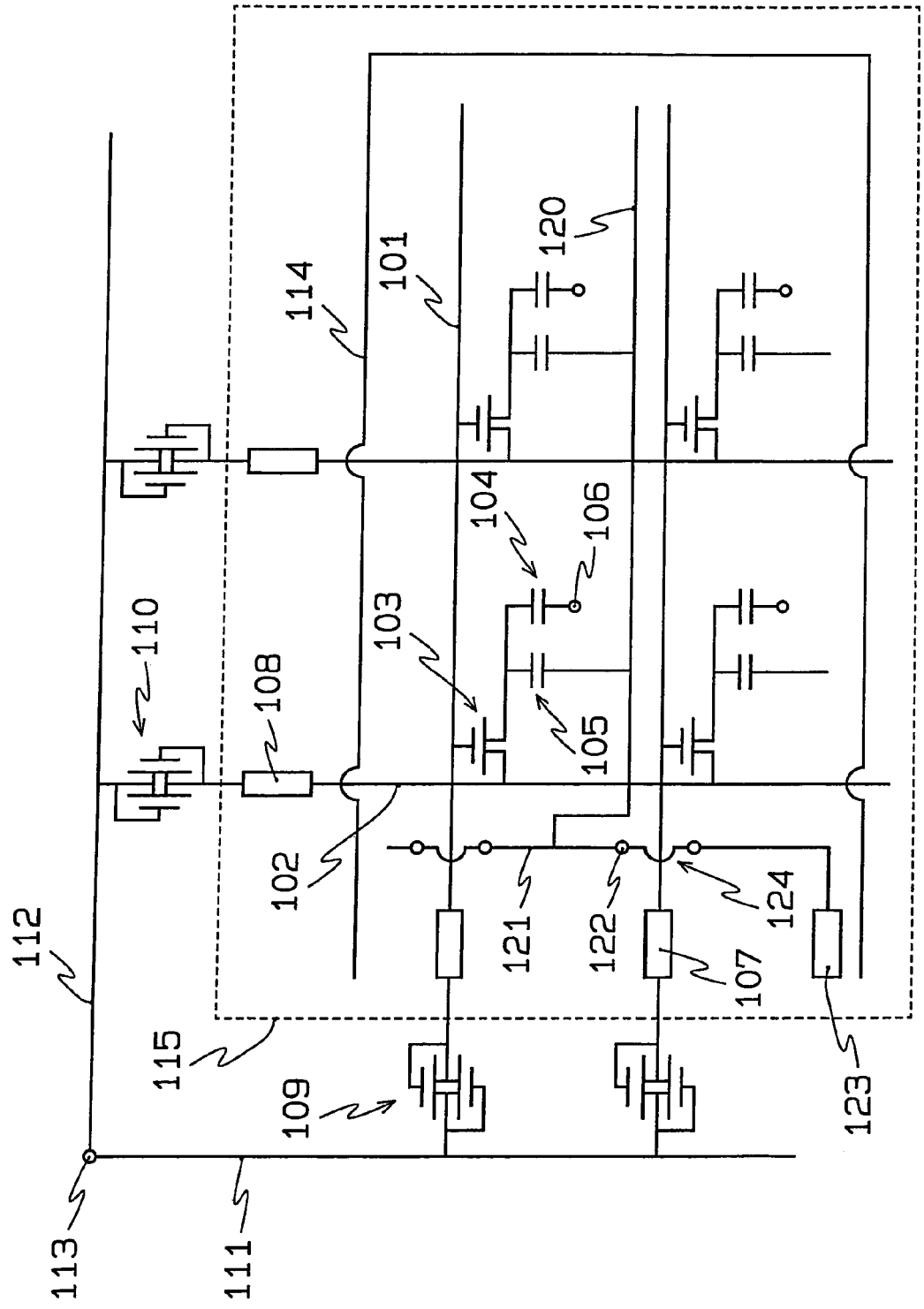
FIG. 35 is a circuit diagram showing a common line method in which a retaining capacitance line is provided separately from a gate line.

While the so-called Cs on gate structure in which the retaining capacitance 105 is formed between the gate lines in next and last stages has been described in the above embodiments, it is also possible to employ a common line structure in which a retaining capacitance wiring advantageous to one gate delay is formed separately from the gate line as shown in a circuit diagram of FIG. 35. The holding capacity 105 is connected to a common line 120. Moreover, the common line 120 is connect to a common line lead line 121 through a contact hole 122. A common voltage is externally applied through a common line terminal 123 connected to the common line lead line 121. The functions and reference numerals in other portions are identical to those of FIG. 28.

Figure 36:
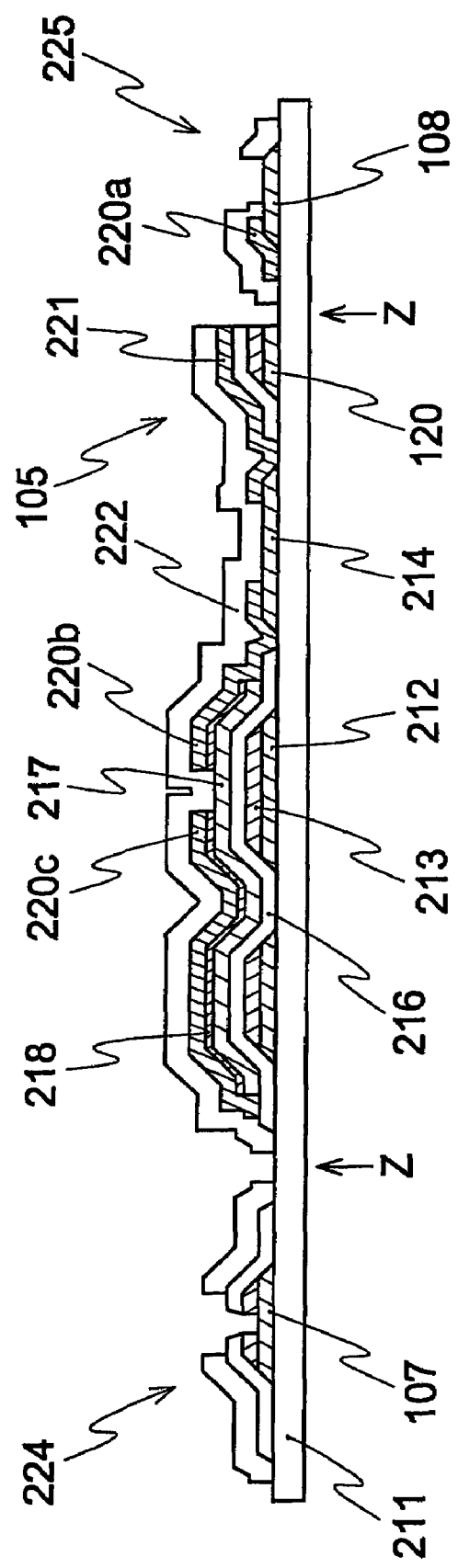
FIG. 36 is a sectional view showing a structure of the common line method.
Figure 37A:
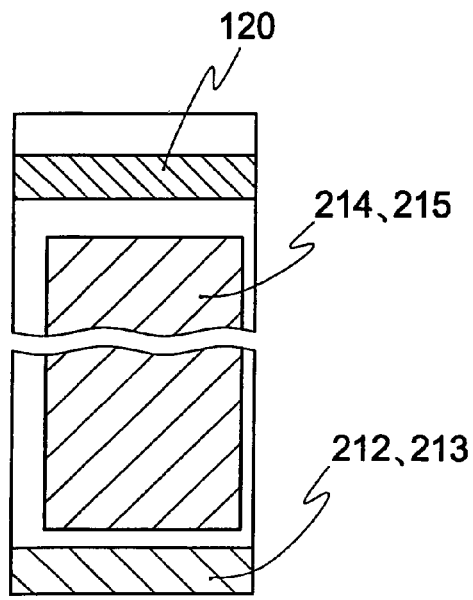
FIGS. 37(a) to 37(d) are plan views corresponding to FIG. 9.
Figure 37B:
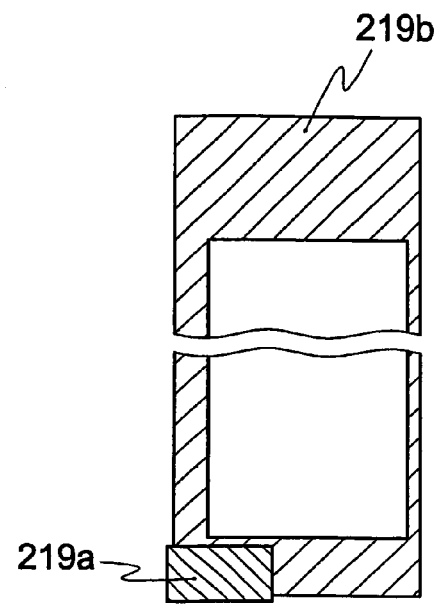
Figure 37C:
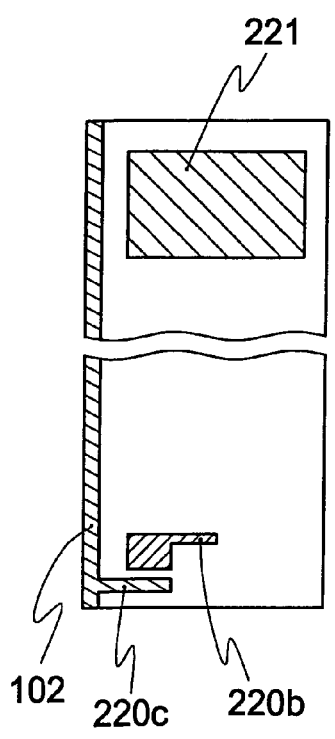
Figure 37D:
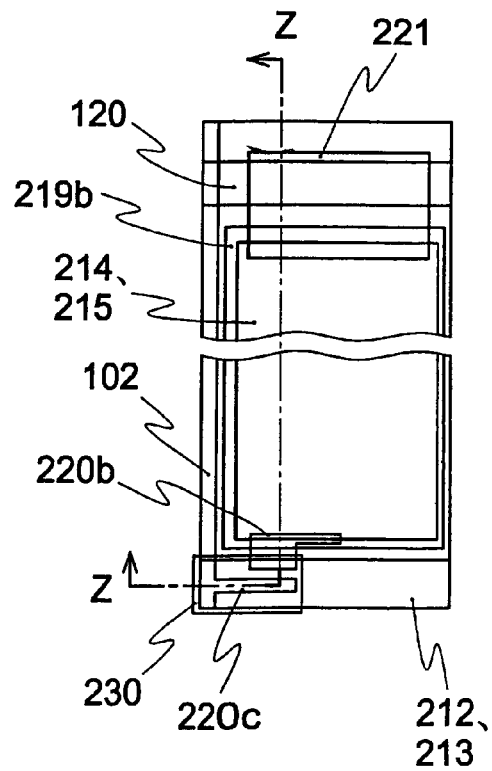
Figure 38:
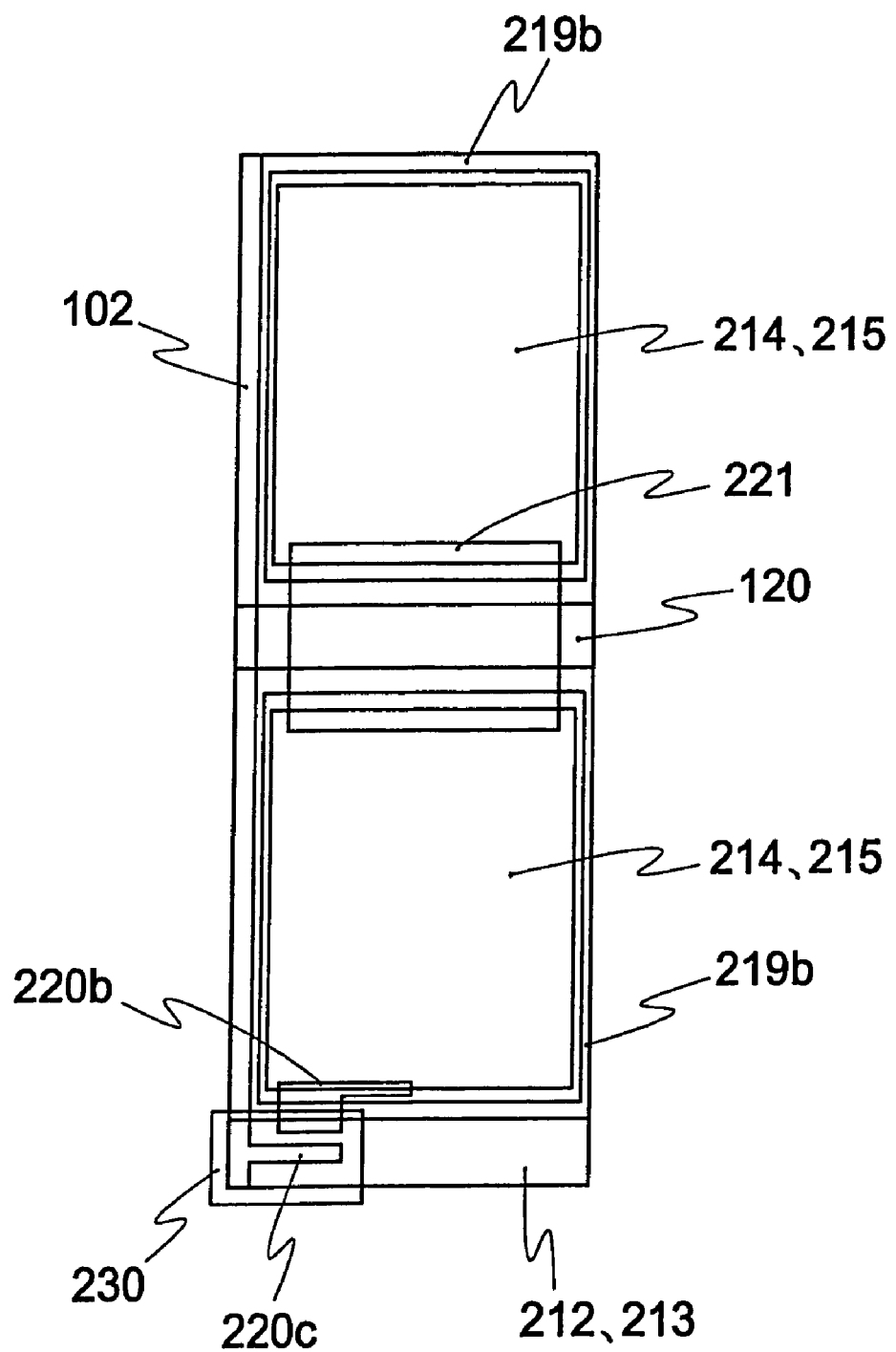
FIG. 38 is a plan view showing another example of the common line method.

In a common line method, for example, a sectional structure shown in FIG. 36 and a plane arrangement shown in FIG. 37 are employed. As shown in FIG. 38, moreover, the common line 120 may be formed in a pixel, a pixel electrode may be divided into two portions, and a portion therebetween is bridged through the holding capacity electrode 121 formed simultaneously with the formation of a source line, where the holding capacity 105 may be formed.

In the case in which the common line structure is employed as shown in FIG. 37, the common line 120 led in parallel with the gate line and the common line lead line 121 collecting the common line 120 running vertically to the gate line are required. It is the best way that the common line is formed by the same material as that of the gate line 101 simultaneously with the formation of the gate line 101. A material of a source line 102 having a different layer from that of the gate line is used for at least a cross portion 124 of the common line lead line with the gate line. Depending on circumstances, the common line lead line may be formed by the gate line material in portions other than the cross portion with the gate line.

Figure 39:
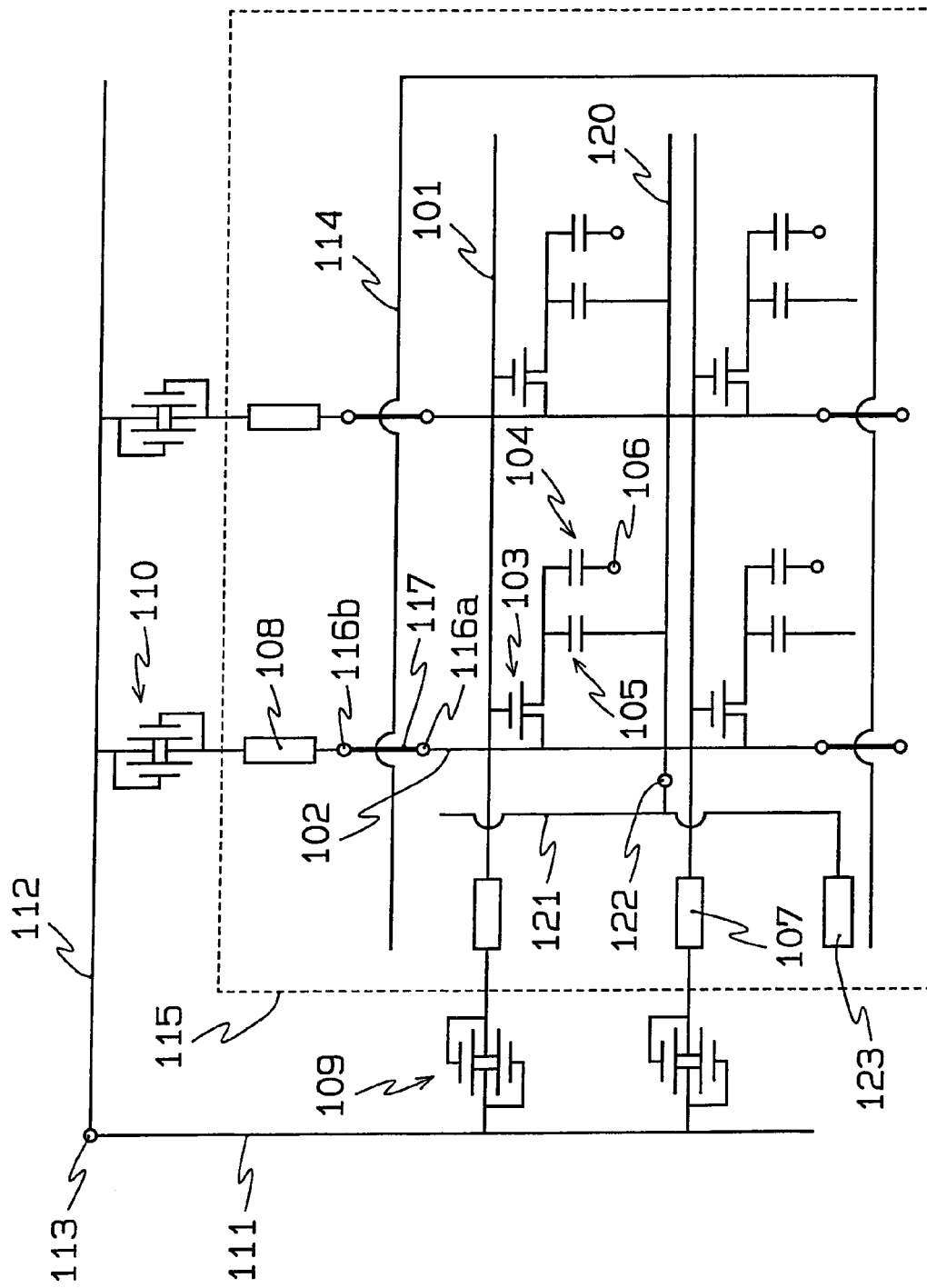
FIG. 39 is a circuit diagram showing a cross portion of a source line and a repair wiring in the common line method.

As shown in FIG. 39, the source line 102 may be once converted into a line 117 having the same layer as that of the gate line formed by the gate line material by utilizing contact holes 116a and 116b in the cross portion with the repair line 114.

Embodiment 6

While the insulating film 222 is formed to cover the whole TFT array in the above-mentioned embodiments, the insulating film does not need to be formed. If the formation of the insulating film is omitted, the number of masks is three. In this case, the a source line might be corroded outside a liquid crystal seal. Therefore, the source line is converted into a gate line material by using the contact hole inside the seal before getting out of the seal. Consequently, it is possible to prevent the source line from being corroded.

Embodiment 7

Figure 40:
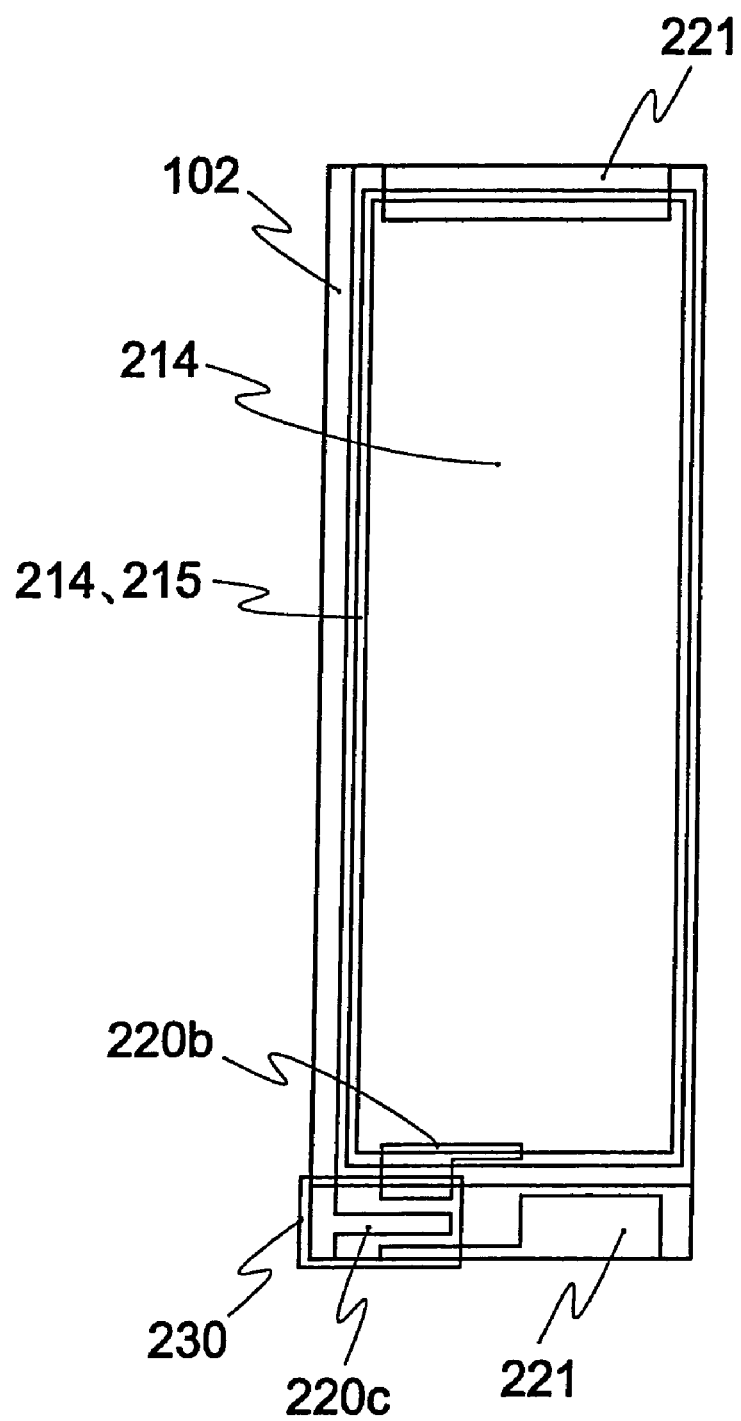
FIG. 40 is a plan view showing an example of plane arrangement in which a shielding pattern is formed around a pixel electrode.

In the step of FIG. 29(b), the resist pattern 219b in the region B may be overlapped with the pattern (214, 215) of the pixel electrode. Consequently, the metal layer 215 is caused to remain on the periphery of the pixel electrode (transparent conductive layer) 214 as shown in FIG. 40. Thus, a shielding pattern comprising two layers 214 and 215 is formed.

Embodiment 8

Figure 41A:
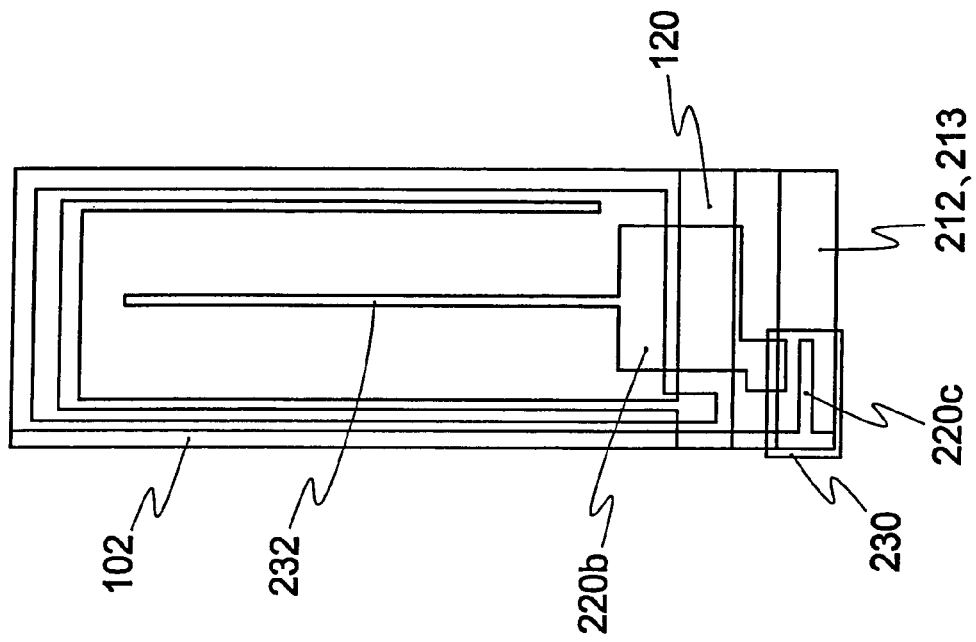
FIGS. 41(a) and 41(b) are plan views showing an example of plane arrangement of an IPS mode.
Figure 41B:
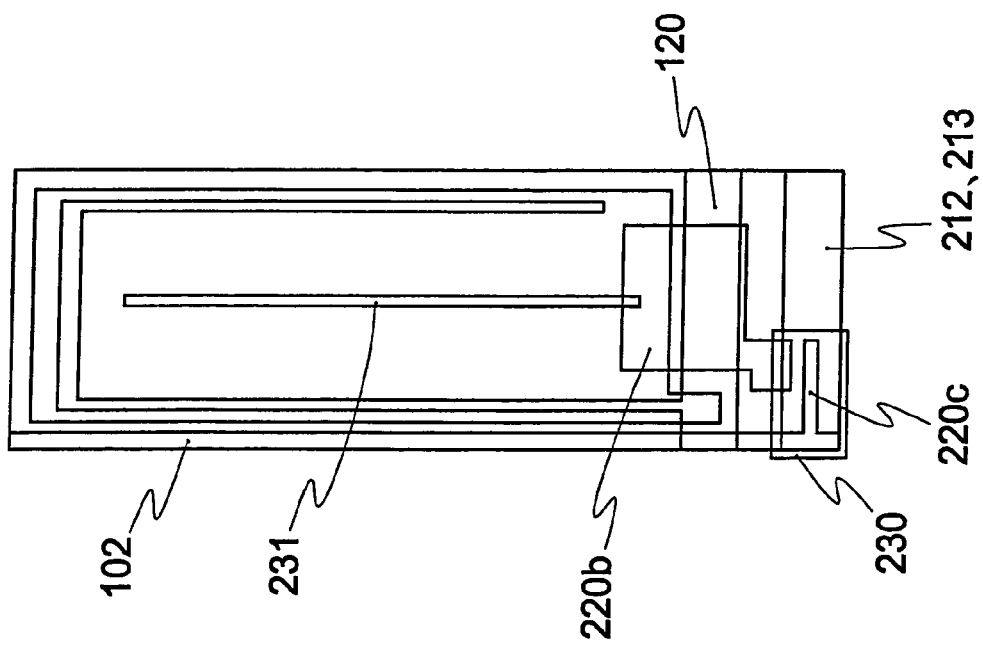

While the case in which the common electrode for applying a voltage to the liquid crystal itself is provided on the counter substrate has been described in the above embodiments, the present invention can also be applied to the case in which all electrodes for applying a liquid crystal voltage are provided in a transverse electric field application TFT substrate in an IPS (In-Plane Switching) mode capable of implementing a wide field or the like. In this case, for example, the pixel electrode does not need to be a transparent conductive layer and may be a metal such as Cr. FIGS. 41(a) and 41(b) show examples of a plan view showing the IPS mode. The same components as those in FIGS. 32 and 37 have the same reference numerals.

In FIG. 41(a), a pixel electrode 231 is fabricated during the formation of the pixel electrodes 214 and 215 in FIG. 29(a).

In FIG. 41(b), a pixel electrode 232 is fabricated during the formation of the drain electrode in FIG. 31(b). In this case, the pixel electrode is not formed in FIG. 29(a).

In FIGS. 41(a) and 41(b), the gate electrode and the wiring are may be formed of only the metal layer 213. Moreover, the pixel electrodes 214 and 215 may also be formed of the metallic layer 215.

Embodiment 9

While only the thickness of the resist has been partially converted on the plane by using the technique such as a half tone mask as shown in FIGS. 29(a), 29(b) and 30(a) in order to make the a-Si:H film island-shaped in the above-mentioned embodiments, the step may be eliminated to carry out photolithography for making the a-Si:H film island-shaped separately. In this case, for example, the thickness of the resist is not changed spatially. In the state shown in FIG. 29(b), the thickness of the resist is not changed on the plane. The step of removing the SiN 216/a-SiH 217/n+a-Si:H 218 on the pixel electrodes 214 and 215 and the contact portion 223 is carried out and the resist is then removed. A pattern for forming an island of a transistor is created again and the a-Si:H film 217 and the n+a-Si:H film 218 in portions other than the TFT portion are removed by etching. Thus, the structure shown in FIG. 30(a) is created. In this case, the number of photolithographic steps is more increased than that in the embodiment shown in FIG. 29 to 31 but can be more reduced than that in the conventional art.

Embodiment 10

Figure 42A:
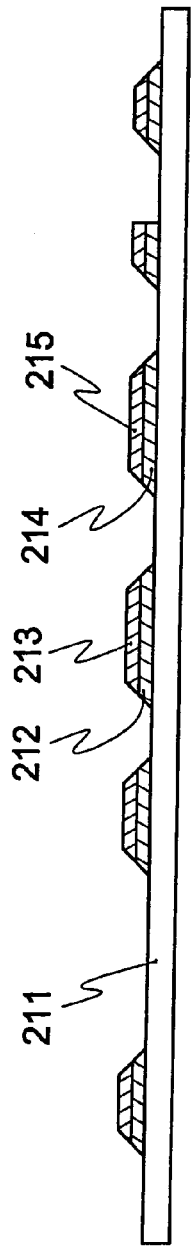
FIGS. 42(a) to 42(c) are sectional views showing another method of manufacturing a TFT array substrate according to the present invention.
Figure 42B:
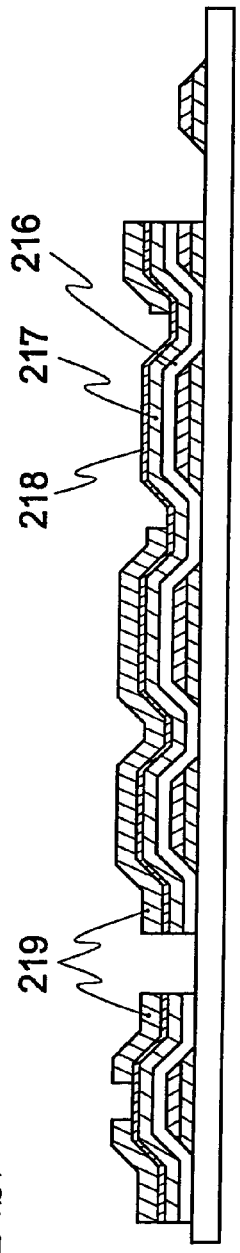
Figure 42C:
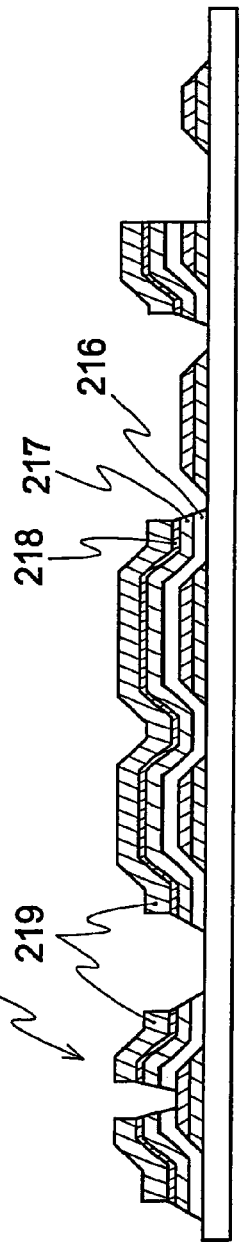
Figure 43A:
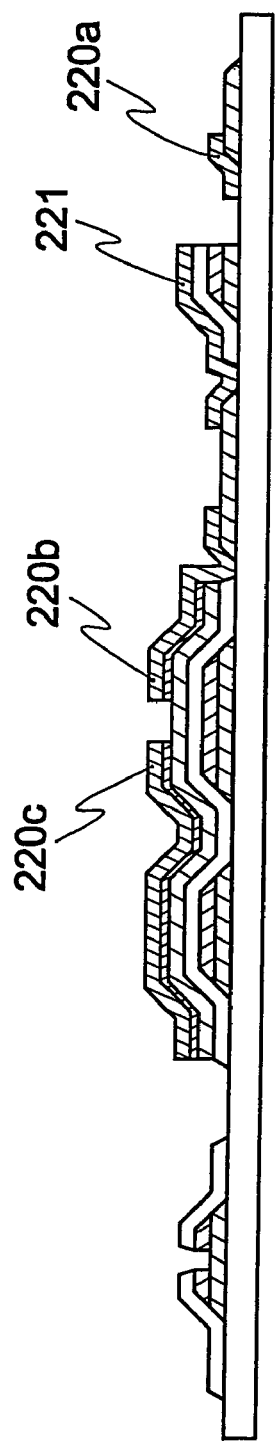
FIGS. 43(a) and 43(b) are sectional views showing a further method of manufacturing a TFT array substrate according to the present invention.
Figure 43B:
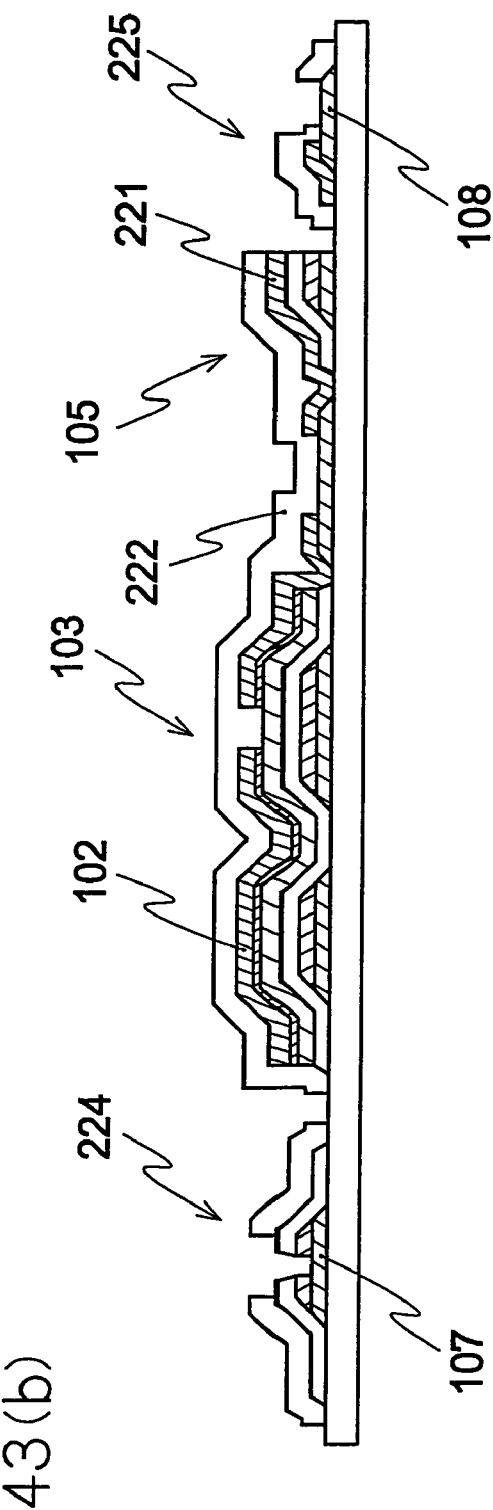

In embodiment 10, the gate insulating film 216 comprising SiN, the a-Si:H layer 218 and the metal layer 215 formed on the pixel electrode 214 formed of the gate line material are etched and the source—drain electrode and the wiring 220 are then formed. On the other hand, the gate insulating film 216, the a-Si:H layer 217 and the n+a-Si:H layer 218 in a portion where light in at least a pixel portion is transmitted may be removed by etching and the source-drain electrode 220 may be formed without using the step of spatially changing the thickness of the photoresist as shown in FIGS. 42 and 43. In this case, generally, the Si film 217 to be used as a channel cannot be made island-shaped.

Transparent conductor layers such as IOT (Indium Tin Oxide), $SnO_2$ or InZnO or transparent conductive layers 212 and 214 comprising their multilayer or mixed layer are formed on the insulating substrate 211 by a method such as sputtering, evaporation, coating, CVD, printing or a sol-gel method. Subsequently, layers 213 and 215 a substance formed of a metal such as Cr, Al, Mo, W, Ti, Cu, Ag, Au or Ta, an alloy comprising them as a main component or a metal having them multilayered and having a lower resistance than that of the transparent conductive layer are provided on the transparent conductor layer by the method such as sputtering, evaporation, CVD or printing. Consequently, it is possible to obtain a wiring structure in which a low resistance layer formed of at least one metal is provided on the transparent conductive layer. Next, the gate electrodes and the gate line patterns 212 and 213 comprising the transparent conductive layer and the low resistance layer such as a metal are formed by photolithography using a photoresist or the like and succeeding etching. At this time, pixel electrode patterns 214 and 215 are simultaneously formed with a layer structive comprising the transparent conductive layer having the same material and structure as those of the gate line and the low resistance layer such as a metal (FIG. 42(a)).

Subsequently, there are consecutively provided an insulating film 216 comprising $Si_3N_4$, $SiO_xN_y$, $SiO_2$, $Ta_2O_5$ or $Al_2O_5$, a substance slightly deviated their stoichiometric composition or their multilayer which is to be formed as a gate insulating film by various CVD methods such as plasma CVD, sputtering, evaporation or coating, an a-Si:H film (hydrate amorphous silicon film) 217 to be used as a semiconductor layer for a channel which is formed by the plasma CVD or the sputtering and is intentionally doped with no impurity to be a dopant or is intentionally doped with the impurity and has a concentration of the impurity reduced to be approximately 50 ppm or less or a dopant impurity reduced to such that a leakage current does not exceed 50 pA in the dark on the actual usage voltage conditions of the TFT, and an n+a-Si:H film or a microcrystal n+Si film 218 to be a semiconductor layer which is formed by the plasma CVD or the sputtering to take a contact with a metal and is doped with an impurity with a high concentration in which an impurity such as phosphorus, antimony or boron is present in the film at an atom ratio of 0.05% or more, for example.

Then, a photoresist is formed to remove the gate insulating film 216 comprising SiN or the like, the a-Si:H layer 217 and the n+a-Si:H layer 218 from the pixel portion where at least light is transmitted. Thereafter, etching is carried out (FIGS. 42(b) and 42(c)). At this time, the photoresist 219 is removed.

Subsequently, there is provided a conductor layer 220 (220a, b and c) to be a source electrode, a source line and a drain electrode formed of Cr, Al, Ti, Ta, W, Mo, Mo—W or Cu, an alloy containing them as a main component, their multilayered product or the like, for example. Then, a wiring pattern is formed on the shapes of the source electrode, the source line and the drain electrode by photolithographic, and is then subjected to wet etching, dry etching or the like. Thereafter, an n+ semiconductor layer 218 formed of the n+a-Si:H film or the like between the source electrode 220c and the drain electrode 220b is removed by the dry etching. Finally, the resist is finally taken away. Thus, a predetermined pattern is formed (FIG. 43(a)).

Then, a protective film is formed by an insulating film comprising $Si_3N_4$, $SiO_2$, or their mixture or multilayered product. In order to input at least a signal by photolithography, a pattern is formed such that a contact hole can be provided in a gate terminal portion 224 and a source terminal portion 225 which are to be connected to an external TCP or the like. Next, dry etching or wet etching using a $CF_4$ based gas or the like is carried out. After the etching is completed, a photoresist is removed. Consequently, a TFT array is formed (FIG. 43(b)). According to this method, the a-Si:H film 217 and the like remain in portions other than the TFT portion and the number of photolithographic steps (the number of masks) is four.

Embodiment 11

Although the semiconductor layer is formed of the a-Si:H film according to the above-mentioned embodiment, poly-Si (polycrystalline silicon) may also be used.

Embodiment 12

FIG. 28 is another example of a circuit diagram showing a TFT array substrate of an active matrix liquid crystal display (AMLCD) to be used for the present invention. The circuit structure shown in FIG. 28 is referred to as a Cs on gate type in which a retaining capacitance is constituted by a pixel electrode and a gate line. The reference numeral 101 denotes a gate line for supplying a scan voltage, the reference numeral 102 denotes a source line, the reference numeral 103 denotes a thin film transistor (TFT) to be used as a switching element when applying a voltage is to be applied to a liquid crystal, the reference numeral 104 denotes a liquid crystal for switching transmission/non-transmission of light through a capacitance on an equivalent circuit basis, the reference numeral 105 denotes a retaining capacitance provided in parallel with the liquid crystal 105 and serving to reduce the influence of a parasitic capacity of the TFT, the reference numeral 106 denotes a common electrode for connecting an electrode on one of sides of the liquid crystal 104 to a common voltage, the reference numeral 107 denotes a gate terminal for connecting a gate side external circuit to the gate line 101 through a TCP or the like, the reference numeral 108 denotes a source terminal for connecting the source side external circuit to the source line 102 through the TCP or the like, the reference numerals 109 and 110 denote a high resistance element formed of a TFT or a linear or non-linear element having a high resistance and serving to electrically isolate the gate terminal 107 and the source terminal 108 during signal application and to electrically couple them when a high voltage such as static electricity is applied, the reference numeral 111 denotes a line A connected to the gate line 101 through the high resistance element 109, the reference numeral 112 denotes a line B connected to the source line 102 through the high resistance element 110, and the reference numeral 113 denotes a connecting portion for connecting the line A (111) and the line B (112) for taking countermeasures against the static electricity. This portion may be connected through a non-linear element such as a resistance element or a TFT. The reference numeral 114 denotes a repair line to be used when the source line is open or the like. The TFT array is combined with a counter substrate provided with a color filter to inject a liquid crystal. Then, the outside of a region 115 shown in a dotted line of FIG. 28 is cut away. Thus, an LCD (liquid crystal display) is obtained.

Moreover, it is not necessary to form at least a part of a portion outside the region 115 shown in the dotted line during the formation of the TFT array in some cases.

Figure 44A:
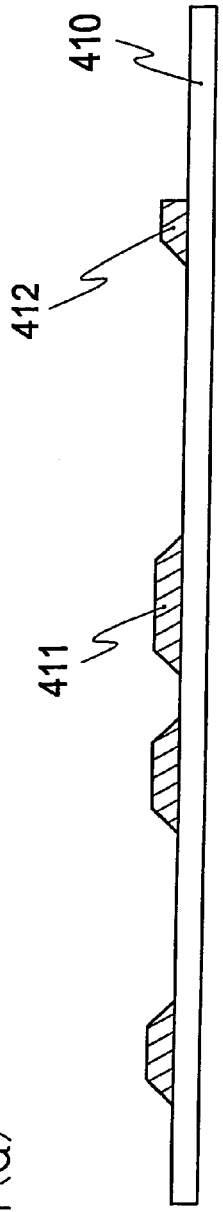
FIGS. 44(a) to 44(c) are sectional views showing a process for manufacturing a TFT array substrate according to the present invention.
Figure 44B:
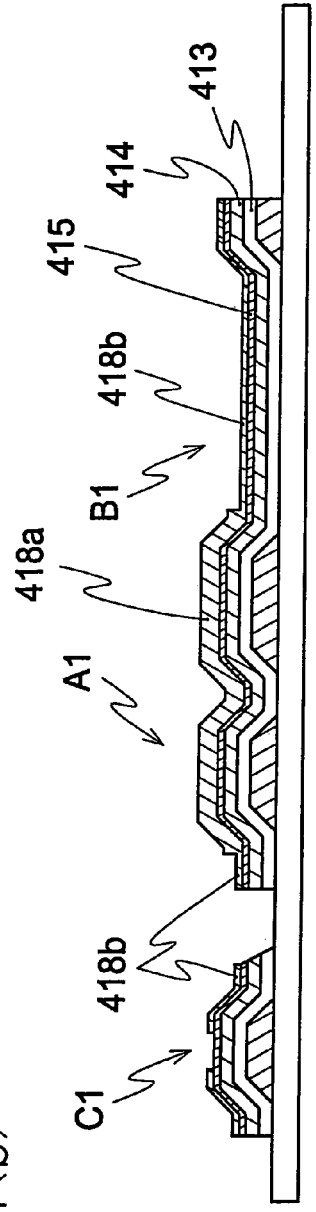
Figure 44C:
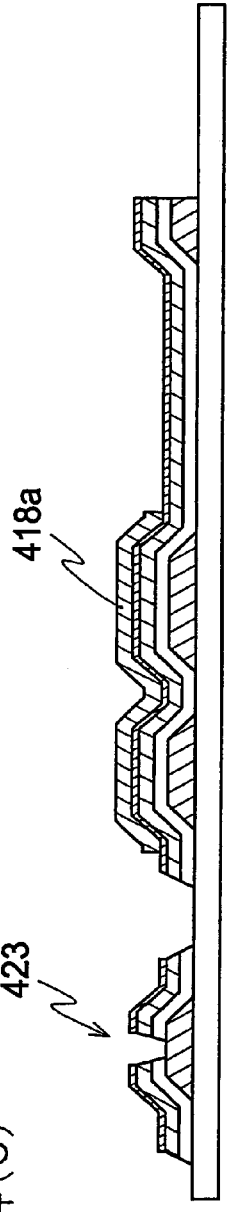
Figure 47A:
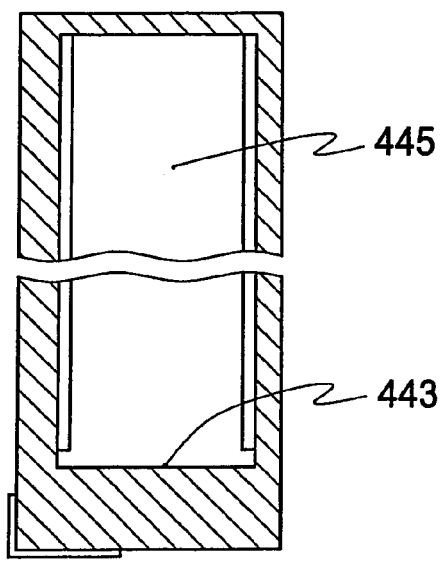
FIGS. 47(a) and 47(b) plan views corresponding to FIGS. 44(a) to 44(c) and FIGS. 45(a) to 45(c)

FIGS. 44(*a*) to 44(*c*) and 45(*a*) to 45(*c*) are sectional views showing a process for manufacturing the TFT array substrate in which the number of photolithographic steps according to the present invention is reduced, illustrating an example of a structure implementing a circuit of the TFT array substrate shown in FIG. 1. FIGS. 44(*a*) to 44(*c*) and 45(*a*) to 45(*c*) show a section taken along the line Y-Y in FIG. 47 and the sectional structure of a gate—source terminal portion.

In FIGS. 44(*a*) to 44(*c*) and 45(*a*) to 45(*c*), the reference numeral 410 denotes an insulating substrate, the reference numeral 411 denotes a gate electrode or a gate line which are formed of a metal layer, the reference numeral 412 denotes an adjacent gate line/electrode in a last state or a next stage. The reference numeral 413 denotes a gate insulating film, the reference numeral 414 denotes a semiconductor layer (active layer), the reference numeral 415 denotes an ohmic contact layer formed of a semiconductor layer containing an impurity such as P or B with a high concentration, the reference numeral 416 denotes a transparent conductive layer to be used as a source/drain electrode and a pixel electrode, the reference numeral 217 denotes a source/drain electrode comprising a metal layer, forming the source line 102. The reference numeral 218 denotes a photosensitive organic resin capable of being used as a photoresist, the reference numeral 219 denotes a retaining capacitance electrode, and the reference numeral 222 denotes a protective insulating film to be used as a passivation film such as $Si_3N_4$ or the like.

Figure 46A:
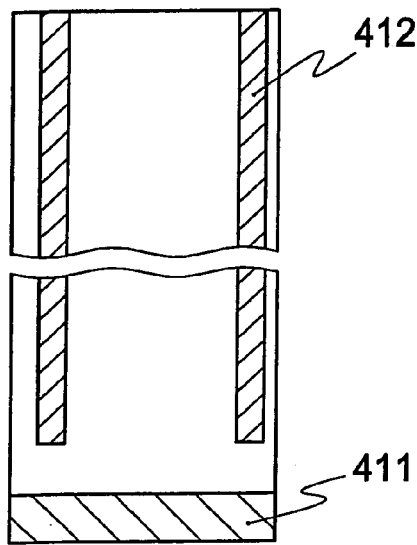
FIGS. 46(a) to 46(c) are plan views corresponding to FIGS. 44(a) to 44(c) and FIGS. 45(a) to 45(c)
Figure 46B:
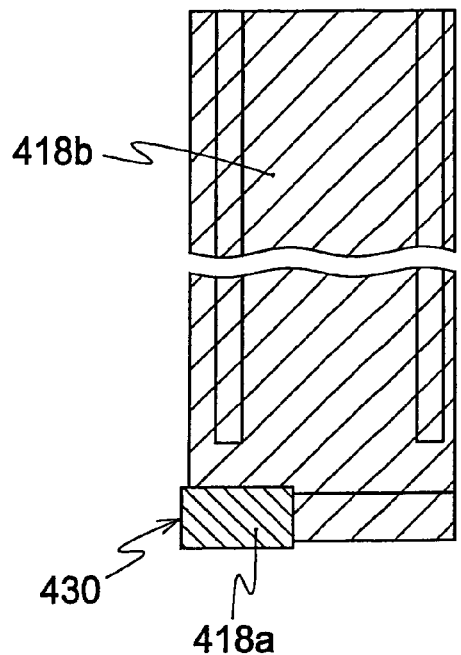

In FIGS. 46(*a*) to 46(*c*) and 47(*a*) to 47(*b*), the same reference numerals as those in FIGS. 28, 44(*a*) to 44(*c*) and 45(*a*) to 45(*c*) denote the same portions. Moreover, the reference numeral 442*a* denotes a drain electrode, the reference numeral 442*b* denotes a source electrode, the reference numeral 430 denotes a semiconductor region, the reference numeral 445 denotes a pixel electrode, and the reference numeral 443 denotes a region in which light is transmitted, the protective insulating film 420 and the metal layer 417 being removed from the pixel electrode.

Next, the manufacturing method according to the present invention will be described.

A substance formed of a metal such as Cr, Al, Mo, W, Ti, Cu, Ag or Ta, an alloy comprising them as a main component or a metal having them multilayered and having a lower resistance than that of the transparent conductive layer is provided on the insulating substrate 410 by the method such as sputtering, evaporation, CVD or printing. Next, the gate electrode and the gate line pattern 411 comprising the low resistance layer such as a metal and the adjacent gate line 412 in the nest or former stages are formed by photolithography using a photoresist or the like and succeeding etching. (FIGS. 44(*a*) and 46(*a*)).

Subsequently, there are consecutively provided a gate insulating film 413 comprising $Si_3N_4$, $SiO_xN_y$, $SiO_2$, $Ta_2O_5$ or $Al_2O_3$, a substance slightly deviated their stoichiometric composition or their multiplayer which is to be formed as a gate insulating film by plasma CVD, sputtering, evaporation or coating, an a-Si:H film (hydrate amorphous silicon film) to be used as a semiconductor layer 414 for a channel which is formed by the plasma CVD or the sputtering, for example, and is intentionally doped with no impurity to be a dopant or is intentionally doped with the impurity and has a concentration of the impurity reduced to be approximately 50 ppm or less or a dopant impurity reduced to such that a leakage current does not exceed 50 pA in the dark on the actual usage voltage conditions of the TFT, and an ohmic contact layer 415 comprising an $n^+$a-Si:H film or a microcrystal $n^+$Si film to be a semiconductor layer which is formed by the plasma CVD or the sputtering to take a contact with a metal and is doped with an impurity with a high concentration in which an impurity such as phosphorus, antimony or boron is present in the film at an atom ratio of 0.05% or more, for example.

Next, the whole surface is first coated with a photoresist. Then, a photoresist pattern is formed by exposure using a photomask. The shape of the photoresist pattern is obtained in the following manner. First of all, the photoresist is not formed in at least a part of a portion in order to form a contact hole on the gate insulating film 213, the semiconductor layer 414 and the ohmic contact layer 415 in the gate terminal portion 423 to take a contact with at least the gate electrode/wiring 411 as shown in FIG. 44(*b*) or FIG. 46(*b*) (region (c)). A photoresist having a thickness A is formed in a portion formed of the a-Si:H film and leaving the semiconductor layer (region A, 218*a*, 230). For example, only the a-Si:H film 414 and the $n^+$a-Si:H film 415 are etched and a photoresist having a small thickness is formed in a region where the gate insulating film 413 is to remain (region B, 218*b*). The thickness of the photoresist of the region A (218*a*, 230) is set to be greater than that of the photoresist (218*b*) of the region B. It is desirable that the region B (218*b*) should be formed between adjacent source lines on the gate line, the a-Si:H film 414 and the $n^+$a-Si:H film 415 in that portion should be removed and a portion between the adjacent source lines should be brought into an electrically insulation state.

Such a difference in the thickness of the photoresist is made in the following manner. The case in which a positive photoresist is used will be described. A negative photoresist pattern is also formed basically in the same manner.

In a portion where the photoresist is not formed, a mask is brought into an almost transparent state, and light is fully transmitted in such an amount as not to leave the photoresist during development. As a result, a region C in which the photoresist is not formed is provided. On the other hand, a portion having the thickness A of the photoresist, for example, a mask portion corresponding to that position, is shielded by a material which does not transmit light, for example, Cr having such a great thickness as to rarely transmit the light. As a result, the light is not sufficiently incident on the photoresist in this portion during exposure. Therefore, it is possible to implement the region A in which the photoresist remains with a sufficient thickness during development. The intermediate photoresist in the region B having the thickness B of the photoresist is exposed in an intermediate amount of exposure between the regions A and C. By thus adjusting the amount of exposure, the thickness of the region B is set to be smaller than that of the region A during the development. As a result, the shapes shown in FIGS. 44(*b*) and 46(*b*) can be implemented. The amount of exposure or the amount of light is represented by a light intensity X time for radiation. In order to set the thickness of the photoresist to be region A>region B>region C (substantially zero), the amount of exposure for the photoresist in the region B is equal to the intermediate amount of exposure between the regions A and C (the amount of exposure is region A<region B<region C) by several methods. For example, a transmittance of the pattern on the mask forming the region B is set to be higher than that in the region A portion on the mask used when forming the region B, and is set to be lower than that in a portion forming the region C. For example, the thickness of a shielding material such as Cr to be used as a shielding film of the photoresist in the portion forming the region B may be set to be smaller than that of the portion forming the region A, thereby controlling the amount of light. Alternatively, a single insulating layer or more may be formed in the region B portion to change a transmittance, a reflectance, a phase or the like such that the transmittance of the region B is set to be substantially lower than that of the region C.

In order to set the amount of exposure to be region A<(substantially zero)<region B<region C, the following method can also be employed. The pattern is formed on the mask in the shielding portion having a lower transmittance than that with respect to the regions A and B and a pattern provided with no shielding pattern which has a sufficient transmittance for the region C is formed on the mask, for example. Subsequently, only exposure is carried out in an amount 1 by using a mask having a shielding pattern of the region A+the region B and light is irradiated on the photoresist in a portion corresponding to the region C. Then, the light is irradiated in an amount 2 by using a shielding pattern mask in the region A in a portion other than the portion forming the region A. At this time, the amount 1 of exposure is set such that the exposure is carried out with such an intensity as to sufficiently remove the photoresist in the region C during the development and the amount 2 of exposure is set such that the photoresist having a thickness required for the region B remains during the development. In general, in the case in which the positive photoresist is used, the amount 1 is set to be larger than the amount 2 such that a result of calculation for a light intensity X a light irradiation time during light irradiation is increased.

As a third method of setting the thickness of the photoresist to region A>region B>region C (substantially zero), a pattern is formed on a mask with a shielding layer such as a metal having a lower transmittance and a pattern provided with no shielding pattern having a sufficient transmittance for the region C is formed. Thus, the region A is formed.

For the region B, a so-called half tone mask may be used, for example. FIG. 33 shows an example of an actual pattern. The half tone mask 233 is formed such that a space frequency of the shielding pattern on the mask is set to be higher than a pattern resolution as in a pattern 233 and the pattern of the mask cannot be sufficiently resolved over the photoresist and an exposure intensity incident on the photoresist is more reduced than that in the region C. It is desirable that a region where light is never transmitted and a region where a transmittance is equal to that of a glass of the photomask should be formed cyclically with a total width of 6 μm or less.

As a result, the thickness of the photoresist can be set to be region A>region B>region C (substantially zero). Consequently, the shape of the photoresist shown in FIGS. 44(*b*) and 46(*b*) can be implemented.

Subsequently, a semiconductor film such as an $n^+$a-Si:H film 215 and an a-Si:H film 414 and a gate insulating film 413 such as an $Si_3N_4$ film which are provided on the gate line are etched. The etching is carried out by using a gas containing HCl as a main component, a gas containing $CH_4$ as a main component, a mixed gas of $CF_4$ and $O_2$, a gas containing $SF_6$ as a main component or the like. As a result, in a terminal portion 423 to be connected to a TCP or the like to input a signal through a gate line and an outside, for example, and a portion (FIG. 28, 113 or the like) short-circuited with a source line portion directly through a source line, a TFT or a resistor to prevent static electricity, the $n^+$a-Si:H film 415, the a-Si:H film 414 and the gate insulating film 413 are etched. When the etching is completed, a thickness of the photoresist in the region B is set to remain. At this step, the $n^+$a-Si:H film 415, the a-Si:H film 414 and the gate insulating film 413 such as $Si_3N_4$ may be wholly etched with a single gas such as $CF_4$ or $CH_4+O_2$. For example, at least the a-Si:H film and the $Si_3N_4$ film may be subjected to dry etching by using a separate etching gas, for example, such a gas that the etching of the SiN film can be controlled during the etching of the a-Si:H film or may be subjected to the etching on separate conditions. In this case, $SF_6$, HCl or F123, their mixed gas or a mixed gas with an inert gas or $O_2$ is used for the etching of the a-Si:H film, and $CF_4$ or $F_6$, their mixed gas or a mixed gas with $O_2$ or an inert gas may be used for the etching of the $Si_3N_4$ film.

Next, for example, a plasma capable of reducing the thickness of the resist such as an oxygen plasma is used to carry out ashing, thereby scraping a resist. Thus, the resist is removed from the region B (218*b*) (FIG. 44(*c*)). At this time, the thickness of the resist in the region A (218*a*) is smaller than an initial thickness. The thickness to be controlled to fully protect a portion which is not subjected to etching during subsequent etching. Then, at least the $n^+$a-Si:H film 415 and the a-Si:H film 414 are etched by dry etching or the like and is removed from the region B (FIG. 45(*a*)).

At this time, the step of reducing the thickness of the resist in the region B is not carried out independently. When the $n^+$a-Si:H film 415, the a-Si:H film 414 and the gate insulating film 413 such as $Si_3N_4$ are to be etched, the photoresist in the region B may be scraped at the same time by utilizing a phenomenon in which the photoresist itself is somewhat scraped. Then, the photoresist 418*a* is removed.

Subsequently, a transparent conductor film such as IOT (Indium Tin Oxide), $SnO_2$ or InZnO or a transparent conductor layer 416 comprising their multilayer or mixed layer, and a metal layer 417 to be a source electrode 442*b*, a source line 102 and a drain electrode 442*a* formed of Cr, Al, Ti, Ta, Au, Ag, W, Mo, Mo—W or Cu, an alloy containing them as a main component, their multilayered product or the like, for example. Then, a wiring pattern is formed on the shapes of the source electrode, the source line, the drain electrode and the pixel electrode by photolithographic, and the transparent conductive layer 416 and the metal layer 417 are then subjected to wet etching, dry etching or the like by using the same photoresist pattern. Thus, the source electrode, the source line, the drain electrode and the pixel electrode are formed. Thereafter, an ohmic contact layer 415 formed of an $n^+$a-Si:H film or the like between the source electrode 442*b* and the drain electrode 442*a* is removed by the dry etching. Finally, the resist is finally taken away. Thus, a predetermined pattern is formed (FIGS. 44(*b*) and 45(*c*)).

Figure 46C:
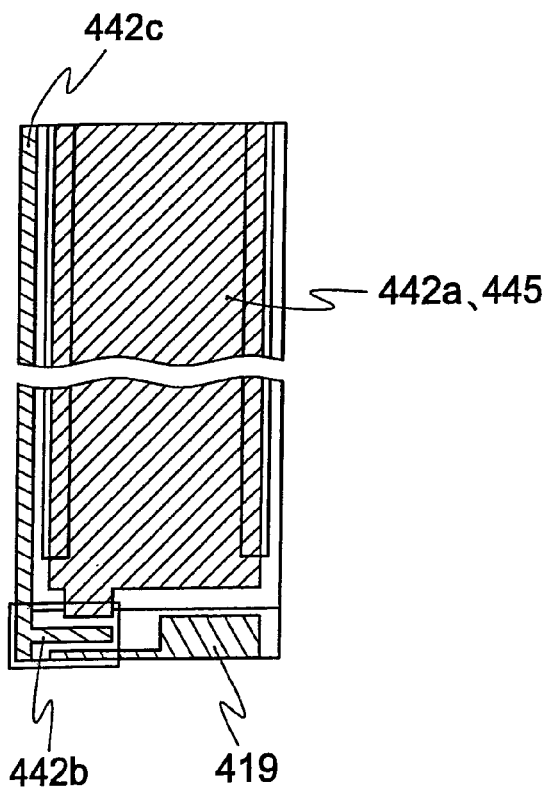

At this time, a retaining capacitance electrode 419 to be fabricated simultaneously with the formation of the source line is opposed to the gate line 412 in a next stage or a last stage, for example, through at least the gate insulating film 413 in order to form a retaining capacitance. At this time, the $n^+$a-Si:H film 415 and the a-Si:H film 414 as well as the gate insulating film 413 may remain between the holding capacity electrode 419 and the gate insulating film 413. The retaining capacitance electrode should have such a structure that at least a part of the pixel electrode 445 is protruded over the gate line 412 in the former or next stage as shown in FIG. 46(c) in order to increase a capacity value.

Figure 47B:
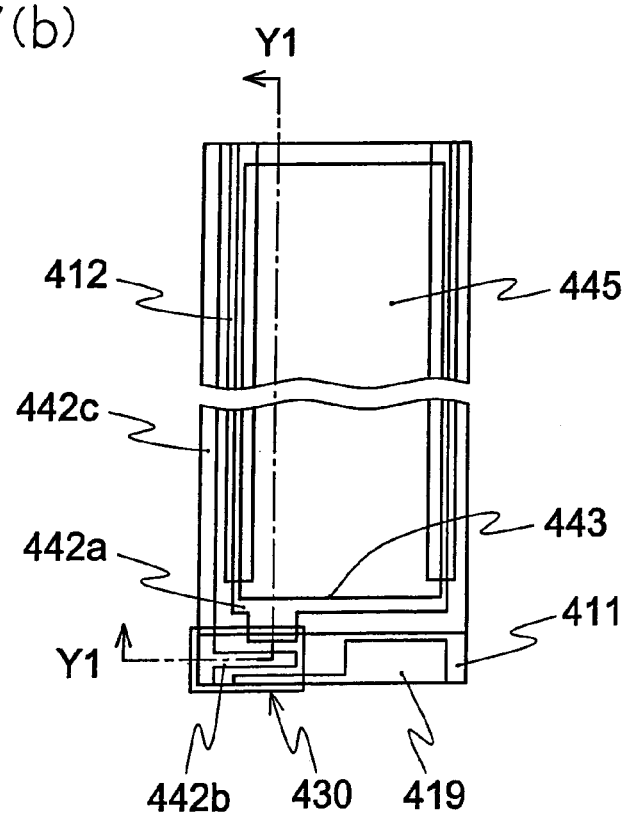

Then, a passivation film 420 is formed by an insulating film comprising $Si_3N_4$, $SiO_2$, or their mixture or multilayered product. In order to input at least a signal by photolithography, a photoresist pattern for removing the passivation film 420 is formed such that a contact hole can be provided in a gate terminal portion 423 and a source terminal portion 424 which are to be connected to an external TCP or the like. In addition, a photoresist pattern capable of removing the passivation film 420 provided on a region 443 where light is transmitted as a pixel electrode 445 is formed. Then, the protective film 420 is removed by dry etching or wet etching using a $CF_4$ based gas or the like. Furthermore, the metal layer to be an upper layer in the two-layered source line material layer is removed. As an etchant is used a solution or gas which etches the metal film to be the upper layer but doe not etch the ITO film to be a lower layer. Thus, wet or dry etching is carried out. Consequently, the contact hole and the IOT film of the pixel electrode are exposed. After the etching is completed, the photoresist is removed. Consequently, the TFT array is formed (FIGS. 45(c) and 47(a)). The finished plane pattern is shown in FIG. 47(b).

Subsequently, an orientation film is formed on the TFT array and is opposed to a counter substrate having an orientation film and a common electrode formed on at least a surface, both glass substrates are held, a seal portion for maintaining a liquid crystal is formed on the periphery thereof and the liquid crystal is injected therebetween. Thus, an injection hole is sealed so that an active matrix type liquid crystal display is formed.

By the above-mentioned process, the TFT array and the liquid crystal display using the same are formed with the structure shown in FIG. 28.

While FIG. 28 shows the repair line 114 of the source line which is formed by using a gate line material, for example, the repair wiring 114 may be formed depending on circumstances.

As shown in FIG. 34, moreover, the source line 102 may be once converted into the line 117 to be the same layer as the gate line formed of a gate line material by utilizing the contact holes 116a and 116b in the cross portion with the repair line 114. At this time, the repair wiring 114 is formed by using the source line material.

Figure 48:
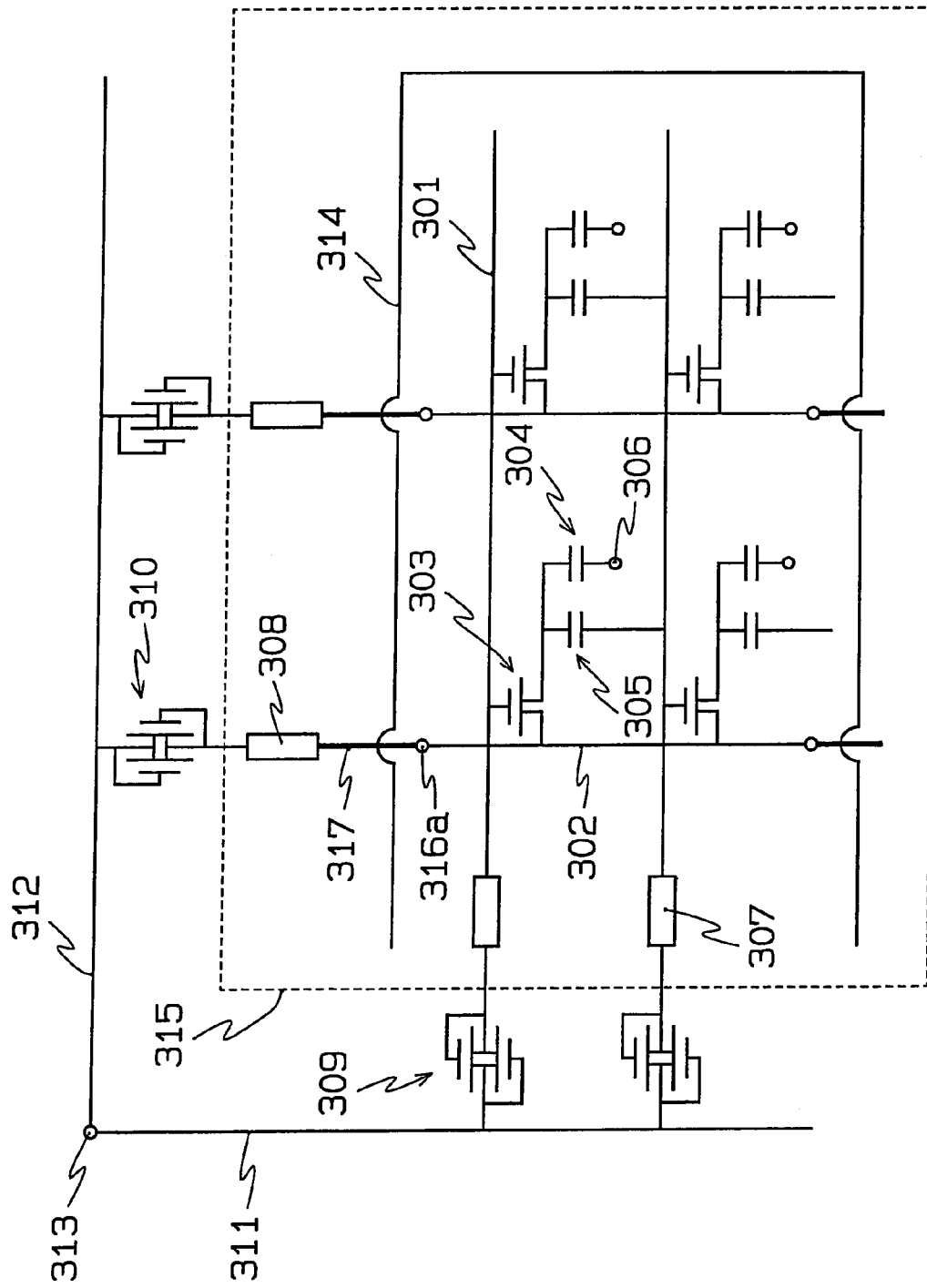
FIG. 48 is a circuit diagram showing a TFT array substrate of an active matrix type liquid crystal display to which the present invention is applied.
Figure 49:
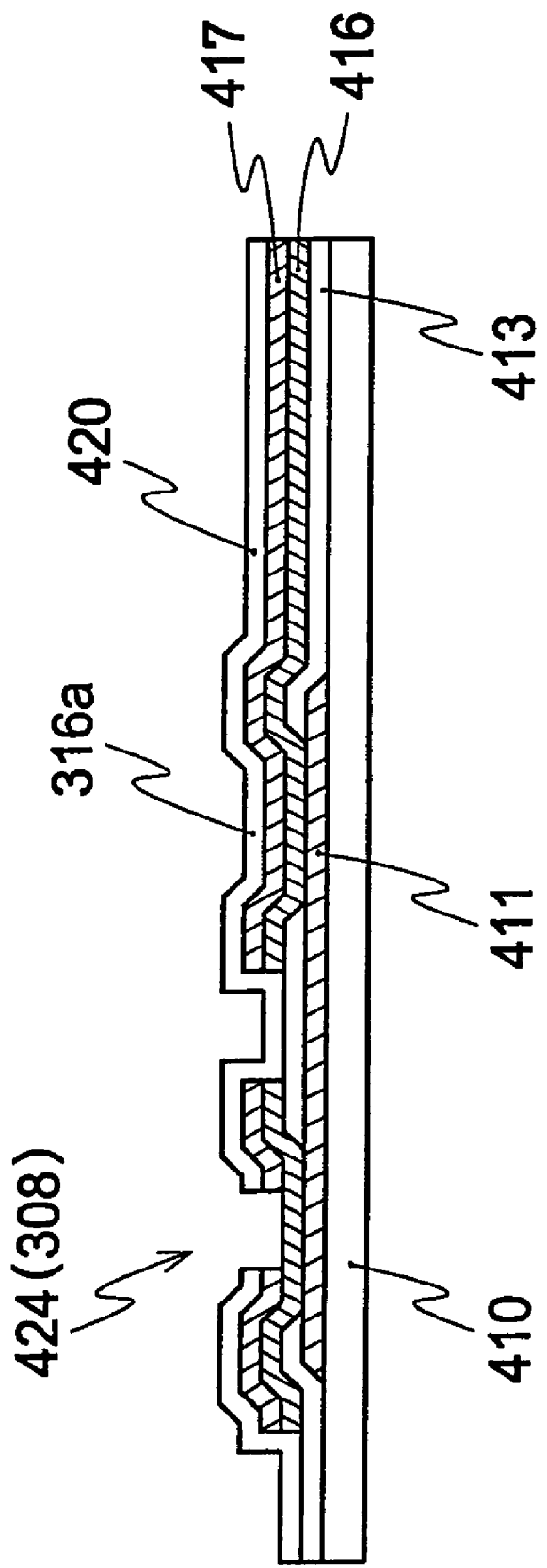
FIG. 49 is a sectional view showing an example of a source terminal portion.

As shown in FIGS. 48 and 49, moreover, the source line 302 may be converted into a gate line material through the contact hole and may be connected to the source terminal 308. For example, in some cases in which the passivation film 420 has a small thickness, a water content enters through a pin hole and the source line is corroded in the vicinity of the source terminal portion 308 present on the outside of the seal portion. However, it is possible to prevent the source line from being corroded by thus converting the gate line material.

Embodiment 13

Figure 50:
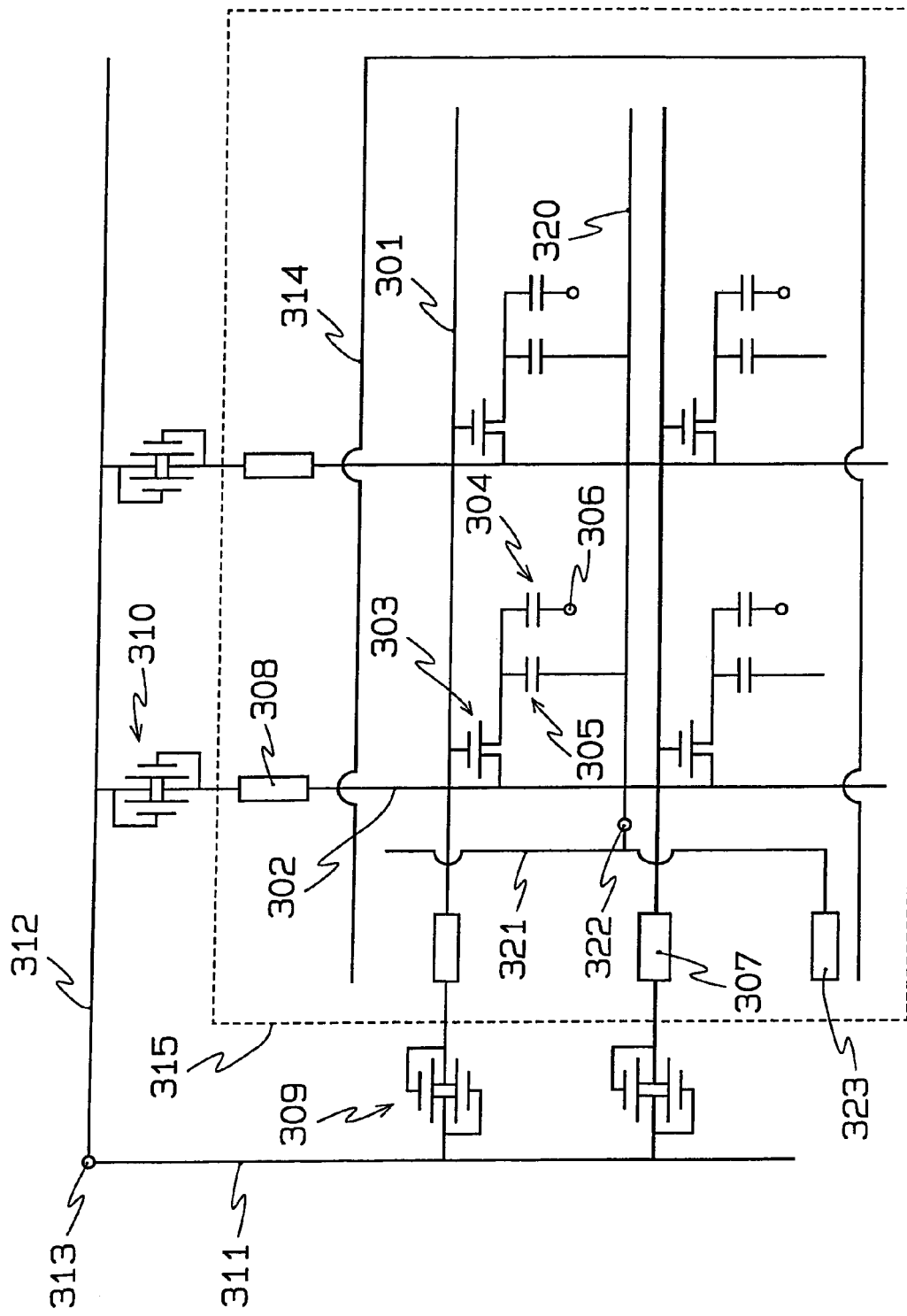
FIG. 50 is a circuit diagram showing a common line retaining capacitance.

While the so-called Cs on gate structure in which the retaining capacitance is formed between the gate lines in next and last stages has been described in the above embodiments, it is also possible to employ a common line structure in which a retaining capacitance line advantageous to a gate delay is formed separately from the gate line as shown in a circuit diagram of FIG. 50. The retaining capacitance 305 is connected to a common line 320. Moreover, the common line 320 is connect to a common line lead line 321 through a contact hole 322. A common voltage is externally applied through a common line terminal 123 connected to the common line lead line 121. The functions and reference numerals in other portions are identical to those of FIG. 28.

Figure 51:
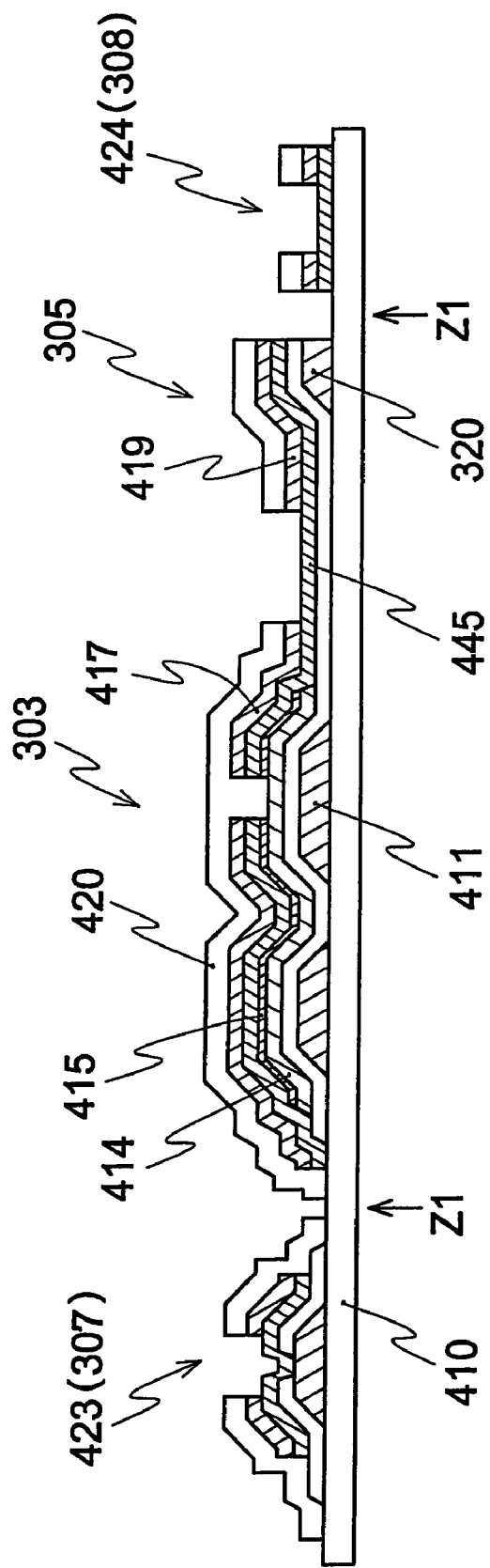
FIG. 51 is a sectional view showing a sectional structure of the TFT array substrate according to the present invention.
Figure 52A:
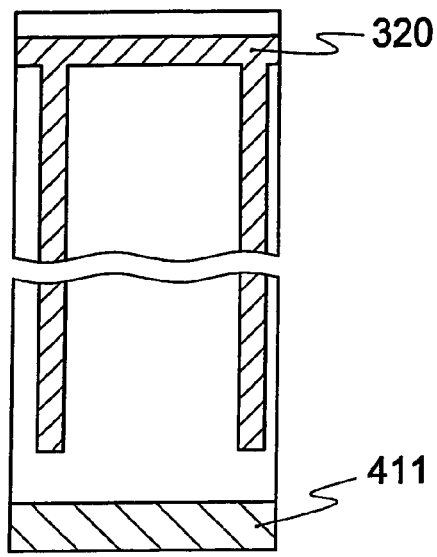
FIGS. 52(a) to 52(c) are plan views corresponding to FIG. 51.
Figure 52B:
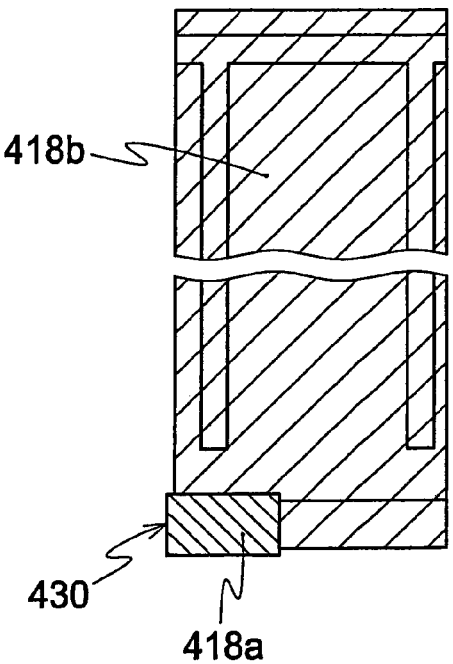
Figure 52C:
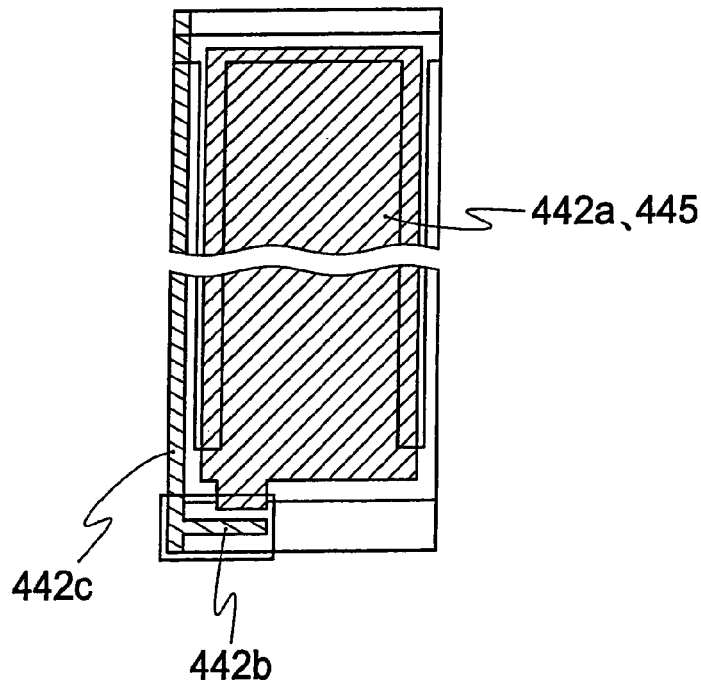
Figure 53A:
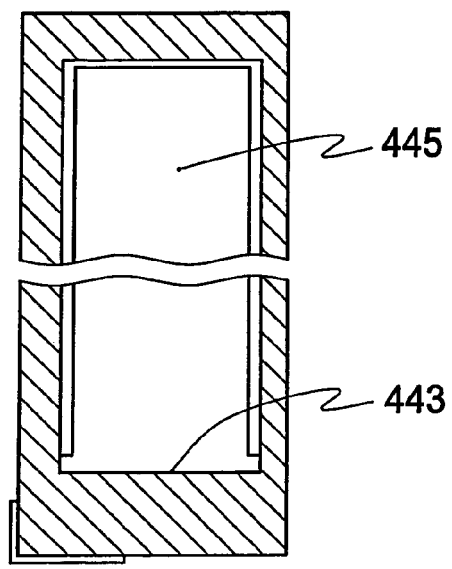
FIGS. 53(a) and 53(b) are plan views corresponding to FIG. 51.
Figure 53B:
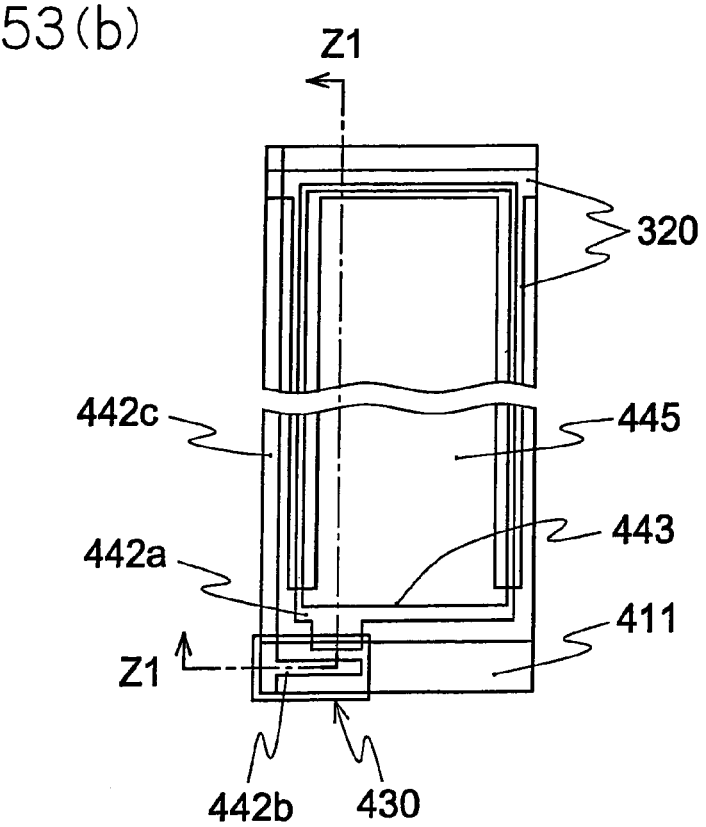

In a common line method, for example, a sectional structure shown in FIG. 51 and a plane arrangement shown in FIGS. 52(a) to 52(c) and 53(a) to 53(b) are employed. FIGS. 52 and 53 are plan views for each flow. FIG. 51 is a sectional view taken along the line Z1-Z1 in FIGS. 52(a) to 52(c) and 53(a) to 53(b). A flow of the section is basically identical to that of FIG. 44.

In the case in which the common line structure is employed as shown in FIG. 50, the common line 320 led in parallel with the gate line and the common line lead line 321 collecting the common line 320 running vertically to the gate line 301 are required. In FIG. 50, the common line 320 fabricated simultaneously with the formation of the gate line 301 is connected at a left end to the common line lead line 321 fabricated simultaneously with the formation of the source line 302 through the contact hole 322.

Figure 54:
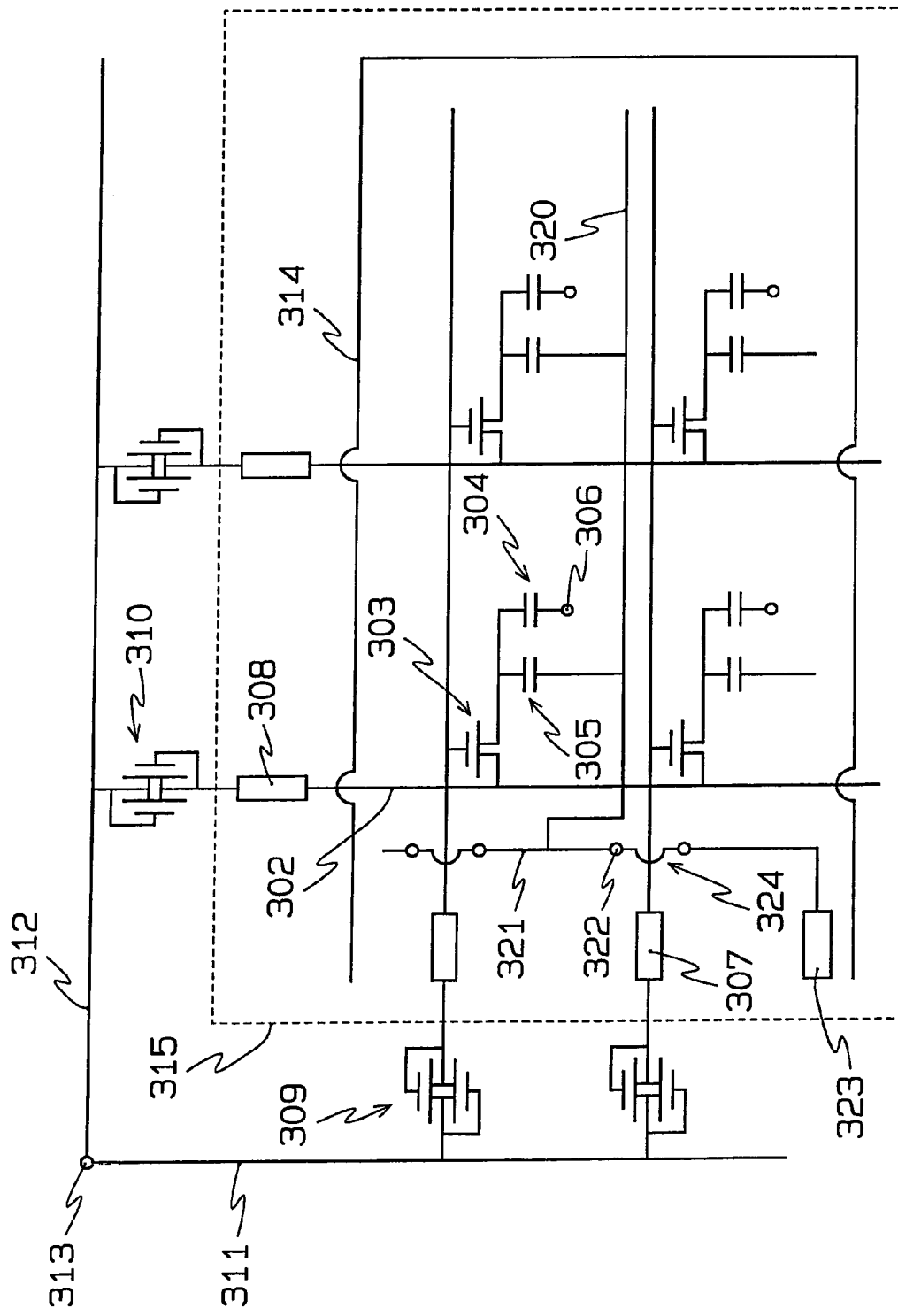
FIG. 54 is a circuit diagram showing the common line method of the retaining capacitance.

As shown in FIG. 54, it is the best way that the common line 320 is formed by the same material as that of the gate line 301 simultaneously with the formation of the gate line 301. A material of a source line having a different layer from that of the gat wiring is used for at least a cross portion 324 of the common line lead line 321 with the gate line. Depending on circumstances, the common line lead line may be formed by the gate line material in portions other than the cross portion with the gate line.

Figure 55:
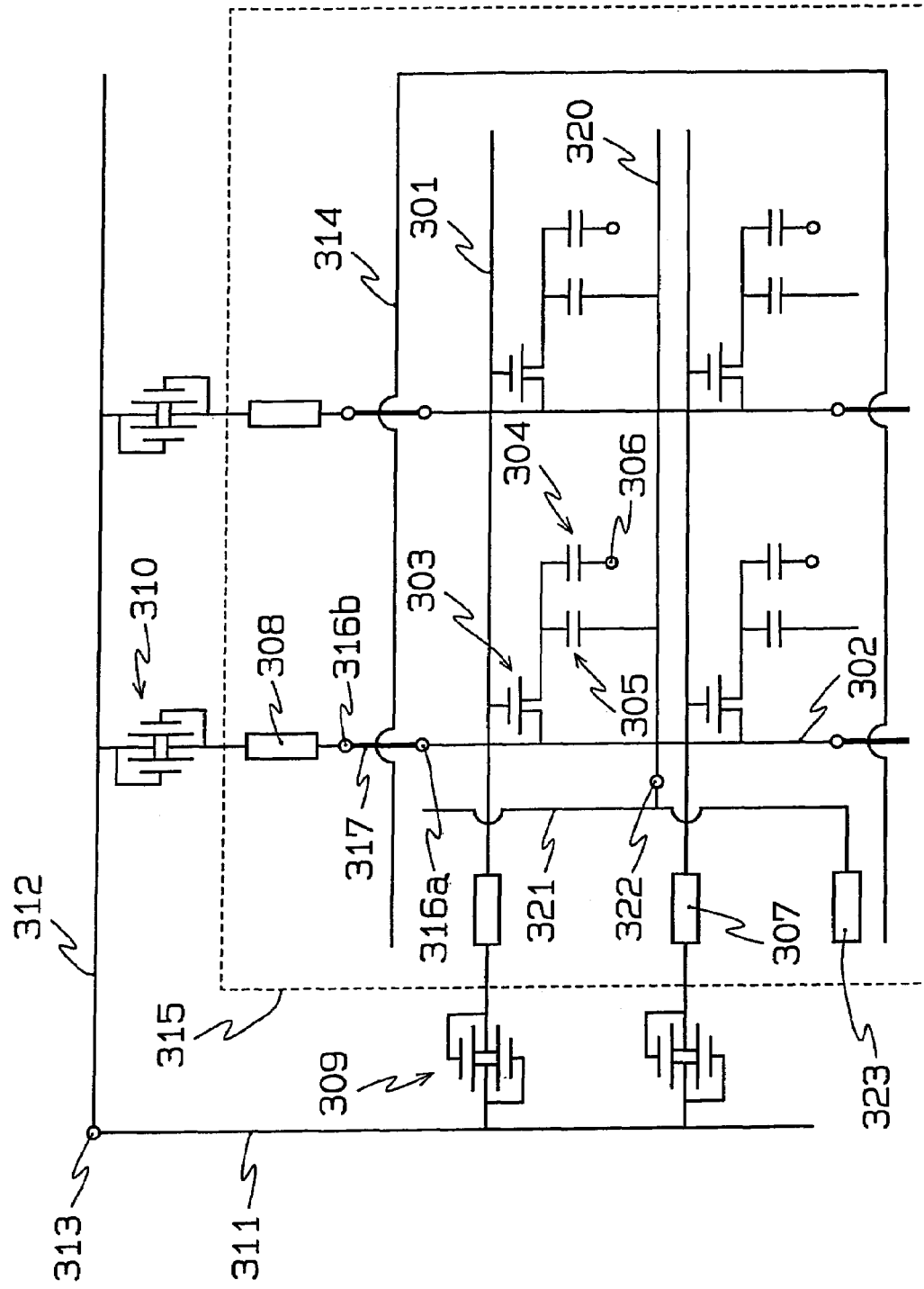
FIG. 55 is a circuit diagram showing the common line method of the retaining capacitance.

As shown in FIG. 55, the source line may be once converted into a wiring 316 having the same layer as that of the gate line formed by the gate line material by utilizing contact holes 315a and 315b in the cross portion with the repair wiring 314.

Figure 56:
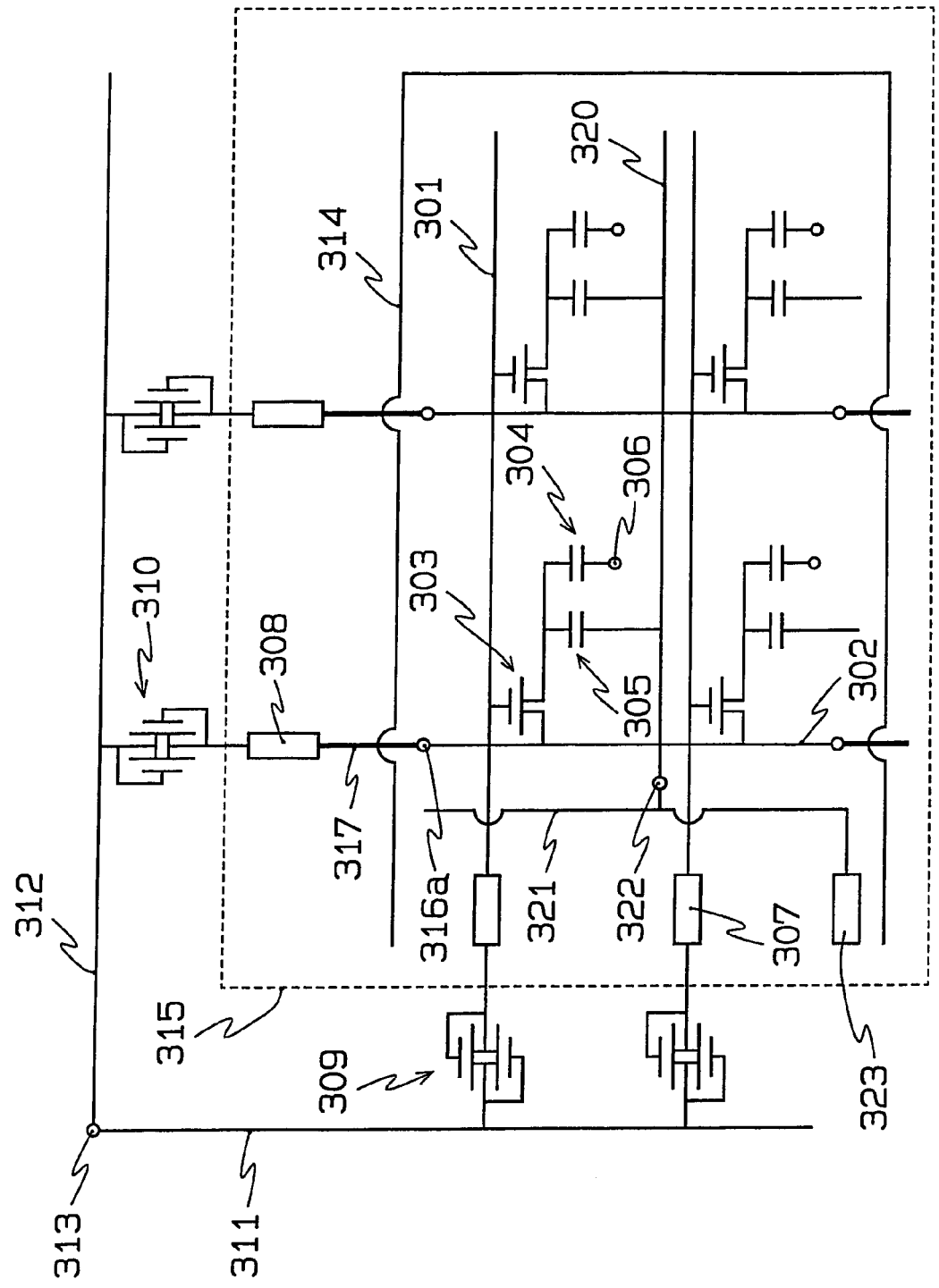
FIG. 56 is a circuit diagram showing the common line method of the retaining capacitance.
Figure 57:
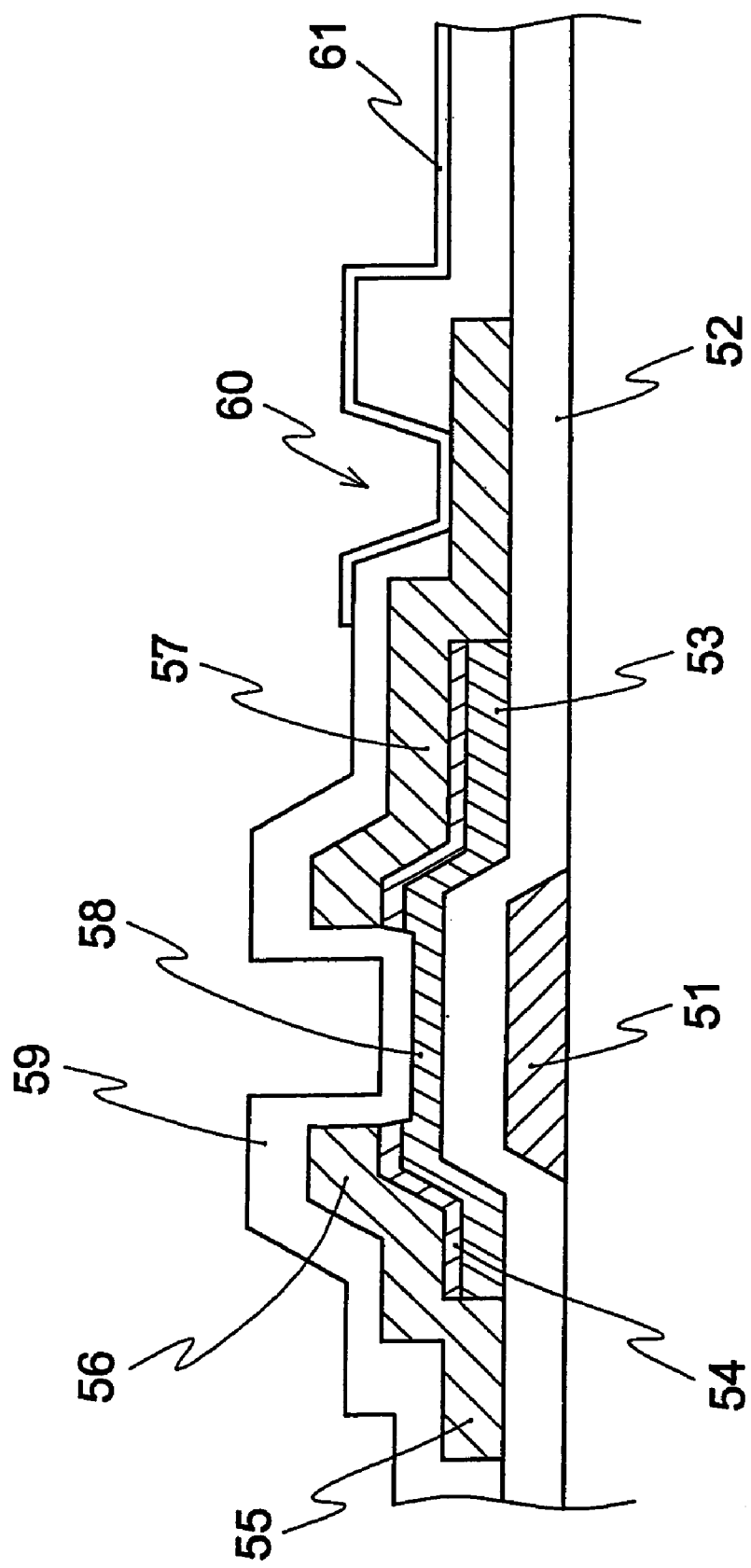
FIG. 57 is a sectional view showing a thin film transistor portion according to a conventional structure.
Figure 58:
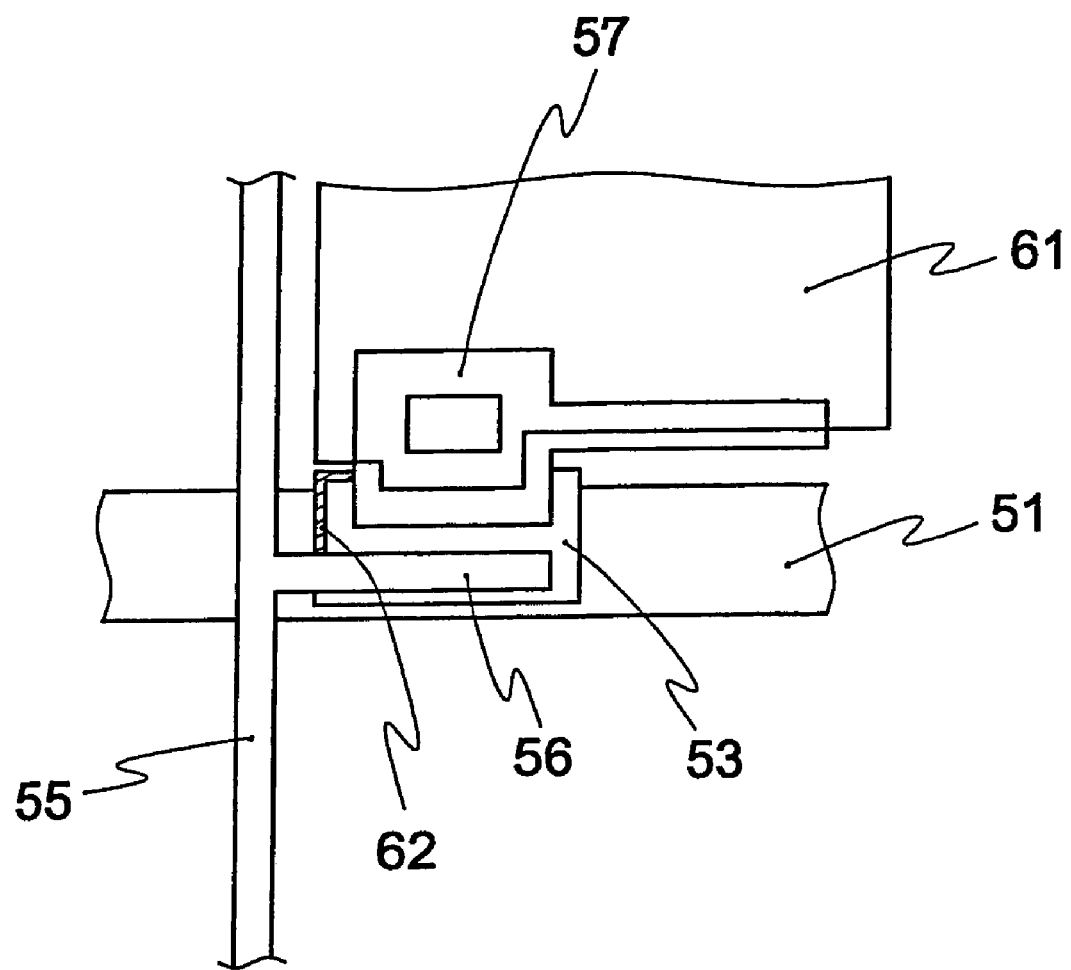
FIG. 58 is a plan view showing the thin film transistor portion according to the conventional structure.
Figure 61A:
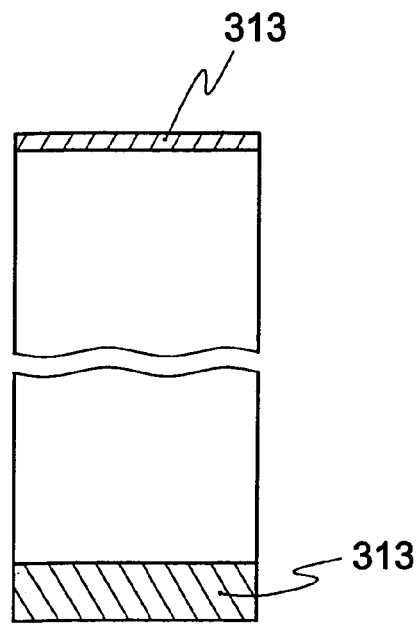
FIGS. 61(a) to 61(d) are plan views showing the TFT array substrate of the conventional active matrix type liquid crystal display.
Figure 61B:
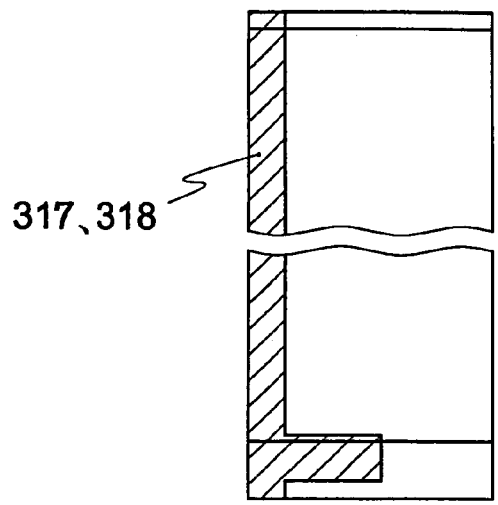
Figure 61C:
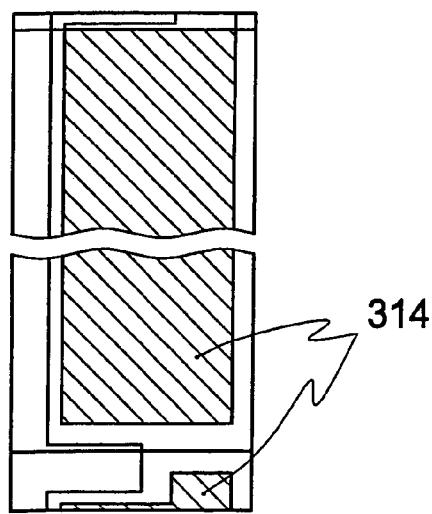
Figure 61D:
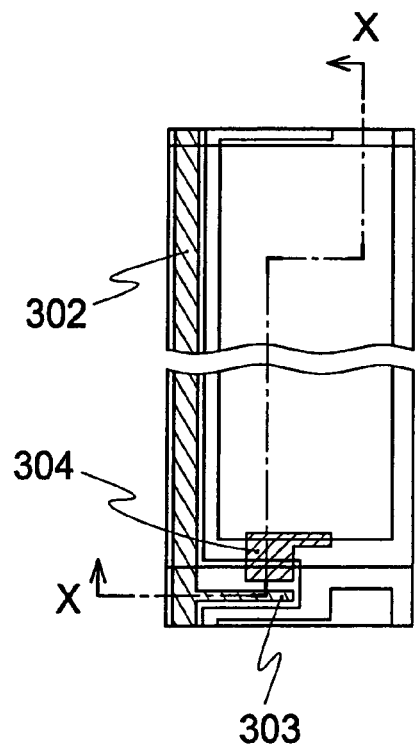

As shown in FIG. 56, moreover, the source line 302 may be converted into the same material of the gate line through the contact hole and may be connected to the source terminal 310. For example, in some cases in which the protective film 420 has a small thickness, a water content enters through a pin hole and the source line is corroded in the vicinity of the source terminal portion 308 present on the outside of the seal portion. However, it is possible to prevent the source line from being corroded by thus converting the gate line material. A sectional view showing the terminal portion of this structure is the same as FIG. 49.

Embodiment 14

While the region 443 from which the protective film 420 is removed to take away a metal to transmit light to the pixel electrode is shown on the inside of the 442a in FIGS. 47(a) to 47(b) and 53(a) to 53(b), it may be provided on the outside of the region 443.

Embodiment 15

Figure 45A:
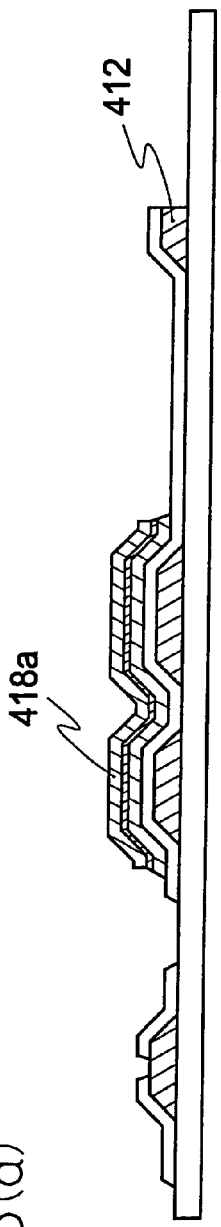
FIGS. 45(a) to 45(c) are sectional views showing the process for manufacturing a TFT array substrate according to the present invention.
Figure 45B:
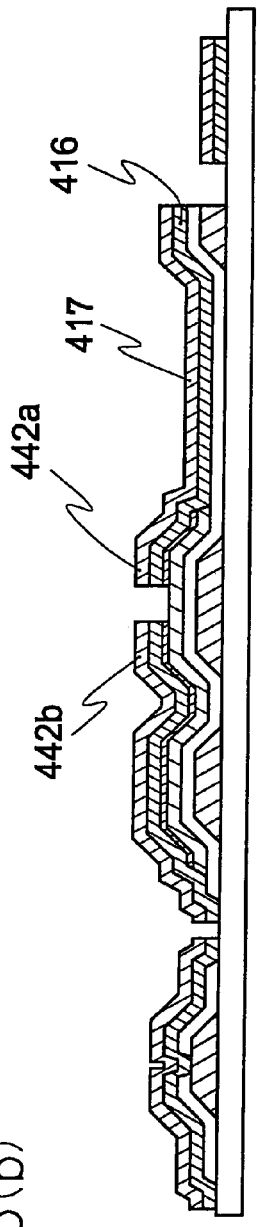
Figure 45C:
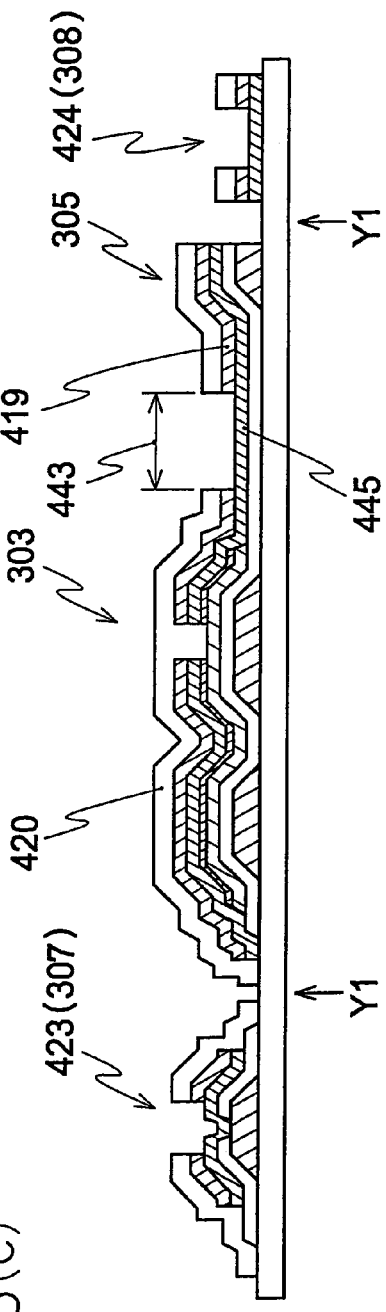
Figure 65B:
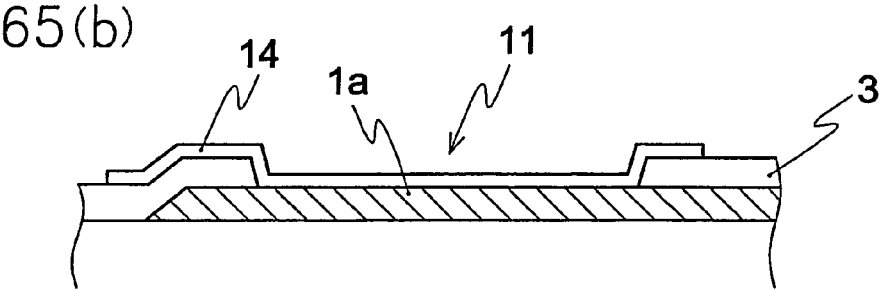
Figure 65C:
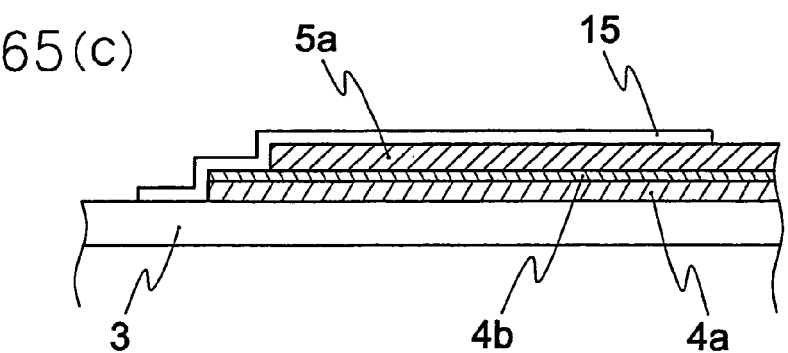
Figure 65D:
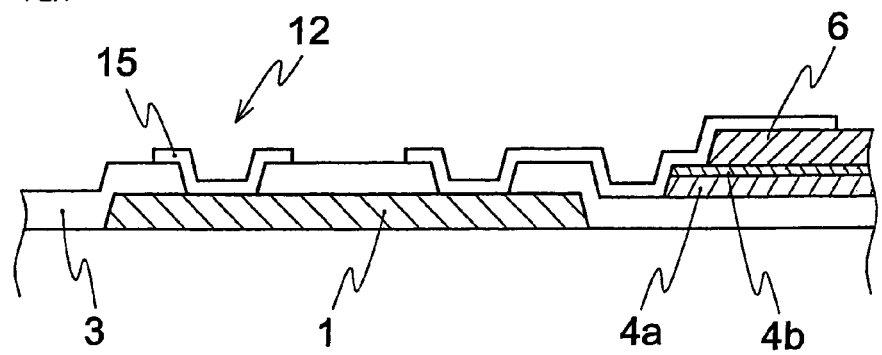

While the common electrode for applying a voltage to the liquid crystal itself is provided on the counter substrate in embodiment 12 to embodiment 14, the present invention can also be applied to a TFT substrate for applying a transverse electric field in an IPS (In-Plane Switching) mode or the like which can implement a wide viewing angle. In this case, it is not necessary to cause the source line to have two layers, that is, the transparent conductive film 416 and the metal layer 417, and only the metal layer 417 is enough. It is possible to form an electrode structure for applying a transverse electric field to a liquid crystal by using at least electrodes for a lateral electric field which is to be formed simultaneously with the formation of a gate electrode (FIG. 65(b)), at least two electrodes in a transverse direction which is to be formed simultaneously with the formation of a source electrode, or at least two electrodes for a lateral electric field making a pair of at least one electrode for a lateral electric field which is to be formed simultaneously with the formation of the source electrode and at least one electrode for a lateral electric field which is to be formed simultaneously with the formation of the gate electrode (FIG. 60(*a*)). In this case, it is not necessary to remove the protective insulating film 420 provided on the pixel electrode as shown in FIG. 45(*c*). Moreover, it is not necessary to form the protective insulating film.

Figure 62A:
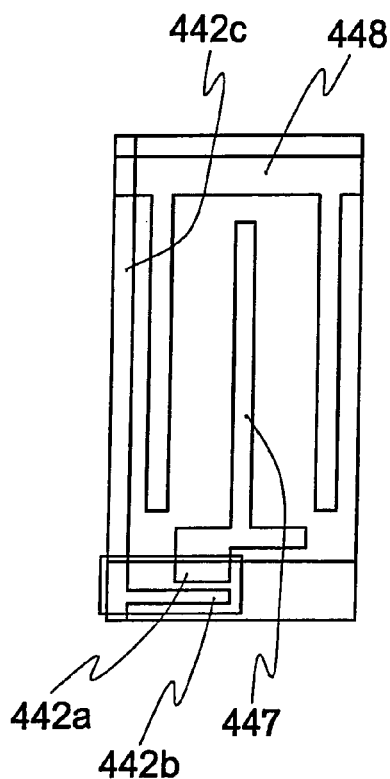
FIGS. 62(a) to 62(c) are plan views showing a TFT array substrate for a transverse field effect.
Figure 62B:
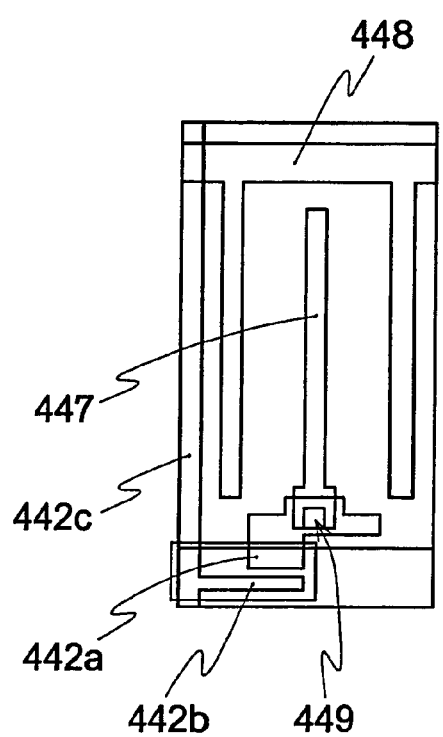
Figure 62C:
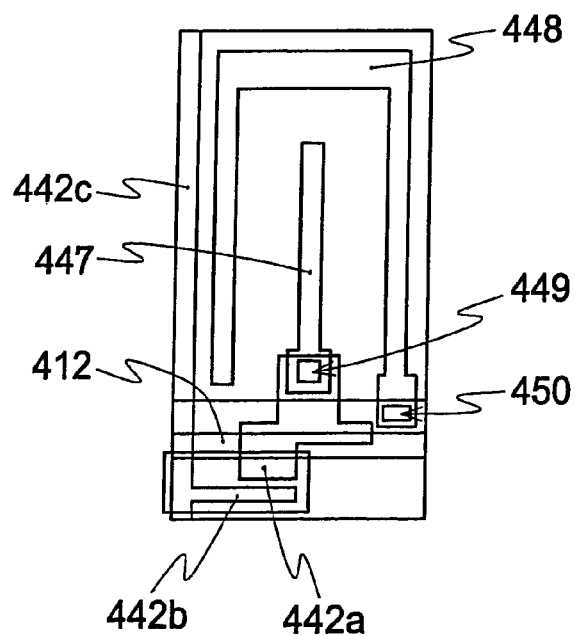
Figure 63A:
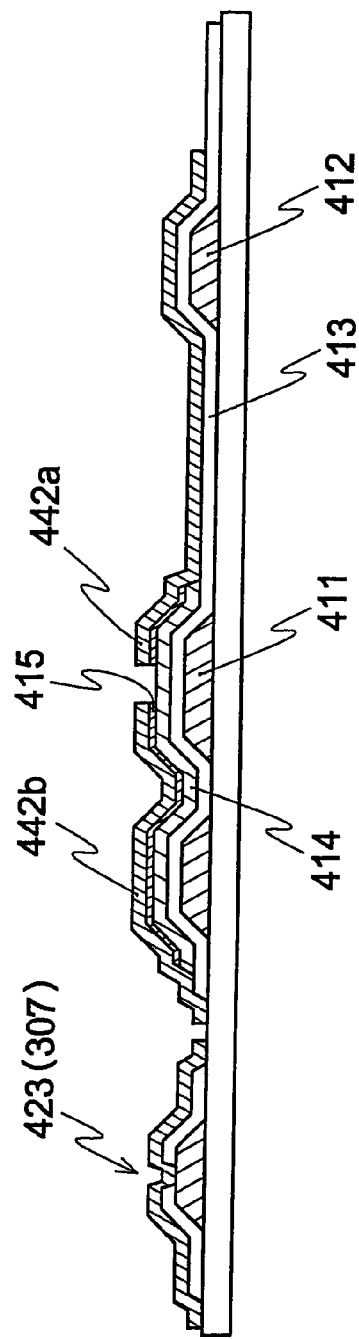
FIGS. 63(a) and 63(b) are sectional views showing a manufacturing process corresponding to FIG. 62(c)
Figure 63B:
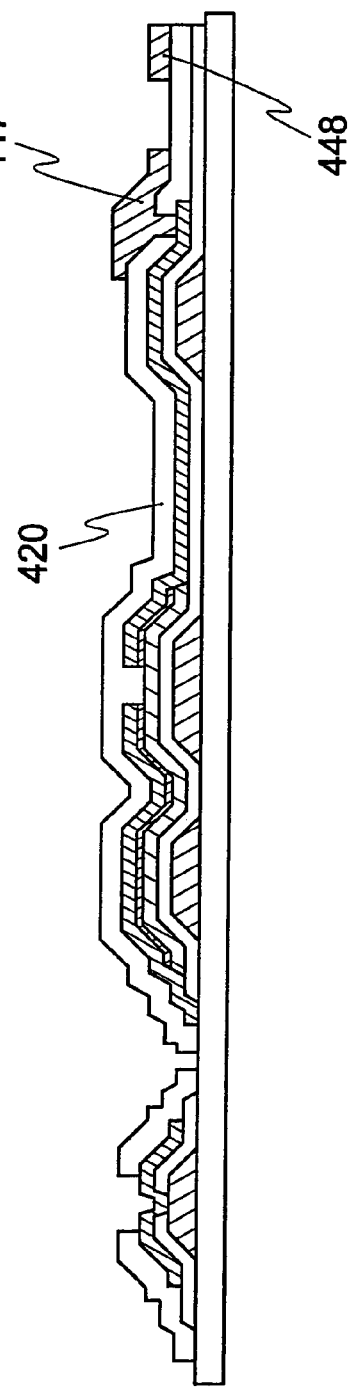

Portions shown in FIGS. 45(*b*) and 45(*c*) may form a flow shown in FIGS. 63(*a*), (*b*). At this time, the source electrode/wiring are formed of one metal layer. After a drain 442*a* and a source electrode 442*b* are formed as shown in FIG. 63(*a*), (*b*), the protective insulating film 420 (SiN) is formed as shown in FIG. 63(*a*), (*b*). Subsequently, a contact hole is formed on the drain electrode 442*a* and a common line 412. Then, a third electrode to be an IPS electrode 447 on the drain electrode side and an IPS electrode 448 on the common line side is formed. FIG. 62(*c*) is a plan view.

Embodiment 16

While only the thickness of the resist has been partially converted on the plane by using the technique such as a half tone as shown in FIG. 44 in order to make the a-Si:H film island-shaped in the above-mentioned embodiments, the step may be eliminated to carry out photolithography for making the a-Si:H film island-shaped separately. In this case, for example, the thickness of the resist is not changed spatially. In the state shown in FIG. 44(*b*), the thickness of the resist is not changed on the plane. The step of removing the SiN film 413/a-SiH 414/n$^+$a-Si:H 415 on the contact portion 423 is carried out and the resist is then removed. A pattern for forming an island of a transistor is created again and the a-Si:H film 414 and the n$^+$a-Si:H film 415 in portions other than the TFT portion are removed by etching. Thus, the structure shown in FIG. 45(*a*) is created. In this case, the number of photolithographic steps is more increased than that in the embodiment shown in FIG. 28 but can be more reduced than that in the conventional art.

Embodiment 17

Although the semiconductor layer is formed of the a-Si:H film according to the above-mentioned embodiments, poly-Si may also be used.

Embodiment 18

The n$^+$a-Si:H film 415 may be an n+microcrystal Si layer. In this case, a contact resistance is dropped between the ITO layer 416 and the n$^+$a-Si:H film 415 and an ON-state current of the TFT can be improved.

Embodiment 19

The ITO layer 216 to be used as a source line may be amorphous ITO. Furthermore, in the case in which an Al based metal such as Al or Cr/Al is used for a source metal, oxalic acid capable of reducing the corrosion of Al during the etching of the ITO can be used as an etchant having a low corrosion property.

Embodiment 20

IN the case in which an Al based material is to be used as a gate in the above-mentioned embodiments, a contact with the ITO layer can be improved if the surface of Al and an ally thereof is Al nitride or oxide.

Embodiment 21

In the above-mentioned embodiments, the surface of the n$^+$a-Si:H film 215 may be subjected to an oxidation treatment by slight exposure to plasma oxide or the like. Consequently, it is possible to reduce a variation in a contact resistance between the ITO 216 and the n$^+$a-Si:H film 215.

According to the thin film transistor array substrate and the method of manufacturing the same according to the present invention, there are provided an insulating substrate, a first metal pattern formed on the insulating substrate, an insulating film on the first metal pattern, a semiconductor pattern formed on the insulating film, and a second metal pattern formed on the semiconductor pattern, the semiconductor pattern including the second metal pattern. Therefore, a photolithographic step is carried out four times, a step of the semiconductor layer is not provided under a source line. Consequently, a source disconnection is caused with difficulty and the patterns of a source electrode and a drain electrode are included in the semiconductor pattern and do not cross each other. Thus, a leakage current can be reduced.

Moreover, a part of an outer edge of the semiconductor pattern including the source line and the drain electrode enters the inside of the outer edge of the gate line. Therefore, it is possible to prevent a leakage current from being generated due to a light leakage.

According to the present invention, as described above, the TFT array can be formed by carrying out the photolithographic step for a mask four times. Therefore, the TFT array can be implemented with a low cast. Thus, the cost can be reduced and production can be increased.

The forgoing is considered as illustrative only of the principles of the invention. Further, because numerous modification and changes will readily occur to those skilled in the art, it is not desired to limit the invention to the exact construction and operation shown and described, and accordingly all suitable modifications and equivalents may be resorted to falling within the scope of the invention as definition by the claims which follow.

What is claimed is:

1. Method for manufacturing a TFT array of liquid crystal display comprising steps of:
   depositing a gate electrode/gate line and a pixel electrode, each of said gate electrode/gate line and said pixel electrode including at least two layers comprising a transparent conductive layer and metallic layer provided on said transparent conductive layer, and subsequently etching said gate electrode/gate line and said pixel electrode using a photoresist having patterns corresponding to said gate electrode/gate line and said pixel electrode to form a predetermined patterns;
   forming a gate insulating film and a semiconductor film;
   exposing said pixel electrode by etching process using said photoresist having patterns;
   removing said metallic layer having at least two layer in said exposed pixel electrode by etching process; and
   forming a drain electrode, a source electrode, and a source line.

2. Method for manufacturing a TFT array of liquid crystal display comprising steps of:
   depositing a gate electrode/gate line and a pixel electrode, each of said gate electrode/gate line and said pixel electrode including at least two layers comprising a transparent conductive layer and metallic layer provided on said transparent conductive layer, and subsequently etching said gate electrode/gate line and said pixel electrode using a photoresist having a patterned shape corresponding to said gate electrode/gate line and said pixel electrode to form a predetermined patterns;
   forming a gate insulating film and a semiconductor film;
   exposing said pixel electrode by etching process using said photoresist having patterns;

forming a metallic layer for a drain electrode, a source electrode, and a source line;

etching said metallic layer using said photoresist having the predetermined patterns to form said drain electrode, said source electrode, and said source line;

wherein said metallic layer in said exposed pixel electrode having at least two layers.

3. Method for manufacturing a TFT array of liquid crystal display comprising steps of:

depositing a gate electrode/gate line and a pixel electrode, each of said gate electrode/gate line and said pixel electrode including at least two layers comprising a transparent conductive layer and metallic layer provided on said transparent conductive layer, and subsequently etching said gate electrode/gate line and said pixel electrode using a photoresist having a patterned shape corresponding to said gate electrode/gate line and said pixel electrode to form a predetermined patterns;

forming a gate insulating film and a semiconductor film;

forming a region (A) where at least of a portion of said photoresist corresponding to said semiconductor layer to be left has a thickness being larger than any other part of said photoresist, a region (C) where at least of a portion of said photoresist corresponding to a light transmitting part of said pixel electrode to be exposed is removed, and a region (B) where any parts other than said region (A) and said region (B) having a thickness smaller than that of said semiconductor layer;

etching said semiconductor layer and said gate insulating film using said photoresist having said thickness in each part to expose said pixel electrode;

removing at least said metallic layer located in upper side of said two layers in said exposed pixel electrode by etching process;

removing said photoresist in said region (B) from upper side while leaving said photoresist in said region (A);

removing said photoresist in any part other than that in said region (A); and forming a source/drain electrodes.

4. Method for manufacturing a TFT array of liquid crystal display comprising steps of:

depositing a gate electrode/gate line, a pixel electrode and a common line, each of said gate electrode/gate line, said pixel electrode and said common line including at least two layers comprising a transparent conductive layer and a metallic layer provided on said transparent conductive layer;

etching said gate electrode/gate line, said pixel electrode and said common line using a photoresist having a patterned shape corresponding to said gate electrode/gate line, said pixel electrode and said common line to form a predetermined pattern;

forming a gate insulating film and a semiconductor film;

forming a region (A) where at least of a portion of said photoresist corresponding to said semiconductor layer to be left has a thickness being larger than any other part of said photoresist, a region (C) where at least of a portion of said photoresist corresponding to a light transmitting part of said pixel electrode to be exposed is removed, and a region (B) where any parts other than said region (A) and said region (B) having a thickness smaller than that of said semiconductor layer;

etching said semiconductor layer and said gate insulating film using said photoresist having said thickness in each part to expose said pixel electrode;

removing at least said metallic layer located in upper side of said two layers in said exposed pixel electrode by etching process;

removing said photoresist in said region (B) from upper side while leaving said photoresist in said region (A);

removing said photoresist in any part other than that in said region (A); and forming a source/drain electrodes.

5. Method for manufacturing a TFT array of liquid crystal display comprising steps of:

depositing a gate electrode/gate line and a pixel electrode, each of said gate electrode/gate line and said pixel electrode including at least two layers comprising a transparent conductive layer and metallic layer provided on said transparent conductive layer, and subsequently etching said gate electrode/gate line and said pixel electrode using a photoresist having a predetermined patterned shape corresponding to said gate electrode/gate line and said pixel electrode to form a predetermined patterns;

forming a gate insulating film and a semiconductor film;

forming a region (A) where at least of a portion of said photoresist corresponding to said semiconductor layer to be left has a thickness being larger than any other part of said photoresist, a region (C) where at least of a portion of said photoresist corresponding to a light transmitting part of said pixel electrode to be exposed is removed, and a region (B) where any parts other than said region (A) and said region (B) having a thickness smaller than that of said semiconductor layer;

etching said semiconductor layer and said gate insulating film using said photoresist having said thickness in each part to expose said pixel electrode;

removing said photoresist in said region (B) from upper side while leaving said photoresist in said region (A);

removing said photoresist in any part other than that in said region (A);

forming a source/drain electrode made of the same metallic material as that used for an upper layer of said two layers of said gate line; and removing said source/drain electrode by etching process, while removing said metallic layer located in said upper layer of said two layers of said exposed pixel electrode by etching process.

\* \* \* \* \*